US012326290B2

(12) United States Patent
Lee et al.

(10) Patent No.: US 12,326,290 B2
(45) Date of Patent: Jun. 10, 2025

(54) REFRIGERATOR

(71) Applicant: LG Electronics Inc., Seoul (KR)

(72) Inventors: Donghoon Lee, Seoul (KR); Donghoon Lee, Seoul (KR); Wookyong Lee, Seoul (KR); Seungyoon Cho, Seoul (KR); Heejun Lee, Seoul (KR); Seungseob Yeom, Seoul (KR)

(73) Assignee: LG Electronics Inc., Seoul (KR)

(*) Notice: Subject to any disclaimer, the term of this patent is extended or adjusted under 35 U.S.C. 154(b) by 112 days.

(21) Appl. No.: 17/592,166

(22) Filed: Feb. 3, 2022

(65) Prior Publication Data

US 2022/0154991 A1 May 19, 2022

Related U.S. Application Data

(63) Continuation of application No. 16/859,605, filed on Apr. 27, 2020, now Pat. No. 11,274,869, which is a (Continued)

(30) Foreign Application Priority Data

Aug. 31, 2015 (KR) ........................ 10-2015-0122776
Sep. 9, 2015 (KR) ........................ 10-2015-0127455
(Continued)

(51) Int. Cl.
*F25C 5/20* (2018.01)
*E05D 11/00* (2006.01)
(Continued)

(52) U.S. Cl.
CPC ................ *F25C 5/22* (2018.01); *E05D 11/00* (2013.01); *F25C 1/24* (2013.01); *F25C 5/182* (2013.01);
(Continued)

(58) Field of Classification Search
CPC ............... F25D 2323/021; F25D 17/08; F25D 2331/806; F25D 2400/40; F25D 2323/024; E05Y 2900/31
See application file for complete search history.

(56) References Cited

U.S. PATENT DOCUMENTS 7,673,472 B2 3/2010 Kwon
8,281,613 B2 10/2012 Ah et al.
(Continued)

FOREIGN PATENT DOCUMENTS

EP 2320176 5/2011
EP 2444761 4/2012
(Continued)

OTHER PUBLICATIONS

Extended European Search Report in European Application No. 16842299.6, dated Mar. 13, 2019, 8 pages.
(Continued)

*Primary Examiner* — Ana M Vazquez
(74) *Attorney, Agent, or Firm* — Fish & Richardson P.C.

(57) ABSTRACT

A refrigerator includes: a cabinet in which a refrigerating compartment is provided; a first door connected to the cabinet to open and close the refrigerating compartment and having an opening; a housing provided in the first door and accessible through the opening therein; an ice making room provided in the housing; a storage room that is provided below the ice making room and maintained at a temperature different from that of the refrigerating compartment; a guide duct provided below the ice making room to guide discharge of ice; a second door connected to the first door; a dispenser disposed on a front surface of the second door; and a discharge duct provided in the second door, wherein, when
(Continued)

the second door is closed, the guide duct communicates with the discharge duct, and ice made in the ice making room is discharged to the dispenser.

15 Claims, 68 Drawing Sheets

Related U.S. Application Data continuation of application No. 15/755,776, filed as application No. PCT/KR2016/009746 on Aug. 31, 2016, now Pat. No. 10,670,320.

(30) Foreign Application Priority Data

| | | |
|---|---|---|
| Sep. 9, 2015 | (KR) | 10-2015-0127456 |
| Aug. 29, 2016 | (KR) | 10-2016-0109829 |
| Aug. 29, 2016 | (KR) | 10-2016-0109830 |
| Aug. 29, 2016 | (KR) | 10-2016-0110226 |
| Aug. 30, 2016 | (KR) | 10-2016-0110613 |

(51) Int. Cl.

| | |
|---|---|
| ***F25C 1/24*** | (2018.01) |
| ***F25C 5/182*** | (2018.01) |
| ***F25D 23/02*** | (2006.01) |
| ***F25D 23/04*** | (2006.01) |
| ***F25D 25/00*** | (2006.01) |
| ***F25D 29/00*** | (2006.01) |

(52) U.S. Cl.

CPC ........... *F25D 23/02* (2013.01); *F25D 23/025* (2013.01); *F25D 23/028* (2013.01); *F25D 23/04* (2013.01); *F25D 25/00* (2013.01); *F25D 29/00* (2013.01); *F25C 2400/10* (2013.01); *F25C 2400/14* (2013.01); *F25D 2323/024* (2013.01); *F25D 2323/122* (2013.01)

(56) References Cited

U.S. PATENT DOCUMENTS

| | | | | |
|---|---|---|---|---|
| 8,312,735 | B2 | 11/2012 | Fulton | |
| 9,448,003 | B2 | 9/2016 | Shin et al. | |
| 10,080,446 | B2 * | 9/2018 | Windrich | E05D 7/081 |
| 2004/0183414 | A1 | 9/2004 | Kwon | |
| 2006/0213213 | A1 | 9/2006 | Chung et al. | |
| 2007/0204648 | A1 | 9/2007 | Smale et al. | |
| 2007/0251261 | A1 | 11/2007 | Son et al. | |
| 2011/0030412 | A1 | 2/2011 | Kim | |
| 2011/0146312 | A1 | 6/2011 | Hong et al. | |
| 2012/0036882 | A1 | 2/2012 | Park et al. | |
| 2012/0096872 | A1 | 4/2012 | Cheong et al. | |
| 2012/0297814 | A1 | 11/2012 | Kim et al. | |
| 2013/0047656 | A1 | 2/2013 | Kang et al. | |
| 2014/0232251 | A1 | 8/2014 | Kim et al. | |
| 2015/0260443 | A1 | 9/2015 | Lee et al. | |
| 2015/0260447 | A1 * | 9/2015 | Kim | F25D 27/005 312/405 |

FOREIGN PATENT DOCUMENTS

| | | | |
|---|---|---|---|
| EP | 2837902 | A2 | 2/2015 |
| KR | 20050034422 | | 4/2005 |
| KR | 10-0488074 | | 5/2005 |
| KR | 20050094673 | | 9/2005 |
| KR | 20050119436 | | 12/2005 |
| KR | 10-2006-0041437 | | 5/2006 |
| KR | 10-0691886 | B1 | 3/2007 |
| KR | 10-2008-0014598 | | 2/2008 |
| KR | 10-2008-0106688 | | 12/2008 |
| KR | 10-2008-0112710 | | 12/2008 |
| KR | 10-2009-0012683 | A | 2/2009 |
| KR | 10-2009-0051633 | A | 5/2009 |
| KR | 20090075911 | | 7/2009 |
| KR | 10-2009-0106938 | A | 10/2009 |
| KR | 10-2009-0106943 | A | 10/2009 |
| KR | 10-2010-0116767 | | 11/2010 |
| KR | 10-2011-0072506 | A | 6/2011 |
| KR | 10-2011-0080104 | | 7/2011 |
| KR | 10-2011-0122905 | A | 11/2011 |
| KR | 20120040891 | | 4/2012 |
| KR | 20130009090 | | 1/2013 |
| KR | 10-2013-0028324 | A | 3/2013 |
| KR | 20140103500 | | 8/2014 |
| KR | 20140104638 | | 8/2014 |
| KR | 101437173 | | 9/2014 |
| WO | WO 2009/072773 | A2 | 6/2009 |
| WO | WO2010123175 | | 10/2010 |

OTHER PUBLICATIONS

Office Action in Korean Appln. No. 10-2018-7012608, dated Dec. 19, 2022, 5 pages.
Office Action in Korean Appln. No. 10-2018-7012609, mailed on Jul. 28, 2023, 8 pages (with English translation).
Office Action in Korean Appln. No. 10-2018-7012610, mailed on Jul. 28, 2023, 8 pages (with English translation).
European Office Action in European Appln. No. 16842299.6, dated Jun. 25, 2020, 5 pages.
Extended European Search Report in European Appln. No. 21179510.9, dated Oct. 5, 2021, 7 pages.
Extended European Search Report in European Appln. No. 23185757.4, dated Nov. 24, 2023, 6 pages.
Office Action in Korean Appln. No. 10-2024-7032118, mailed on Oct. 29, 2024, 10 pages (with English translation).
Extended European Search Report in Europepan Appln. No. 24204728.0, mailed on Nov. 18, 2024, 6 pages.
Office Action in Korean Appln. No. 10-2024-7011187, mailed on Feb. 1, 2025, 4 pages (with English translation).

* cited by examiner

REFRIGERATOR

CROSS-REFERENCE TO RELATED APPLICATIONS

This application is a continuation of U.S. application Ser. No. 16/859,605, filed on Apr. 27, 2020, which is a continuation of U.S. application Ser. No. 15/755,776, filed on Feb. 27, 2018, now U.S. Pat. No. 10,670,320, which is a National Stage application under 35 U.S.C. § 371 of International Application No. PCT/KR2016/009746, filed Aug. 31, 2016, which claims the benefit of Korean Application No. 10-2016-0110613, filed on Aug. 30, 2016, Korean Application No. 10-2016-0110226, filed on Aug. 29, 2016, Korean Application No. 10-2016-0109830, filed on Aug. 29, 2016, Korean Application No. 10-2016-0109829, filed on Aug. 29, 2016, Korean Application No. 10-2015-0127456, filed on Sep. 9, 2015, Korean Application No. 10-2015-0127455, filed on Sep. 9, 2015, and Korean Application No. 10-2015-0122776, filed on Aug. 31, 2015. The disclosures of the prior applications are incorporated by reference in their entirety.

TECHNICAL FIELD

The present invention relates to a refrigerator.

BACKGROUND

Refrigerators are electric appliances for storing foods for a long time at a low temperature.

In recent years, a refrigerator in which an ice making device is mounted on a door so as to increase storage capacity of the refrigerator, and a dual door structure for minimizing a loss of cool air when the door is opened is applied is being released.

Referring to a refrigerator disclosed in Prior Art 1, a refrigerating compartment door that opens and closes a refrigerating compartment is provided as a pair of rotation-type doors, and one of the pair of rotation-type doors includes first and second doors, which are opened by rotating in the same direction. Also, the first door selectively opens a front opening of the refrigerating compartment, and the second door is rotatably connected to a front surface of the first door to selectively open and close a storage space or opening defined in the first door.

An accommodation member such as door basket may be provided in the first door, the front surface of the first door may be opened, and the second door may open and close the opened front surface of the first door. According to the above-described structure, foods or beverage containers, which are frequently taken out for use may be accommodated in the first door. Thus, since only the second door is opened to bring out the foods and containers, which are frequently taken out, there is an advantage in minimizing leakage of cool air within the refrigerating compartment.

Also, a dispenser that is capable of dispensing ice or water may be provided in the other one of the pair of rotation-type doors.

According to Prior Art 2, a refrigerator in which an ice making device is provided in a back surface of one of a pair of rotation-type doors, and a dispenser through which water or ice made in the ice making device is dispensed is provided in a front surface thereof is disclosed.

According to the proposed Prior Arts, in the pair of door structures that are respectively rotatably connected to left and right edges of a refrigerator body, the ice making device and the dispenser are provided in one rotation-type door, and the other rotation-type door has a door-in-door structure in which two doors that rotate for opening in the same direction are disposed to overlap each other in a front/rear direction.

However, in case of the door-in-door structure in which the two doors overlap each other in the front/rear direction, a storage compartment defined in the rear door is maintained at the same temperature as a storage compartment that is opened and closed by the rear door, i.e., the refrigerating compartment.

Thus, there is a need of a storage compartment, which is maintained at a temperature that is less than that of the refrigerating compartment and greater than that of a freezer compartment and capable of storing a food container having high frequency of use.

Prior Art 1: Korean Patent Publication No. 10-2014-0103500 (Aug. 27, 2014)

Prior Art 2: Korean Patent Publication No. 10-2005-0094673 (Sep. 28, 2005)

SUMMARY

The technical objects of the present invention are as follows.

1. It is necessary to secure a space within a door so as to install a food storage room (hereinafter, referred to a chiller room), which is maintained at a temperature different from that of a refrigerating compartment, in a refrigerating compartment door.
2. It is necessary to secure a cool air supply passage for supplying cool air to the chiller room when the chiller room is provided in a door that opens and closes the refrigerating compartment.
3. It is necessary to design an optimal door for securing spaces of the chiller room and the ice making room when an ice making room is installed in an existing door-in-door structure.
4. It is necessary to design an optimal door in consideration of installed positions of the ice making room and a dispenser so as to secure stability of a door hinge.
5. Since an ice maker and an ice bin are installed in the ice making room, the components may act as flow resistors. In this situation, a cool air passage for smoothly guiding a portion of cool air supplied to the ice making room to the chiller room may be formed.
6. When the ice making room is provided in an upper side of the refrigerating compartment, and the chiller room is provided in a lower side of the refrigerating compartment, a space for securing the chiller room may be secured in the refrigerating compartment door. As a result, a vertical width of the ice making room may be reduced when compared to an existing ice making room.

It is necessary to secure an amount of stored ice by increasing a front/rear width of the ice making room, instead of reduction of a vertical width of the ice making room. Also, as the front/rear width of the ice making room increases, a front/rear width of the ice bin accommodated in the ice making room may increase, and a blade accommodation part and an ice storage part are provided in the ice bin in a front/rear direction. Also, a blade assembly including a rotatable blade and a fixed blade is mounted on the blade accommodation part, and a shutter for guiding discharge of cubed ice is mounted on a lower side of the blade assembly.

Also, a portion of ice stored in the ice storage part may be hung on the blade accommodation part. In this state, when a cubed ice discharge command is inputted, and the rotatable blade rotates, a portion of an ice piece hung on the blade accommodation part may be broken by the rotatable blade.

Thus, it is necessary to improve a structure of the shutter so that portions of ice pieces stored in the ice storage part are introduced into the blade accommodation part to minimize discharge of the broken ice in the cubed ice discharge mode.

Also, when the ice storage part is provided in the ice bin, the ice pieces staying in the ice storage part may be clogged with each other as time elapsed.

The purpose of the present invention is to provide a clogging prevention unit for periodically or intermittently solving the phenomenon in which the ices stored in the ice storage part are clogged with each other.

7. In the refrigerator in which the ice making room is provided in a door of the refrigerator according to the related art, in order to supply cool air from a cool air supply duct provided in a side surface of the ice making room to the ice making room, a cool air guide duct is installed above the ice maker within the ice making room. As a result, the cool air supplied from the cool air supply duct is switched in flow direction and introduced into the cool air guide duct. Then, the cool air flowing in a width direction of the ice making room along the cool air guide duct is changed in flow direction to flow to a rear surface of the ice making room. Also, a cool air passage in which the flow direction of the cool air is changed again downward from the rear surface of the ice making room to drop down to a rear surface of the ice maker and then flow forward may be formed.

As described above, as the number of switched cool air flow directions increases, an air pressure may be significantly reduced. As the air pressure is reduced, an amount of air per unit time, which is supplied to the ice making room, may be reduced. As a result, the ice making time may increase to deteriorate ice making efficiency.

To solve the foregoing limitation, the purpose of the present invention is to provide a refrigerator in which a mounted position of the cool air guide duct and a surface structure of an ice tray are improved to prevent the air pressure reduction from occurring and increase an amount of ice to be made.

8. In the refrigerator having the door-in-door structure in which the ice making room, the dispenser, and the chiller room are provided, and the chiller room is accommodated in a rear side of the dispenser, in order to design a maximally slim dispenser, it is necessary to locate the discharge hole through which ice is discharged at a position that is closest to a front end of the ice making room. As a result, there is a limitation in which it is difficult to apply the above-described structure to a typical structure in which a blade motor and a gear assembly are mounted on the door liner defining the back surface of the door in which the ice making room is provided.

Thus, the purpose of the present invention is to provide a refrigerator in which the dispenser has a slim thickness to secure a storage space of the chiller room.

9. The purpose of the present invention is to provide a refrigerator in which the dispenser has a slim thickness, and a structure and installed position of an ice making room door are improved to secure convenience in use of the ice making room.

10. The purpose of the present invention is to improve a structure of a discharge duct switching module so that the door in which the dispenser is provided has a slim thickness.

11. Also, in the door-in-door structure of the present invention, since the dispenser has to be provided in the sub door and the ice making room and the chiller room have to be provided in the main door, the sub door and the main door may be very complicated in structure when compared to the existing door-in-door structure. As a result, in the door manufacturing process, i.e., a door forming process in which a foamed insulation material is filled into the door, a phenomenon in which the foamed insulation material is not uniformly filled into the door may occur.

Under these conditions, it is very important to select a position of an injection hole for the liquefied foamed thermal insulation material and a position of a vent hole through which air within the door is discharged. If the positions of the injection hole and the vent hole are selected in error, the liquefied foamed thermal insulation material may be solidified before the liquefied foamed thermal insulation material is completely filled into the door. As a result, a non-filled region in which the foamed insulation material is not filled may occur in the door.

In addition, if air existing in a space in which the insulation material will be filled is not quickly discharged at a proper time, the insulation material non-filled region may occur in the door. In this case, since insulation performance is deteriorated at the portion in which the foamed insulation material is not filled, dew may be formed on a surface of the door, or the surface of the door may be frozen. Also, due to the deterioration in insulation performance, power consumption may increase.

In order to prevent the foamed insulation material non-filled region from occurring, a time taken to maintain the foamed insulation material in a liquid or gel state after the foamed insulation material is injected may increase. However, in this case, a production time may be delayed, or productivity may be rather deteriorated.

To solve the foregoing limitation, the purpose of the present invention is to provide a refrigerator in which the foamed insulation material non-filled region does not occur in the door.

A refrigerator according to an embodiment of the present invention includes: a cabinet in which a refrigerating compartment is provided; a first door connected to the cabinet to open and close the refrigerating compartment and having an opening; a housing provided in the first door and accessible through the opening therein; an ice making room provided in the housing; a guide duct provided below the ice making room to guide discharge of ice; a second door connected to the first door; a dispenser disposed on a front surface of the second door; and a discharge duct provided in the second door, wherein, when the second door is closed, the guide duct communicates with the discharge duct, and ice made in the ice making room is discharged to the dispenser.

The refrigerator including the foregoing constitutions according to the embodiment of the present invention has following effects.

1. Since the chiller room that is a separate storage space and maintained at a temperature different from that of the refrigerating compartment is provided in the door for opening and closing the refrigerating compartment, the chiller room has to be maintained at a temperature less that of the refrigerating compartment, and foods that are frequently used may be easily stored.

2. Since the chiller room is not provided in the refrigerating compartment or freezer compartment, but provided in the door for opening and closing the refrigerating compartment or the freezer compartment, it may be unnecessary to open the refrigerating compartment provided in the refrigerator body so as to use the chiller room, and thus, a loss of the cool air may be minimized.

3. Since the ice making room and the chiller room are installed together in the door-in-door structure, the spatial utilization of the door may be improved, and the storage space within the refrigerating compartment may be widened.
4. Since the ice making room and the chiller room are partitioned and provided in one door, and a portion of the cool air supplied to the ice making room is supplied to the chiller room, it may be unnecessary to provide a separate passage for supplying the cool air to the chiller room.
5. Since the communication hole is installed in the partition wall that partition the ice making room from the chiller room, and the damper is provided in the communication hole, an amount of cool air supplied from the ice making room to the chiller room may be adequately adjusted according to the set temperature of the chiller room. Thus, the temperature of the chiller room may be stably maintained to a third temperature different from that of each of the ice making room and the refrigerating compartment.
6. Since the ice making room is installed in the upper side of the main door, and the dispenser for dispensing ice made in the ice making room is installed in the front surface of the lower side of the sub door, the stability of the hinge may be secured. That is, since the load of the ice making room and the load of the dispenser are dispersed to the hinge of the main door and the hinge of the sub door, the risk of the damage of the hinge may be significantly reduced.
7. Since the ice making room is installed in the main door, and the dispenser is installed in the sub door, the ice may be dispensed without opening the door by the user, and thus, the convenience in use may be improved.

Also, since it is unnecessary to open the main door provided in the ice making room so as to dispense ice, the ice making room may not be exposed to the external air, or the external air may not be introduced into the refrigerating compartment in the ice dispensing process.

8. Since the water tube extending to the refrigerator body is connected to the ice making room and the dispenser through the main door hinge and the sub door hinge, the bending of the water tube and the possibility of the damage of the water tube may be reduced.
9. Since the water tube connected to the dispenser is exposed to the outside by passing through the front surface of the lower portion of the main door and then extends to the dispenser through the lower hinge shaft of the sub door, the path of the water tube from the main door to the sub door may be shortened. In addition, the water tube passing through the front surface of the main door may be prevented from being exposed to the outside by the sub door.
10. Since the power and signal cables extending from the main controller provided in the top surface of the cabinet are led into the main door through the hinge shaft of the main door, and the cable for the sub door is led out of the top surface of the main door and led into the hinge shaft of the sub door, the external exposure of the cables may be minimized when compared to the case in which the cable is directly led from the cabinet to the hinge shaft of the sub door, thereby reducing the possibility of the damage of the cable.
11. Since a portion of the edge of the ice bin, which corresponds to the direct upper side of the communication hole, is changed in shape to form the cool air descending passage so that the ice bin accommodated in the ice making room does not cover the communication hole defined in the partition wall, the cool air may be smoothly supplied from the ice making room to the chiller room.
12. The protrusion may be disposed on the edge of the top surface, which corresponds to the boundary portion between the ice storage part and the blade accommodation part, which are provided in the ice bin, on the top surface of the shutter mounted on the ice discharge hole of the ice bin. As a result, the phenomenon in which the ice is hung on both sides of the ice storage part and the blade accommodation part and thus discharged in the broken state by the rotatable blade in the cubed ice dispensing mode may be reduced.
13. Since the mixing blade is mounted on the shaft constituting the ice discharge adjustment module so as to dispense ice, and the mixing blade is disposed in the ice storage part that is provided because the ice bin has the front/rear width greater than that of the ice bin according to the related art, the phenomenon in which the ices stored in the ice storage part are clogged with each other may be minimized.
14. The number of converted cool air flow directions that occur when the cool air supplied from the cool air duct mounted in the side surface of the ice making room collides with the surface of the ice tray may be significantly reduced to increase the air pressure and amount. As a result, an amount of made ice per unit time may increase.
15. Since the opening for the access to the ice making room is not defined in the rear surface of the housing, but is defined in the front surface of the main door, and the ice making room door is provided in the front surface of the main door, it may be unnecessary to open the main door for the access to the inside of the ice making room. As a result, the leakage of the cool air or the introduction of the external air, which occur when the main door is opened for the access to the inside of the ice making room, may be prevented.
16. Since the vacuum insulation panel is used to thermally insulate the ice making room door without injecting the foamed insulation material, the ice making room door may decrease in thickness, whereas, the insulation performance may be maintained.
17. Since the hinge structure rotatably coupling the ice making room door to the main door is improved, it may be unnecessary to form a configuration in which the back surface of the sub door covering the hinge part is recessed or stepped, thereby preventing the insulation performance of the sub door from being deteriorated.
18. Since the ice shutter disposed on the discharge duct outlet is tilted (or pivoted) forward by the discharge duct switching module constituting the dispenser, the distance between the discharge duct outlet and the front surface of the sub door may be reduced to realize the slim door.
19. The ice shutter guiding the dispensing of the ice may be tilted forward by the discharge duct switching module that opens and closes the discharge duct and then automatically return to its original position by the restoring force of the spring. Thus, since it is unnecessary to provide separate driving force for tilting the ice shutter, the power consumption may be reduced.

20. The dead volume of the chiller room accommodating the dispenser may be reduced through the slim dispenser.
21. Since the injection hole and the vent hole are defined in the optimal positions according to the shape of the door, the foam resistance in the foamed insulation material injection process may be reduced to prevent the insulation material non-filled region from occurring in the door.
22. Since the injection hole and the vent hole of the foamed insulation material are defined in the optimal positions, although the structure of the door is complicatedly designed, the time taken to inject the foamed insulation material may not be delayed, and the change of the production facilities may be unnecessary.
23. Since the time taken to inject the foamed insulation material is not delayed, the occurrence of the region in which the insulation material is not filled due to the solidification of the foamed insulation material may be prevented.

DETAILED DESCRIPTION

Hereinafter, a refrigerator according to an embodiment of the present invention will be described in detail with reference to the accompanying drawings.

Figure 1:
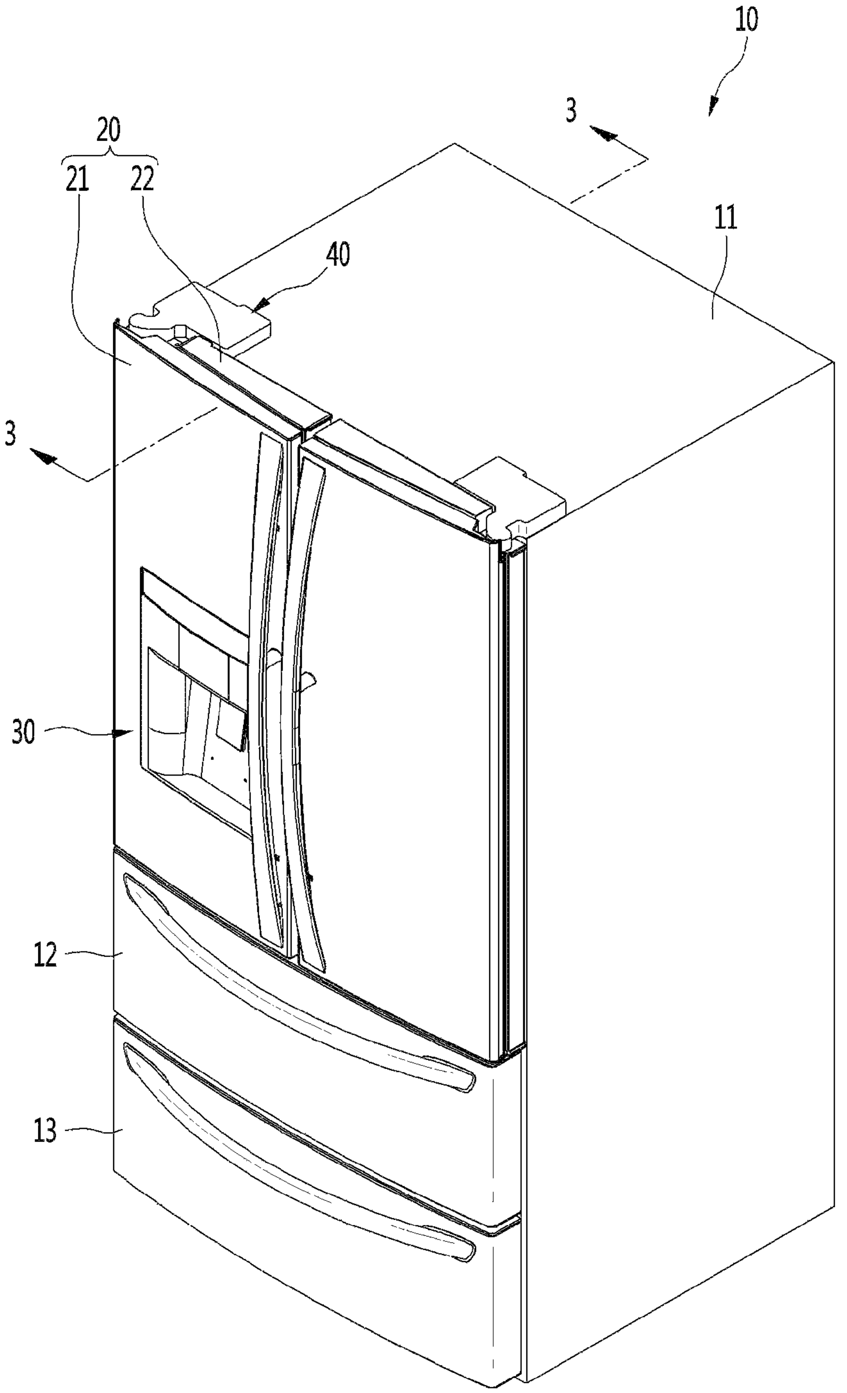
FIG. 1 is a perspective view illustrating an outer appearance of a refrigerator according to an embodiment of the present invention.
Figure 2:
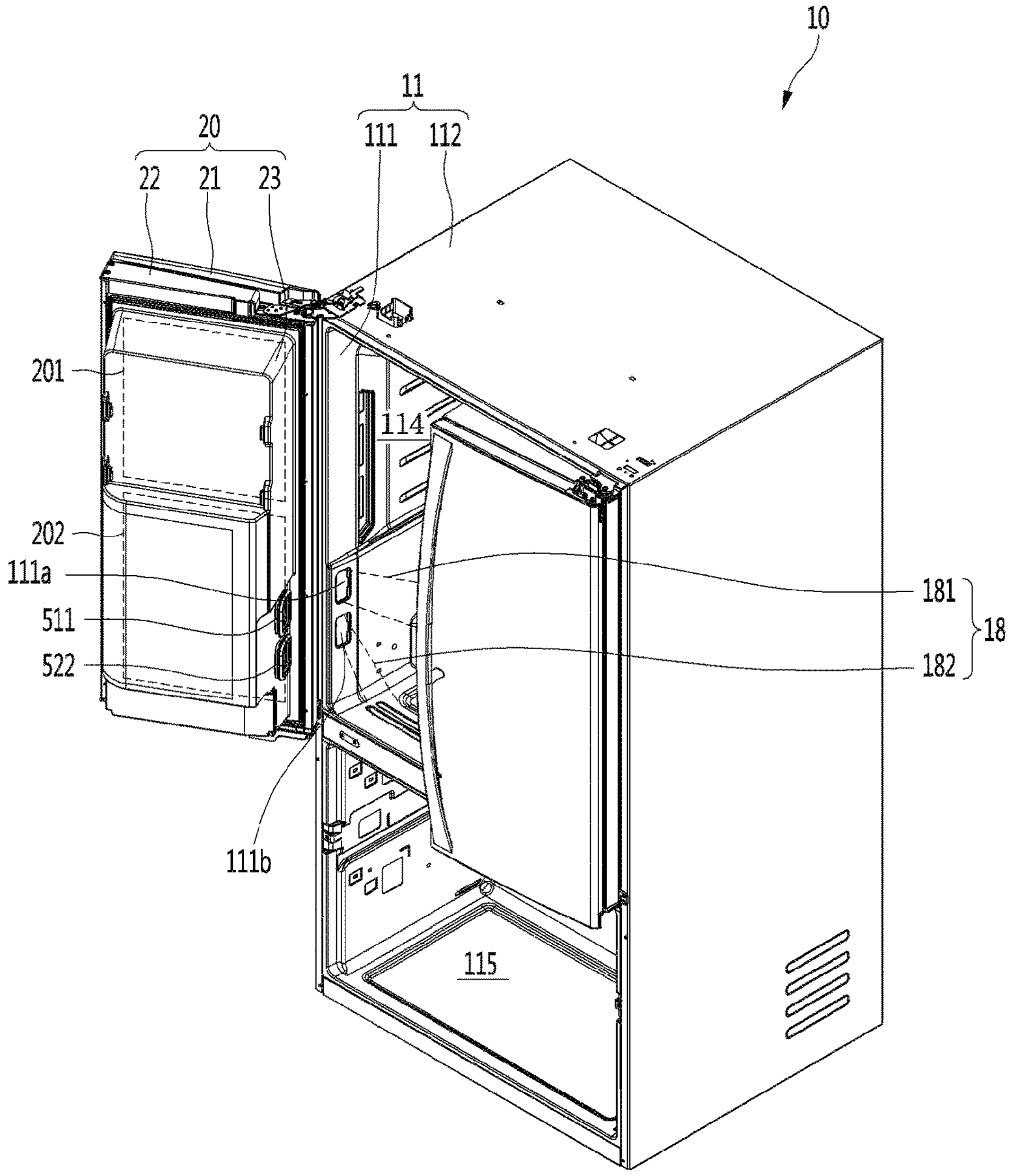
FIG. 2 is a perspective view illustrating an internal structure of the refrigerator.
Figure 3:
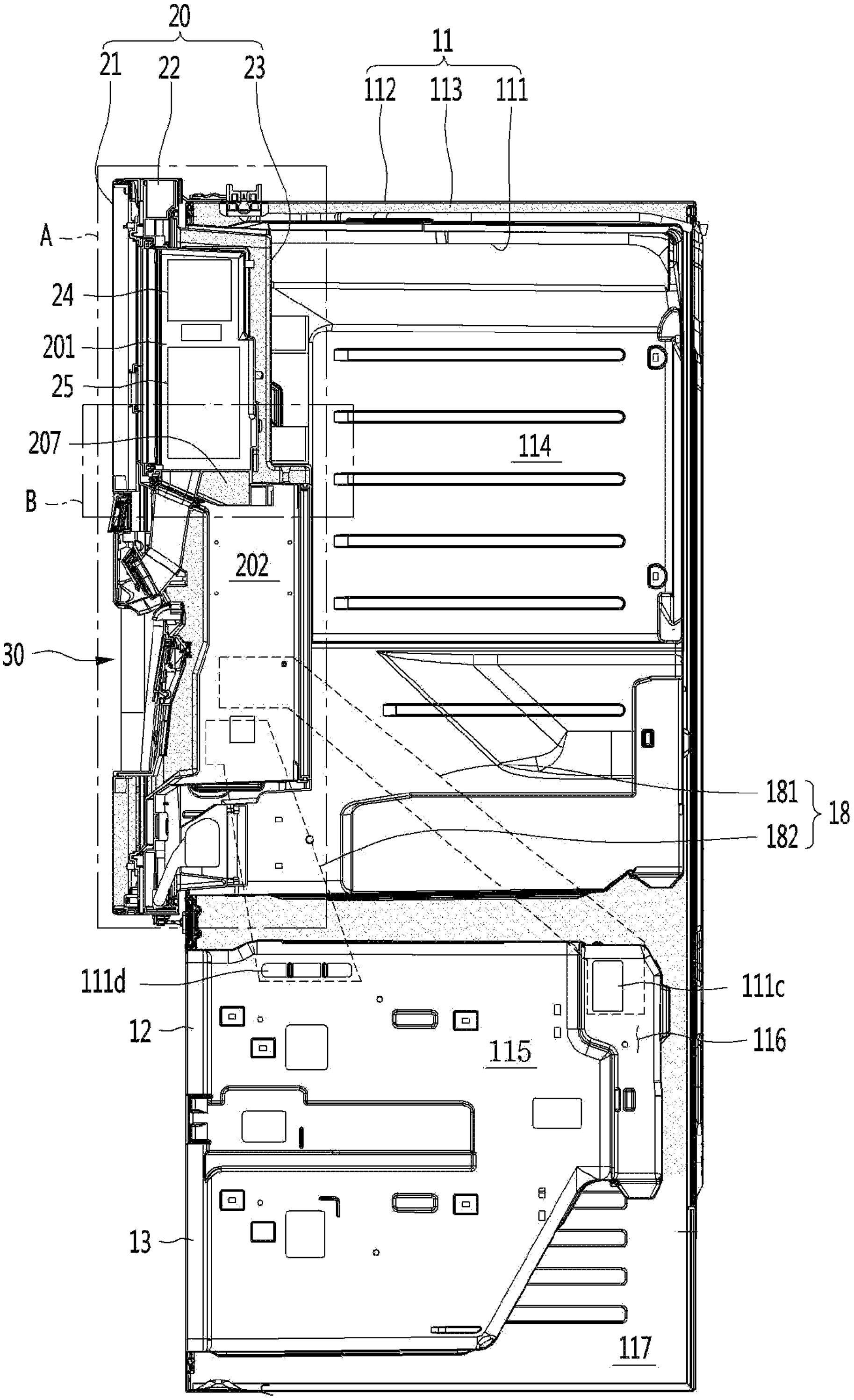
FIG. 3 is a longitudinal cross-sectional view taken along line 3-3 of FIG. 1.

FIG. 1 is a perspective view illustrating an outer appearance of a refrigerator according to an embodiment of the present invention, FIG. 2 is a perspective view illustrating an internal structure of the refrigerator, and FIG. 3 is a longitudinal cross-sectional view taken along line 3-3 of FIG. 1.

Referring to FIGS. 1 to 3, a refrigerator 10 according to an embodiment of the present invention may include a cabinet 11 including a refrigerating compartment 114 and a freezer compartment 115 therein, a pair of refrigerating compartment doors 20 that are rotatably connected to a front surface of the refrigerating compartment 114, and a freezer compartment door that opens and closes the freezer compartment 115.

Specifically, the cabinet 11 may include an inner case 111 defining the refrigerating compartment 114 and the freezer compartment 115, an outer case 112 surrounding the outside of the inner case 111, and an insulation material 113 filled between the inner case 111 and the outer case 112.

A cool air duct 18 including a supply duct 181 and a return duct 182 may be disposed between the inner case 111 and the outer case 112, and the cool air duct may be surrounded by the insulation material 113. An evaporation chamber 116 in which an evaporator is provided is defined in a rear side of the freezer compartment 115.

The cool air duct 18 may be defined as a main body-side cool air duct or a cabinet-side cool air duct, and the supply duct 181 and the return duct 182 may be defined as a main body-side supply duct and a main body-side return duct or a cabinet-side supply duct and a cabinet-side return duct.

A machine room 117 in which a portion of a refrigeration cycle including a compressor, a condenser, and a condensation fan is accommodated may be defined in a rear lower side of the cabinet 11.

An inlet of the supply duct 181 communicates with a cool air hole (see reference numeral 111*c* of FIG. 3) defined in a side surface of the inner case 111, which corresponds to the evaporation chamber 116. An outlet of the supply duct 181 communicates with a cool air supply hole 111*a* defined in the side surface of the inner case 111, which defines the refrigerating compartment 114.

An inlet of the return duct 182 communicates with a cool air return hole 111*b* defined in a side surface of the inner case 111, which defines the refrigerating compartment 114. An outlet of the return duct 182 communicates with a cool air hole 111*d* defined in a side surface of the inner case 111, which defines the freezer compartment 115.

Also, the freezer compartment door may include a first freezer compartment door 12 and a second freezer compartment door 13. That is, the freezer compartment 115 may be vertically partitioned into a plurality of regions, and the plurality of freezer compartments 115 may be opened and closed by the plurality of freezer compartment doors 12 and 13. However, a single freezer compartment and a single freezer compartment door may be provided. The freezer compartment door may be provided as a drawer type door. However, the freezer compartment door may be provided as a pair of rotation-type doors, like the refrigerating compartment door.

The pair of refrigerating compartment doors 20 may be rotatably connected to left and right edges of a front surface part of the cabinet 11 by hinge assemblies 40 by using a vertical axis as a center, respectively.

Also, one or all of the pair of refrigerating compartment doors 20 may include a main door 22 having an opening therein and a sub door 21 disposed on a front surface of the main door to selectively open and close the opening. A housing 23 communicating with the opening and having a storage space therein may be provided in the main door 22. The housing 23 may be mounted on a back surface of the main door 22 as a separate component or integrated with the main door 22. That is, the main door 22 may include a rectangular frame of which the inside is opened and a housing extending from a back surface of the rectangular frame to define a storage space therein.

The sub door 21 is rotatably coupled to the main door 22 on the front surface of the main door 22. Here, the main door 22 may be defined as a first door, and the sub door 21 may be defined as a second door.

Specifically, the main door 22 may be rotatably connected to the left or right edge of the front surface part of the cabinet 11 to selectively open and close a portion of the front surface of the refrigerating compartment 114.

The inside of the housing 23 may be vertically partitioned by a partition wall 207 to define an ice making room 201 and a chiller room 202. Here, the ice making room 201 may be defined above the chiller room 202.

An ice maker 24 making ice and an ice bin 25 in which the ice is stored may be accommodated in the ice making room 201. The ice bin 25 is disposed below the ice maker 24 to receive and store ice dropping down from the ice maker 24.

A cool air inflow hole 511 and a cool air discharge hole 522 are defined in a side surface of the housing 23. Specifically, the cool air inflow hole 511 and the cool air discharge hole 522 may communicate with the cool air supply hole 111*a* and the cool air return hole, which are defined in the inner case 111, when the main door 22 is closed, respectively. The cool air inflow hole 511 and the cool air discharge hole 522 may be portions that are defined in a cool air supply duct (that will be described later) and a cool air return duct (that will be described later) constituting a door duct assembly (that will be described later), respectively.

The sub door 21 is rotatably coupled to the front surface of the main door 22. Specifically, a rotation shaft of the sub door 21 is disposed at a position that is adjacent to a rotation shaft of the main door 22. The rotation shafts of the sub door 21 and the main door 22 may rotate for opening or closing in the same direction. That is to say, the rotation shafts of the main door 22 and the sub door 21 may be disposed on the same side surface.

The dispenser 30 for dispensing water and ice is mounted on the front surface of the sub door 21. A structure of the dispenser 30 will be described in more detail with reference to the following drawings.

As described above, since the ice making room 201 is defined in the main door 22, and the dispenser 30 is provided in the sub door 21, stability of the door hinge may be secured through dispersion of a load.

Figure 4:
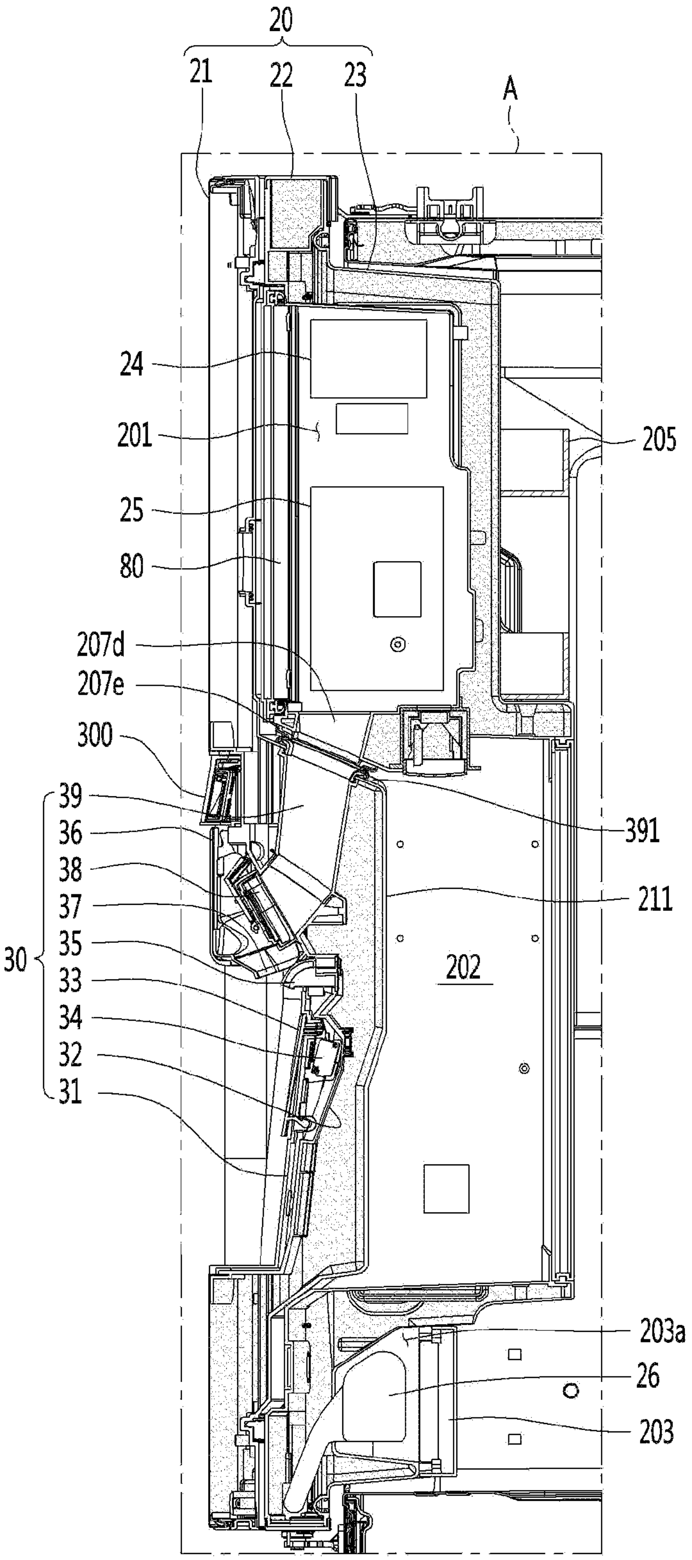
FIG. 4 is an enlarged view illustrating a portion A of FIG. 3.

FIG. 4 is an enlarged view illustrating a portion A of FIG. 3.

Referring to FIG. 4, in the refrigerator 10 according to an embodiment of the present invention, one of the pair of rotation-type refrigerating compartment doors 20 has a door-in-door structure.

Specifically, the door-in-door structure may be defined to be represented as a door assembly which opens and close the storage space (e.g., the refrigerating compartment) defined in the main body or cabinet of the refrigerator and includes a main door having a separate storage space with an opened front surface and a sub door rotatably connected to the main door to open and close the opened front surface of the separate storage space. The rotation direction of the main door for opening the storage space defined in the main body of the refrigerator and the rotation direction of the sub door for opening the separate storage space defined in the main door may be the same.

More specifically, the main door 22 may be rotatably connected to the left or right edge of the front surface of the cabinet 11, and the sub door 21 may be rotatably connected to the left or right edge of the front surface of the main door 22. The lateral edge on which the rotation shaft of the sub door 21 is disposed and the lateral edge on which the rotation shaft of the main door 22 may be the same.

The housing 23 may be provided in the main door 22, and the ice making room 201 and the chiller room 202 may be defined in the housing 23. The front surface of the main door 22 may be opened so that the ice making room 201 and the chiller room 202 are accessible by opening the sub door 21. An ice making room door 80 is separately provided in a front opening of the ice making room 201 so that the ice making room 201 is exposed to external air although the sub door 21 is opened.

The dispenser 30 for dispensing ice made in the ice making room 201 and drinking water is installed in the sub door 21. The drinking water may be supplied from a water tank 26 mounted inside the cabinet 11 or the main door 22. The water tank 26 may be connected to a water source that is provided outside the refrigerator by a water supply hose.

A space 203*a* in which the water tank 26 is mounted is defined in a lower side of the main door 22, and a space in which the water tank 26 is accommodated is defined below the chiller room 202. The space in which the water tank 26 is accommodated may be selectively opened and closed by a water tank cover 203.

The dispenser 30 may be provided in a shape that is inserted into a hole for mounting the dispenser provided in the sub door 21. An upper end of the dispenser 30 may be disposed at a point that is spaced a predetermined distance downward from an upper end of the sub door 21. Specifically, the upper end of the dispenser 30 may be disposed on the same line as a horizontal surface that equally divides sub door 21 in a vertical direction or disposed at a point that is slightly higher than the horizontal surface. However, the installed position of the dispenser 30 may change according to the position of the lower end of the ice making room 201 provided in the main door 22.

Specifically, the dispenser 30 may include a front casing 31, a rear casing 32, a dispensing button 33, a micro switch 34, a water faucet (or a drinking water dispensing hole), an outer funnel 36, an inner funnel 37, a duct cap 38, and a discharge duct 39.

The outer funnel 36 and the inner funnel 37 may have a shape in which separate components are coupled to each other or be injection-molded in a single body. An assembly of the outer funnel 36 and the inner funnel 37 may be defined as an ice funnel.

Also, an assembly of the front casing 31 and the rear casing 32 may be defined as a dispenser casing.

More specifically, the front casing 31 is inserted into a dispenser mounting hole defined in the sub door 21 and fixed to the sub door 21. The front casing 31 may be recessed backward by a predetermined depth to accommodate a container for receiving water or ice. The rear casing 32 may be fixed to the sub door 21 in a manner in which the rear casing 32 is coupled to a rear side of the front casing 31. A dispenser liner 211 may protrudes from a back surface of the sub door 21, which corresponds to a portion of the dispenser 30. An insulation material may be foamed and filled between the rear casing 32 and the dispenser liner 211.

The dispensing button 33 may be coupled to the front casing so as to be tiltable in a front/rear direction. The micro switch 34 is mounted on the rear casing 32 that corresponds to a rear side of the dispensing button 33. Thus, when a user pushes the dispensing button 33, the dispensing button 33 may contact the micro switch 34 to generate a signal for dispensing one or all of water and ice.

The dispensing button 33 may be provided as one button as illustrated in the drawings and be designed to select a water dispensing mode and an ice dispensing mode through a control panel 300 mounted on the front surface of the sub door 21, which corresponds to an upper side of the dispenser 30. That is, the user may push a mode selection button provided on the control panel 300 to select one of the water or ice dispensing modes. Here, when the user pushes the dispensing button 33, one of the water and ice may be dispensed.

In another method, the water dispensing button and the ice dispensing button are installed on the dispenser 30 in a vertical or horizontal direction so that the user pushes a desired button.

The water faucet 35 may protrude forward from any point of the front casing 31, which corresponds to an upper side of the water dispensing button 33. The ice funnel may be installed to be tiltable in a front/rear direction at an upper side of the front casing 31.

A guide duct 207*d* guiding discharge of ice extends inside the partition wall 207, and an inlet of the guide duct 207*d* communicates with an ice discharge hole (see reference numeral 207*a* of FIG. 6) defined in a front side of the bottom of the ice making room 201. An outlet of the guide duct 207*d* is exposed to the bottom surface of the partition wall 207 and closely attached to an inlet of the discharge duct 39 in a state in which the sub door 21 is closed. As illustrated in the drawings, gaskets 391 and 207*e* for sealing the cool air may be mounted on an edge of the inlet of the discharge duct 39 and an edge of the outlet of the guide duct 207*d*, respectively. The gaskets 391 and 207*e* may be closely attached to each other in a state in which the sub door 21 is closed. Here, the guide duct 207*d* and the discharge duct 39 may communicate with only the ice making room 201, but do not communicate with the chiller room 202.

The ice funnel is rotatably connected to the outlet of the discharge duct 39, and the outlet of the ice funnel communicates with an opening defined in the upper end of the front casing 31 and is exposed to the outside of the dispenser 30.

The outlet of the discharge duct 39 is selectively opened and closed by the duct cap 38, and the duct cap 38 is rotatably installed inside the dispenser 30. When the duct cap 38 rotates to open the outlet of the discharge duct 39, the ice stored in the ice bin 25 is discharged to the outside of the dispenser 30.

The ice funnel 37 and the ice dispensing button 33 may be provided in one body.

Although the structure that is capable of accommodating both the ice maker 24 and the ice bin 25 into the ice making room 201 is described in an embodiment of the present invention, the present invention is not limited thereto.

According to another embodiment, only the ice maker 24 may be accommodated in the ice making room 201, and the ice bin 25 may be disposed on the back surface of the sub door 21. In this case, the ice bin 25 may be disposed above the dispenser, i.e., above the discharge duct 39. A separate insulation wall structure for accommodating the ice bin 25 may be installed on the back surface of the sub door 21.

Figure 5:
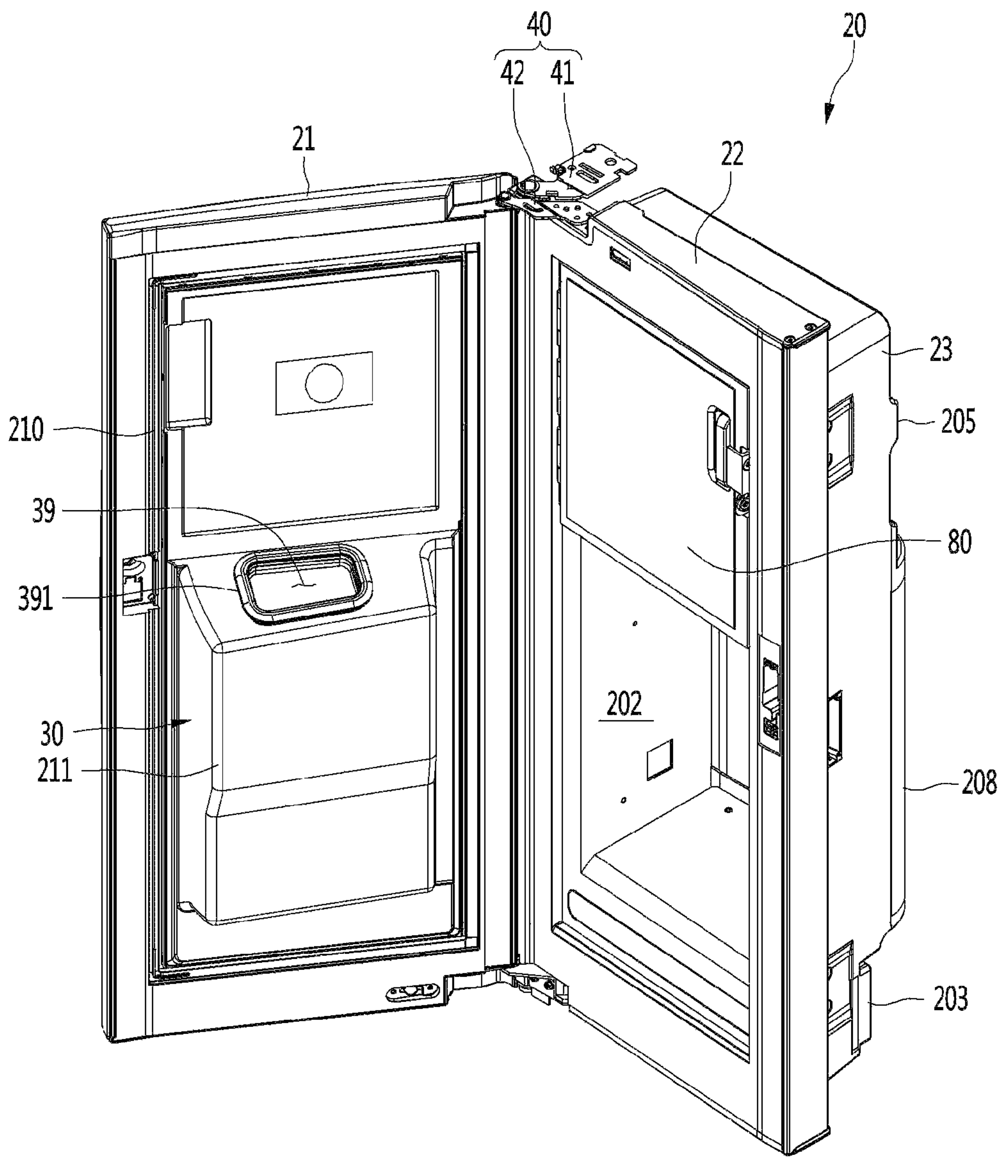
FIG. 5 is a perspective view of a door-in-door assembly in a state in which a sub door is opened.
Figure 6:
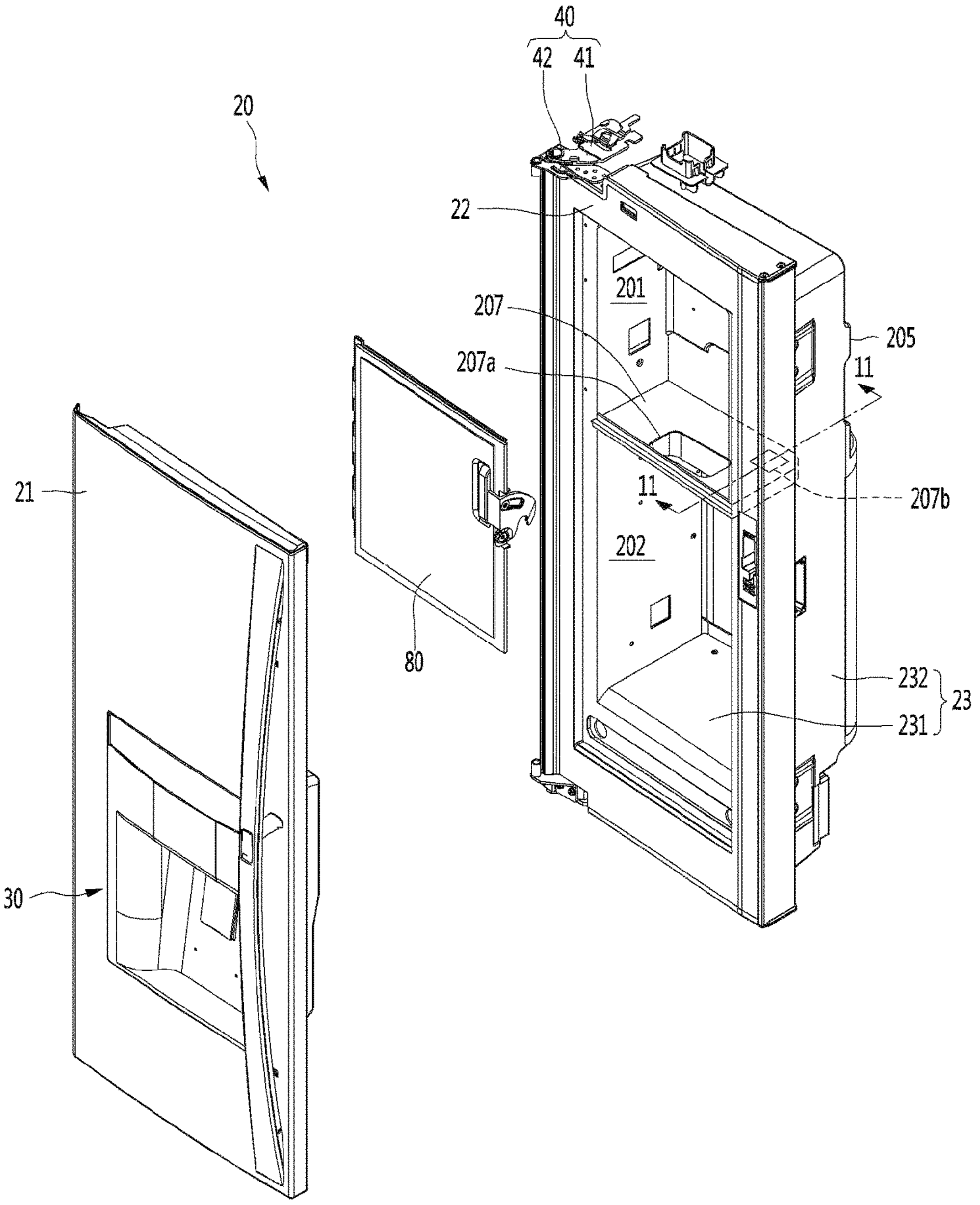
FIG. 6 is a front exploded perspective view of the door-in-door assembly.
Figure 7:
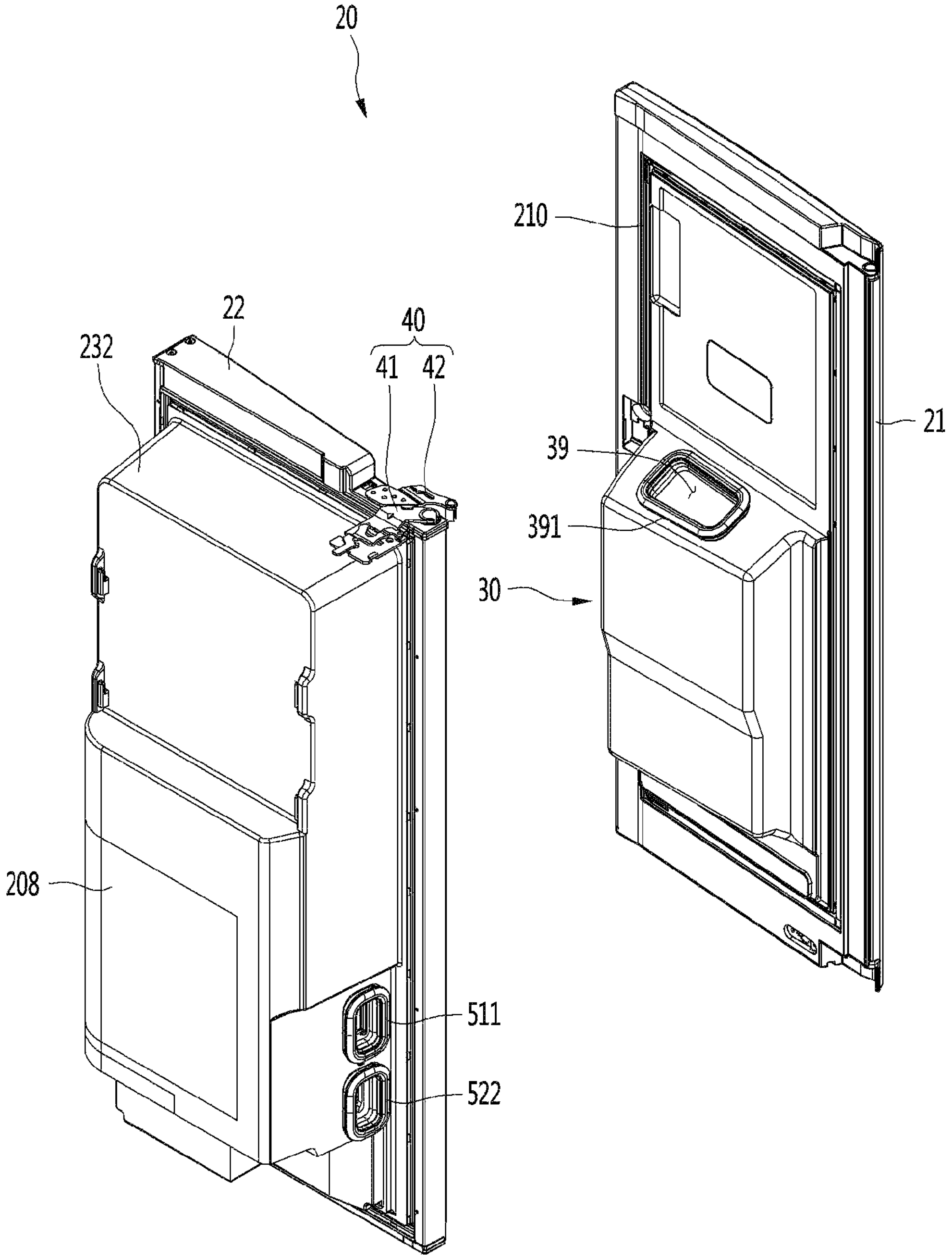
FIG. 7 is a rear exampled perspective view of the door-in-door assembly.

FIG. 5 is a perspective view of the door-in-door assembly in a state in which the sub door is opened, FIG. 6 is a front exploded perspective view of the door-in-door assembly, and FIG. 7 is a rear exampled perspective view of the door-in-door assembly.

Referring to FIGS. 5 to 7, the door-in-door assembly constituting the refrigerating compartment door 20 of the refrigerator 10 according to an embodiment of the present invention includes the main door 22 and the sub door 21.

Specifically, the sub door 21 and the main door 22 may be rotatably coupled to the cabinet 11 by the hinge assembly 40.

More specifically, the hinge assembly 40 includes a main door hinge unit (or a first door hinge unit) connecting the cabinet 11 to the main door 22 and a sub door hinge unit (or a second door hinge unit) connecting the main door 22 to the sub door 21.

Specifically, the main door hinge unit includes a main door upper hinge unit (or a first door upper hinge unit) 41 connecting the cabinet 11 to a top surface of the main door 22 and a main door lower hinge unit (or a first door lower hinge unit) connecting the cabinet 11 to a bottom surface of the main door 22.

The sub door hinge unit includes a sub door upper hinge unit (or a second door upper hinge unit) 42 connecting the main door 22 to a top surface of the sub door 21 and a sub door lower hinge unit (or a second door lower hinge unit) connecting the main door 22 to a bottom surface of the sub door 21.

As illustrated in the drawings, when the sub door 21 is opened, the inlet of the discharge duct 39 is exposed to the outside, and the gasket 391 is disposed around an edge of the inlet of the discharge duct 39.

The dispenser liner 211 may further protrude from the back surface of the sub door 21, and the inlet of the discharge duct 39 may be disposed on a top surface of the dispenser liner 211.

As illustrated in FIG. 4, a top surface of the dispenser liner 211 on which the inlet of the discharge duct 39 is disposed is gradually inclined backward. Also, a bottom surface of the partition wall 207 on which the outlet of the guide duct 207*d* is disposed may be inclined at an angle corresponding to the inclined angle of the top surface of the dispenser liner 211. As a result, when the sub door 21 is closed, the pushing due to shearing force generated while the gasket 391 disposed around the inlet of the discharge duct 39 and the gasket 207*e* disposed around the outlet of the guide duct 207*d* are closely attached to each other may be minimized.

A sealing member 210 is disposed around the back surface of the sub door 21. The sealing member 210 is closely attached to an edge of an opening defined in the front surface of the main door 22 when the sub door 21 is closed. As a result, introduction of external air into the housing 23 through a gap between the sub door 21 and the main door 22 or leakage of the cool air within the housing 23 to the outside may be prevented.

Specifically, the housing 23 may include an inner housing 231 and an outer housing 232 coupled to a rear side of the inner housing 231. Also, a door duct assembly (see reference numeral 50 of FIG. 8) for moving the cool air is installed in an outer surface of the inner housing 231. The door duct assembly 50 is covered by the outer housing 232 and thus is not exposed to the outside. However, a cool air inflow hole 511 and a cool air discharge hole 522 of the door duct assembly 50 may be exposed to the outside by passing through a side surface of the outer housing 232. The door duct assembly 50 may be defined as a door-side cool air duct assembly. A structure of the door duct assembly 50 will be described in more detail with reference to the following drawings.

One or plurality of door baskets 205 may be mounted on the back surface of the outer housing 232. A portion of the housing 23, which corresponds to the back surface of the chiller room 202, may be opened, and the opened portion of the housing 23 may be selectively opened and closed by a chiller room cover 208. A lateral end of the chiller room cover 208 may be rotatably connected to the housing 23. The front opening of the chiller room 202 is opened and closed by the sub door 21.

As described above, the inside of the inner housing 231 may be partitioned into the upper ice making room 201 and the lower chiller room 202 by the partition wall 207. The front opening of the ice making room 201 may be may be opened and closed by the ice making room door 80. The ice making room door 80 may be rotatably hinge-coupled to an edge of the side surface of the front opening of the ice making room 201.

The ice discharge hole 207*a* may be defined in the partition wall 207. Specifically, the ice discharge hole 207*a* may be disposed closer to a front end of the partition wall 207 than a rear end of the partition wall 207. Particularly, a vertical surface that cut the ice discharge hole 207*a* that equally divides the ice discharge hole 207*a* in the front/rear direction may be disposed at a front side of the vertical surface that equally divides the partition wall 207 in the front/rear direction. Thus, an inclined angle of the discharge duct 39 that is closely attached to the ice discharge hole 207*a* may be reduced. As a result, a width of the dispenser 30 in the front/rear direction may be reduced.

The inclined angle of the discharge duct 39 may represent an angle between the vertical surface and the discharge duct 39. When the ice discharge hole 207*a* is disposed closer to the front end of the partition wall 207, the discharge duct 39 may be substantially vertically inclined.

Specifically, when the sub door 21 is closed, the dispenser 30 is accommodated in the chiller room 202. Since the more the dispenser decreases in thickness, the more the chiller room 202 increases in volume, it is advantageous that the inclined angle of the discharge duct 39 decreases.

A vertical surface that equally divides the ice discharge hole 207*a* in a left/right direction may correspond to a vertical surface that equally divides the partition wall 207 in the left/right direction.

The guide duct 207*d* is mounted inside the partition wall 207, and the inlet of the guide duct 207*d* communicates with the ice discharge hole 207*a*. When the ice discharge hole 207*a* is disposed closer to the front end of the partition wall 207, i.e., the front end of the ice making room 201, the inclined angle of the guide duct 207*d* with respect to the vertical surface may decrease.

A communication hole 207*b* may be defined in the partition wall 207 so that the ice making room 201 and the chiller room 202 fluidly communicate with each other. The communication hole 207*b* may be defined in a left or right edge of the partition wall 207 to prevent an interference with the ice discharge hole 207*a* and also be defined at a point that is spaced a predetermined distance backward from the ice discharge hole 207*a*. It is preferable that the communication hole 207*b* may be defined at a point that is closer to a side surface opposite to the side surface of the inner housing 231 on which the door duct assembly 50 is mounted. Thus, since the communication hole 207*b* is defined at a point to which the cool air discharged into the ice making room 201 through the door duct assembly 50 drops, the cool air may be easily supplied to the chiller room 202. A damper assembly may be mounted inside the communication hole 207*b* to adjust an amount of cool air supplied from the ice making room 201 to the chiller room 202. That is, an amount of cool air may be controlled by the damper assembly so that the chiller room 202 has a temperature greater than that of the ice making room 201 and less than that of the refrigerating compartment.

Figure 8:
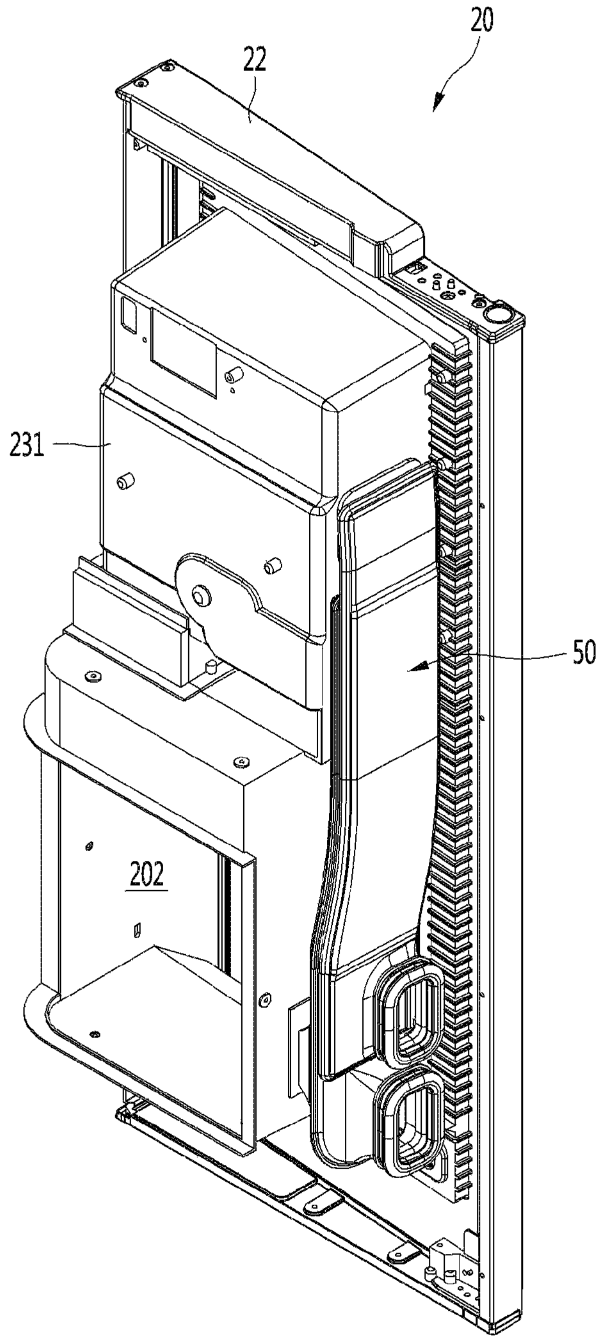
FIG. 8 is a rear perspective of a main door from which an outer housing is removed.
Figure 9:
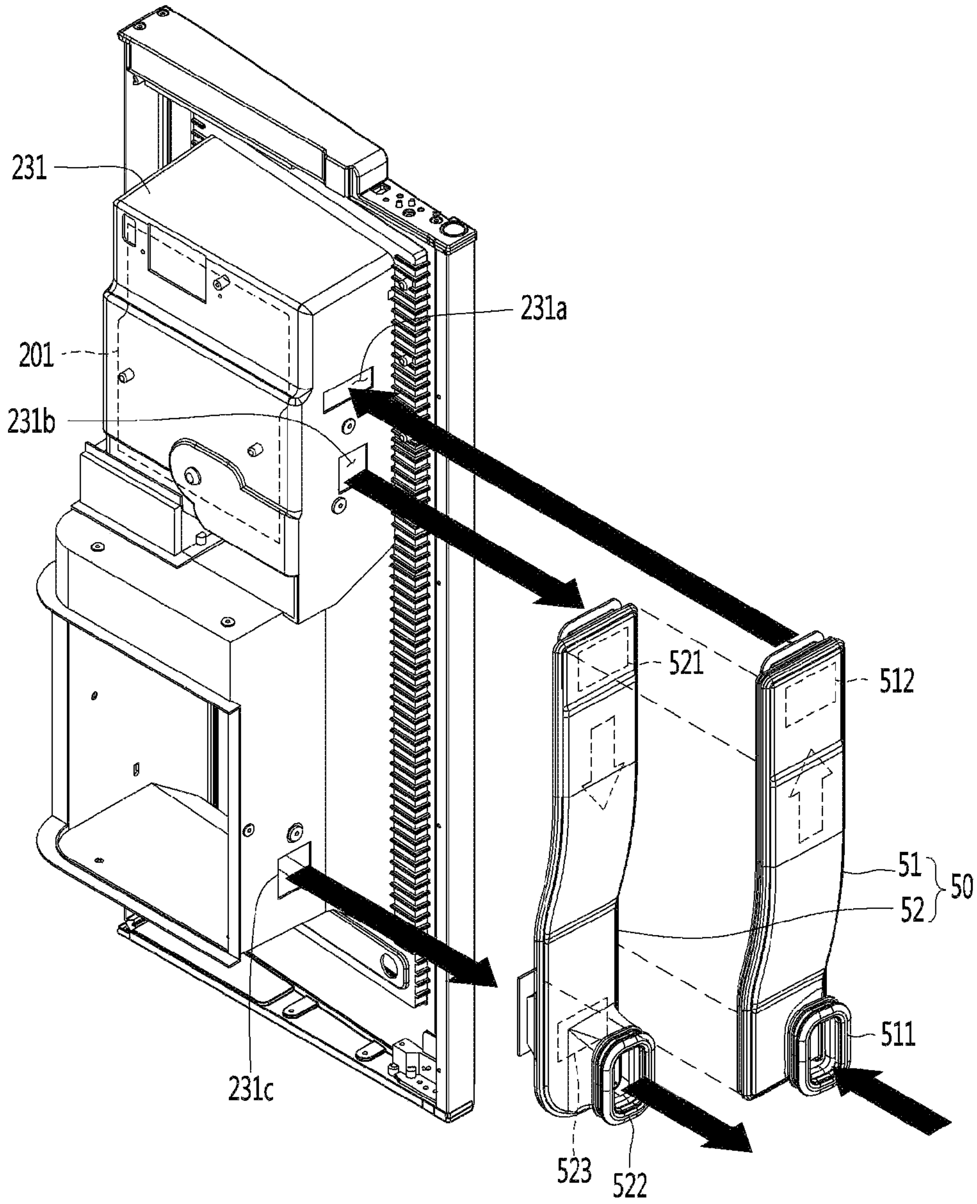
FIG. 9 is an exploded perspective view of the main door of FIG. 8.
Figure 10:
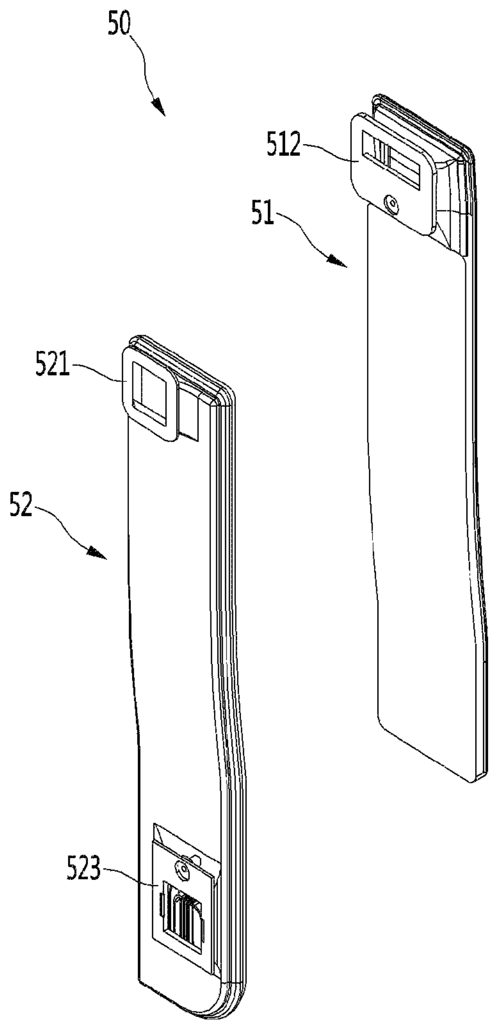
FIG. 10 is an exploded perspective view of a door duct assembly.

FIG. 8 is a rear perspective of the main door from which the outer housing is removed, FIG. 9 is an exploded perspective view of the main door of FIG. 8, and FIG. 10 is an exploded perspective view of the door duct assembly.

Referring to FIGS. 8 to 10, the housing 23 coupled to the back surface of the main door 22 may include the inner housing 231 and the outer housing 232. The door duct assembly 50 may be mounted in a space between an outer surface of the inner housing 231 and an inner surface of the outer housing 232. The insulation material may be foamed and filled into the space between the inner housing 231 and the outer housing 232 to prevent the cool air from leaking.

Also, cool air holes through which the cool air is introduced or discharged may be defined in the side surface of the inner housing 231 on which the door duct assembly 50 is mounted.

Specifically, the cool air holes defined in the side surface of the inner housing 231 may include a cool air inflow hole 231*a*, an ice making room-side cool air discharge hole 231*b*, and a chiller room-side cool air discharge hole 231*c*.

More specifically, the cool air inflow hole 231*a* may be defined in the side surface of the inner housing 231 that defines the ice making room 201 and disposed in an upper space of the ice making room 201.

The ice making room-side cool air discharge hole 231*b* may be defined in the side surface of the inner housing that defines the ice making room 201 and disposed in a lower portion of the ice making room 201.

The chiller room-side cool air discharge hole 231*c* may be defined in the side surface of the inner housing 231 that defines the chiller room 202 and disposed in a lower portion of the chiller room 202.

The door duct assembly 50 may include a cool air supply duct 51 and a cool air return duct 52. The cool air supply duct 51 and the cool air return duct 52 may be disposed to overlap each other in a lateral direction of the inner housing 231.

The cool air supply duct 51 may be a duct that is connected to the supply duct 181 extending from the side surface of the cabinet 11 to supply the cool air within the evaporation chamber 116 into the ice making room 201. The cool air return duct 52 may be a duct that is connected to the return duct 182 extending from the side surface of the cabinet 11 to supply the cool air discharged from the chiller room 202 into the freezer compartment 115.

Specifically, the cool air inflow hole 511 is defined in a lower end of an outer surface of the cool air supply duct 51. When the main door 22 is closed, the cool air inflow hole 511 may communicate with the cool air supply hole 111*a* defined in the side surface of the inner case 111.

The cool air discharge hole 512 is defined in an upper end of the inner surface of the cool air supply duct 51. The cool air discharge hole 512 communicates with the cool air inflow hole 231*a*.

An upper cool air inflow hole 521 is defined in an upper end of the inner surface of the cool air return duct 52. The upper cool air inflow hole 521 communicates with the ice making room-side cool air discharge hole 231*b*.

A lower cool air inflow hole 523 is defined in a lower end of the inner surface of the cool air return duct 52. The lower cool air inflow hole 523 communicates with the chiller room-side cool air discharge hole 231*c*.

The cool air discharge hole 522 is defined in a lower end of the outer surface of the cool air return duct 52. The cool air discharge hole 522 communicates with the cool air return hole 111*b* defined in the side surface of the inner case 111 when the main door 22 is closed.

Here, the upper cool air inflow hole 521 may be defined as a first inlet, and the lower cool air inflow hole 523 may be defined as a second inlet.

Figure 11:
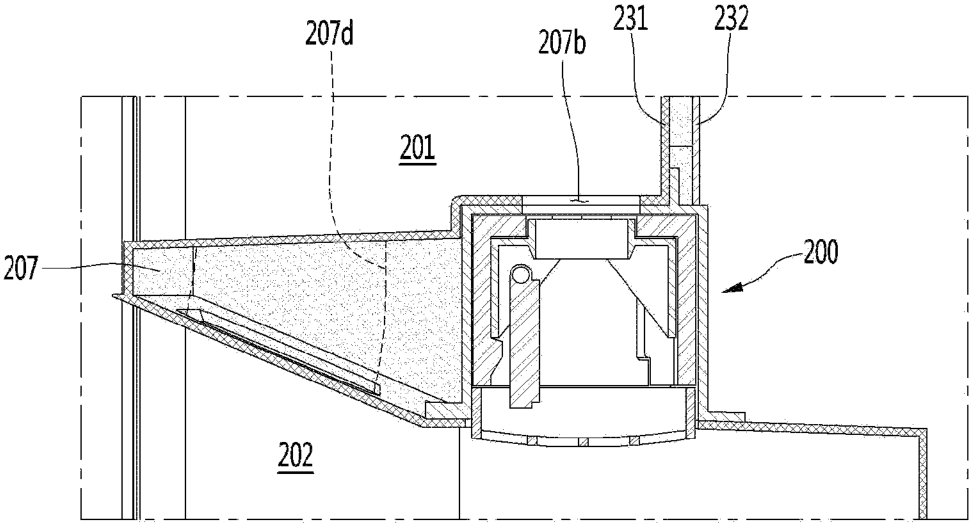
FIG. 11 is a partial longitudinal cross-sectional view taken along line 11-11 of FIG. 6.

FIG. 11 is a partial longitudinal cross-sectional view taken along line 11-11 of FIG. 6.

Referring to FIG. 11, the partition wall 207 is disposed between the ice making room 201 and the chiller room 202, and the guide duct 207*d* and the damper assembly 200 are mounted inside the partition wall 207.

Specifically, a bottom surface of the partition wall 207 in which the outlet of the guide duct 207*d* is disposed is inclined downward. The communication hole 207*b* passes through the partition wall 207 at a point that is spaced apart from the guide duct 207*d* in the lateral and backward directions. The damper assembly 200 may be mounted inside the communication hole 207*b* to adjust an amount of cool air supplied from the ice making room 201 to the chiller room 202.

As illustrated in the drawing, the partition wall 207 may be provided as a portion of the housing 23 by filling foam into the space between the inner housing 231 and the outer housing 232. Alternatively, the partition wall 207 may be provided as a separate part and coupled to the inside of the inner housing 231.

Figure 12:
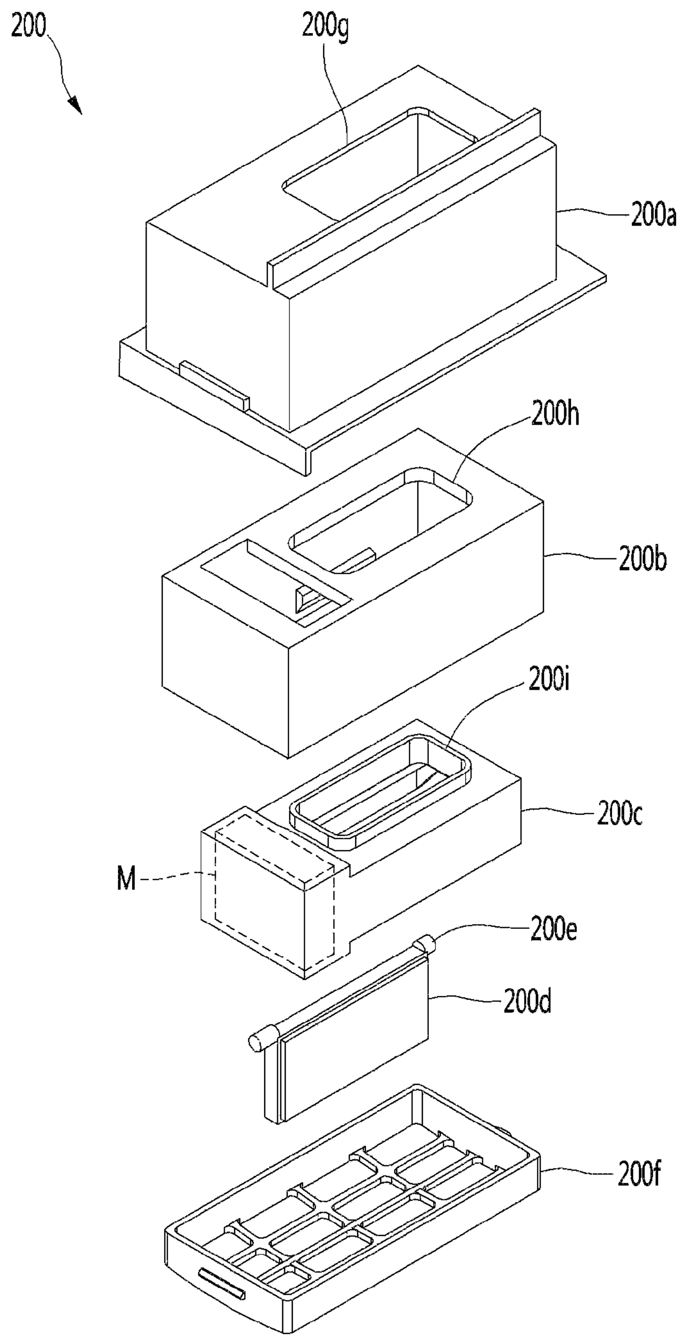
FIG. 12 is an exploded perspective view of a damper assembly installed in a partition wall that separates an ice making room from a chiller room.

FIG. 12 is an exploded perspective view of the damper assembly installed in the partition wall that separates an ice making room from a chiller room.

Referring to FIG. 12, the damper assembly 200 may include an outer box 200*a*, a middle box 200*b*, an inner box 200*c*, a damper 200*d*, and a discharge grille 200*f*.

Specifically, cool air holes 200*g*, 200*h*, and 200*i* corresponding to the communication holes 207*b* may be defined in the outer box 200*a*, the middle box 200*b*, and the inner box 200*c*, respectively. The middle box 200*b* may be an insulation member such as Styrofoam.

The damper 200*d* may be rotatably mounted inside the inner box 200*c* by a damper shaft 200*e* to open and close the cool air hole 200*i* defined in the top surface of the inner box 200*c*. Of course, the damper shaft 200*e* may be connected to a driving motor M that provides rotation force.

The discharge grille 200*f* may be inserted into a lower end of the outer box 200*a* and then coupled to the middle box 200*b*. A grille having a lattice shape may be disposed on the discharge grille 200*f* to prevent foreign substances within the ice making room 201 from being introduced into the chiller room 202. The discharge grille 200*f* may be exposed to the chiller room 202 so that the user or a service man put a hand thereof into the chiller room 202 to separate the discharge grille 200*f* from the chiller room 202. That is, after the discharge grille 200*f* is separated from the chiller room 202, the damper 200*d* may be repaired or replaced.

Hereinafter, a circulation structure of the cool air supplied from the evaporation chamber 116 to the inside of the housing 23 of the main door 22 will be described with reference to the accompanying drawings.

Figure 13:
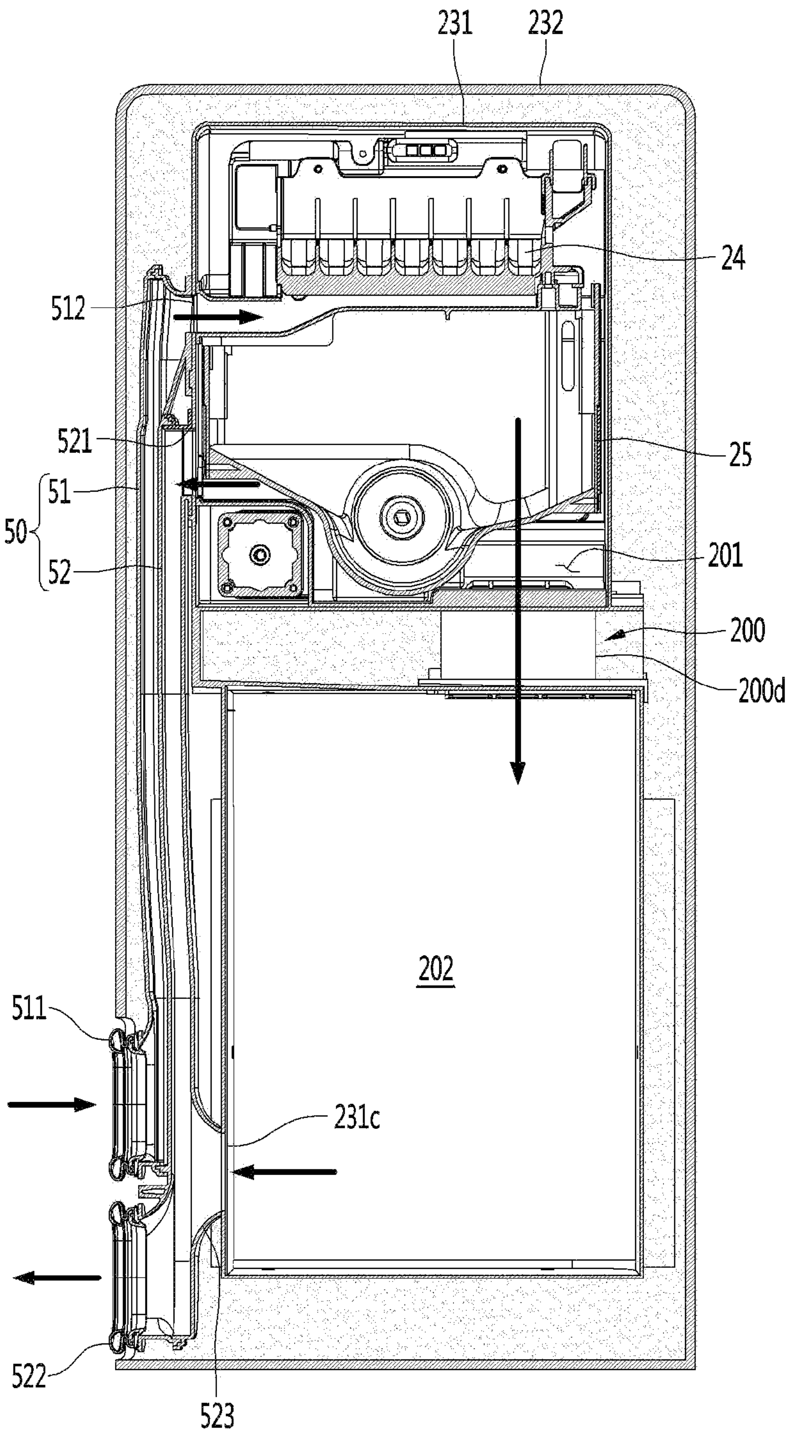
FIG. 13 is a view illustrating a state in which cool air is supplied into and collected from the ice making room and the chiller room, which are provided in the main door.

FIG. 13 is a view illustrating a state in which cool air is supplied into and collected from the ice making room and the chiller room, which are provided in the main door.

Referring to FIG. 13, the cool air of the evaporation chamber 116 is supplied into the ice making room 201 through the cool air supply duct 51. Also, ice is made in the ice maker 24 by using the cool air supplied into the ice making room 201, and ice stored in the ice bin 25 disposed below the ice maker 24 is maintained in a state in which the ice are not melted or clogged.

A portion of the cool air supplied into the ice making room 201 is discharged to the cool air return duct 52 through the ice making room-side cool air discharge hole 231*b*. Also, the rest of the cool air supplied into the ice making room 201 is supplied into the chiller room 202 through the communication hole 207*b* defined in the partition wall 207.

Here, an amount of cool air supplied into the chiller room 202 may be adjusted by an operation of the damper 200*d* that opens and closes the communication hole 207*b*. For example, a temperature sensor may be mounted on a portion of the inside of the chiller room 202. If it is determined that a temperature detected by the temperature sensor is less than a set temperature, the damper 200*d* may operate by a control unit of the refrigerator to close the communication hole 207*b*. Thus, supercooling of the chiller room 202 to a temperature of the ice making room may be prevented.

A heater (not shown) may be buried in a wall constituting the chiller room 202 to operate when the chiller room 202 is supercooled. Particularly, the heater may be buried in a space between a portion of the inner housing 231 and a portion of the outer housing 232, which define the chiller room 202.

The chiller room 202 may be maintained at a temperature that is greater than that of the freezer compartment and less than that of the refrigerating compartment so that the user utilizes the chiller room 202 as a purpose for quickly cooling beverages, alcoholic beverages, or water for a short time. The chiller room 202 may be maintained within a temperature range of about 3 degrees below zero to about 5 degrees below zero.

The cool air supplied to the chiller room 202 cools items received in the chiller room 202 and then is discharged to the cool air return duct 52 through the chiller room-side cool air discharge hole 231*c* defined in the side surface of the chiller room 202.

Here, since the inside of the cool air return duct 52 has a pressure less than that of the chiller room 202, the cool air discharged from the ice making room 201 to flow along the cool air return duct 52 may be prevented from being reintroduced into the chiller room 202.

Figure 14:
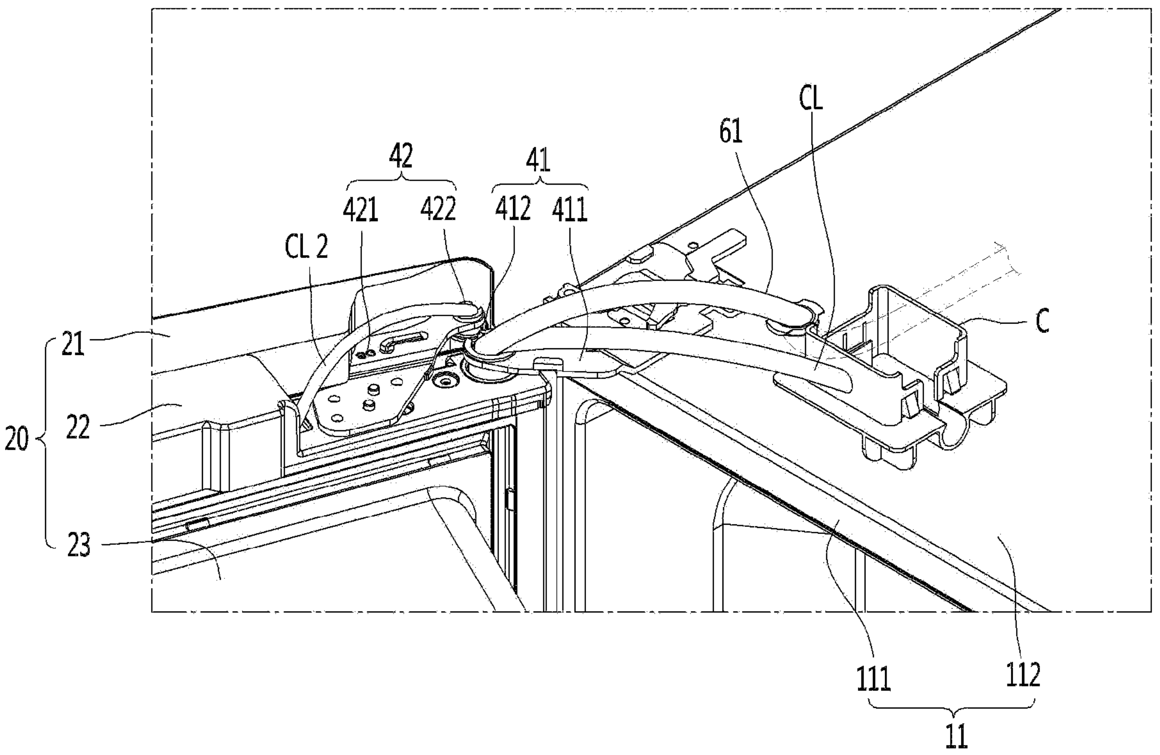
FIGS. 14 and 15 are a partial perspective view and a partial plan view illustrating a connection structure between a water tube and a power cable of the refrigerator according to an embodiment of the present invention, respectively.
Figure 15:
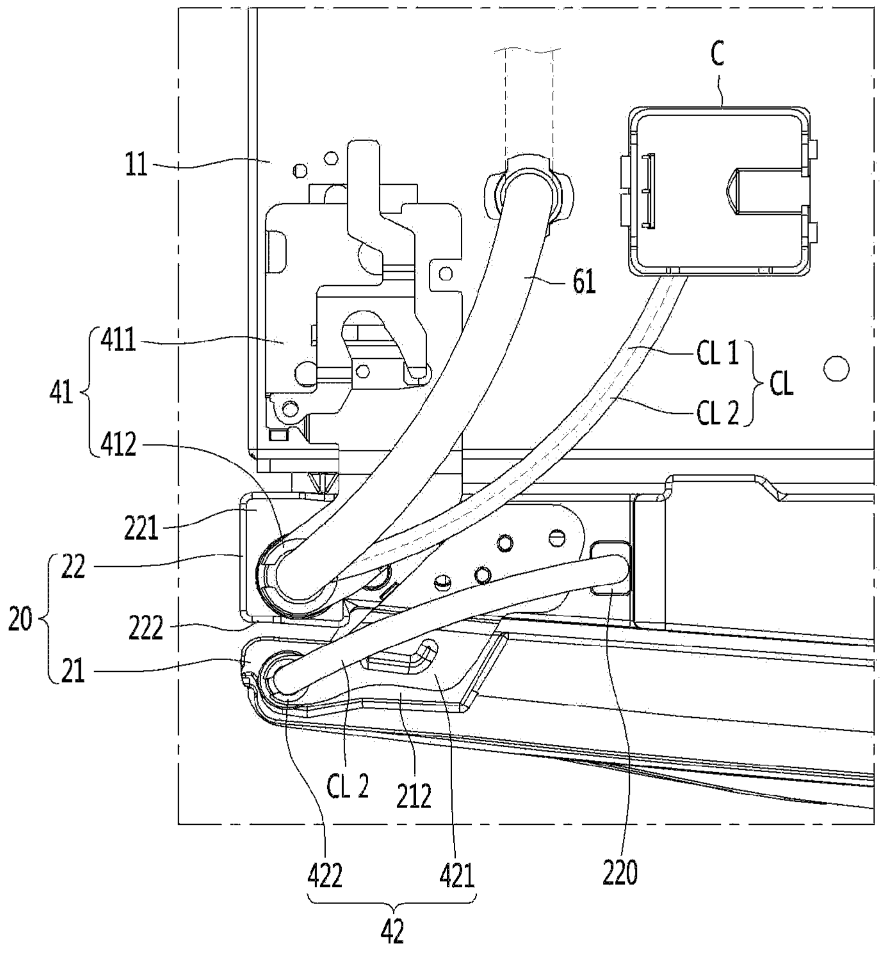

FIGS. 14 and 15 are a partial perspective view and a partial plan view illustrating a connection structure between a water tube and a power cable of the refrigerator according to an embodiment of the present invention, respectively.

Referring to FIGS. 14 and 15, water supplied from the water source is supplied along a main water supply tube 61. The main water supply tube 61 extends along the inside of the top surface of the cabinet 11 and then is exposed to the outside by passing through the top surface of the cabinet 11.

Specifically, the main water supply tube 61 extends along the space between the inner case 111 and the outer case 112, which define the top surface of the cabinet 11, and then is exposed to the outside by passing through the outer case 112 at a point that is close to the front end of the cabinet 11. Also, the main water supply tube 61 exposed to the outside of the cabinet 11 extends into the main door 22 through the main door upper hinge unit 41.

The hinge assembly 40 includes the main door hinge unit and the sub door hinge unit. The main door hinge unit includes the main door upper hinge unit 41 and the main door lower hinge unit. Also, the sub door hinge unit includes the sub door upper hinge unit 42 and the sub door lower hinge unit.

The main door upper hinge unit 41 includes an upper hinge bracket 411 and an upper hinge shaft 412. The upper hinge bracket 411 has one end fixed to the top surface of the cabinet and the other end that further protrudes forward from the front surface of the cabinet 11. The upper hinge shaft 412 extends downward from the other end of the upper hinge bracket 411. The upper hinge shaft 412 has an empty cylindrical shape. Alternatively, the upper hinge shaft 412 may have a circular transverse section or a C shape in which a slit is defined in one side thereof. Also, the upper hinge shaft 412 is inserted into the top surface of the main door 22.

Specifically, a recess part 221 into which the main door upper hinge unit 41 and the sub door upper hinge unit 42 are seated is defined in the top surface of the main door 22. The recess part 221 may be recessed by a predetermined depth from the top surface of the main door 22, and a recessed bottom part may be flat. The recess part 221 may be disposed in the vicinity of an edge of one surface on which the upper hinge units 41 and 42 are seated.

The sub door upper hinge unit 42 includes an upper hinge bracket 421 of which one end is fixed to the top surface of the main door 22, i.e., the recess part 221 and an upper hinge shaft 422 extending downward from the other end of the upper hinge bracket 421.

A stepped part 212 on which the sub door upper hinge unit 42 is seated is also disposed on the top surface of the sub door 21. The stepped part 212 may have a width that is equal to or less than that of the recess part 221. The stepped part 212 may have a flat bottom that is disposed on the same plane as the bottom of the recess part 221. A front end of the stepped part 212 is disposed at a point that is spaced apart backward from the front surface of the sub door 21. Thus, the hinge units 41 and 42 may not be seen from the front surface of the sub door 21.

The upper hinge shaft 412 of the main door upper hinge unit 41 has a diameter greater than that of the upper hinge shaft 422 of the sub door upper hinge unit 42. This is done because the main door upper hinge unit 41 has to support all loads of the main door 22 and the sub door 21, whereas the sub door upper hinge unit 42 is enough to support only the load of the sub door 21.

Each of the upper hinge shafts 312 and 322 is inserted into a position that is closer to the front end than the rear end of each of the main door 22 and the sub door 21. That is to say, a center of the hinge shaft 412 of the main door upper hinge unit 41 is disposed at a point that is lean forward from a position that equally divides a distance between the front end and the rear end of the main door 22. Of course, the hinge shaft 422 of the sub door upper hinge unit 42 may also be disposed at a position that is lean forward from a point that equally divides a distance between the front end and the rear end of the sub door 21.

When a rotation center of the main door 22 approaches the rear end of the main door 22, a trace defined by rotation of the edge of the rear end of the main door 22 approaches the front surface of the cabinet 11 when the main door 22 is opened, and thus, possibility of jamming of the user's hand becomes high. In the same point of view, when the sub door 21 is opened, a trace defined by rotation of the rear end of the sub door 21 approaches the front surface of the main door 22, and thus, the possibility of the jamming of the user's hand becomes high.

Since the hinge shaft 412 of the main door upper hinge unit 41 has a diameter greater than that of the hinge shaft 422 of the sub door upper hinge unit 42, a protrusion 222 may be disposed on the front surface part of the main door 22, which corresponds to a portion in which the hinge shaft 412 of the main door upper hinge unit 41 is inserted.

Also, a cable through hole 220 may be defined in any point of the recess part 221. The cable through hole 220 may be defined in a point that is spaced apart from the sub door upper hinge unit 42.

Also, a main controller C is mounted on the top surface of the cabinet 11, and a cable unit CL extends from the main controller C. The cable unit CL is inserted into the upper hinge shaft 412 of the main door upper hinge unit 41.

A main door controller for controlling operations of the temperature sensor (not shown) and the heater (not shown), which are installed in the ice maker 24 and the chiller room 202 within the ice making room 201 may be provided on the main door 22.

The control panel 300 for controlling an operation of the dispenser 30 and an operation condition of the refrigerator may be provided on the sub door 21.

The cable unit CL includes a main door cable unit CL1 (or a first door cable unit) extending from the main controller C up to the main door 22 and a sub door cable unit CL2 (or a second door cable unit) extending from the main controller C up to the sub door 21 via the main door 22. The main door cable unit CL1 and the sub door cable unit CL2 may be inserted into a single cable hose.

The cable unit CL extending from the main controller C is inserted into the upper hinge shaft 412 of the main door upper hinge unit 41 to extend into the main door 22. Since the upper hinge shaft 412 of the main door upper hinge unit 41 has an inner diameter greater than that of the upper hinge shaft 422 of the sub door upper hinge unit 42, all the main water supply tube 61 and the cable unit CL may be inserted into the upper hinge shaft 412.

The cable unit CL may be divided into the main door cable unit CL1 and the sub door cable unit CL2 in the main door 22. The main door cable unit CL1 extends to a controller (not shown) provided in the main door 22. The sub door cable unit CL2 is taken again out of the main door 2 through the cable through hole 220 defined in the top surface of the main door 22.

The sub door cable unit CL taken out through the cable through hole 220 is inserted into the upper hinge shaft 422 of the sub door upper hinge unit 42. Since the upper hinge shaft 422 has a relatively less diameter, only the second sub cable unit CL1 may be inserted into the upper hinge shaft 422.

Figure 16:
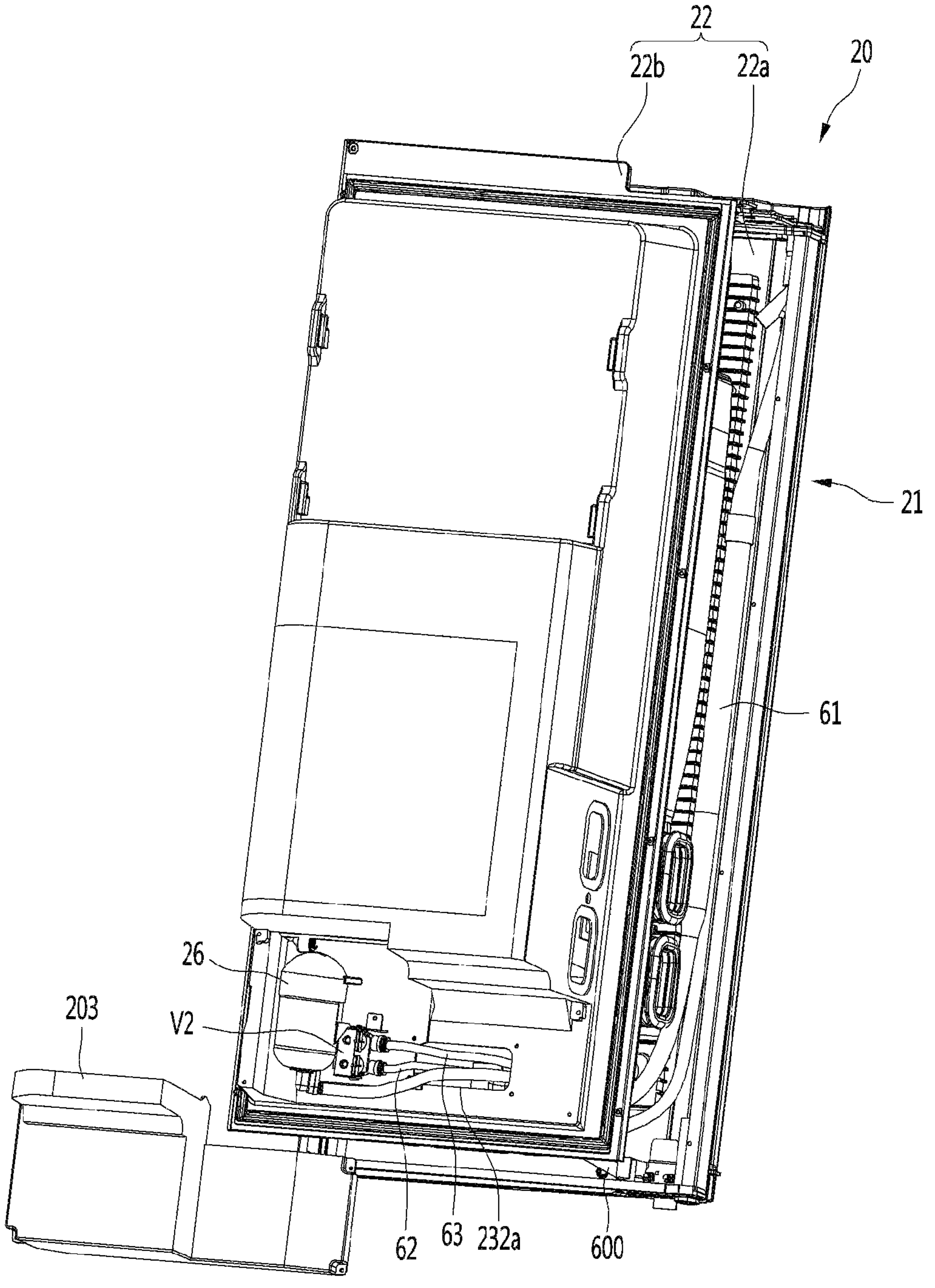
FIG. 16 is a rear perspective view of the door-in-door assembly according to an embodiment of the present invention.
Figure 17:
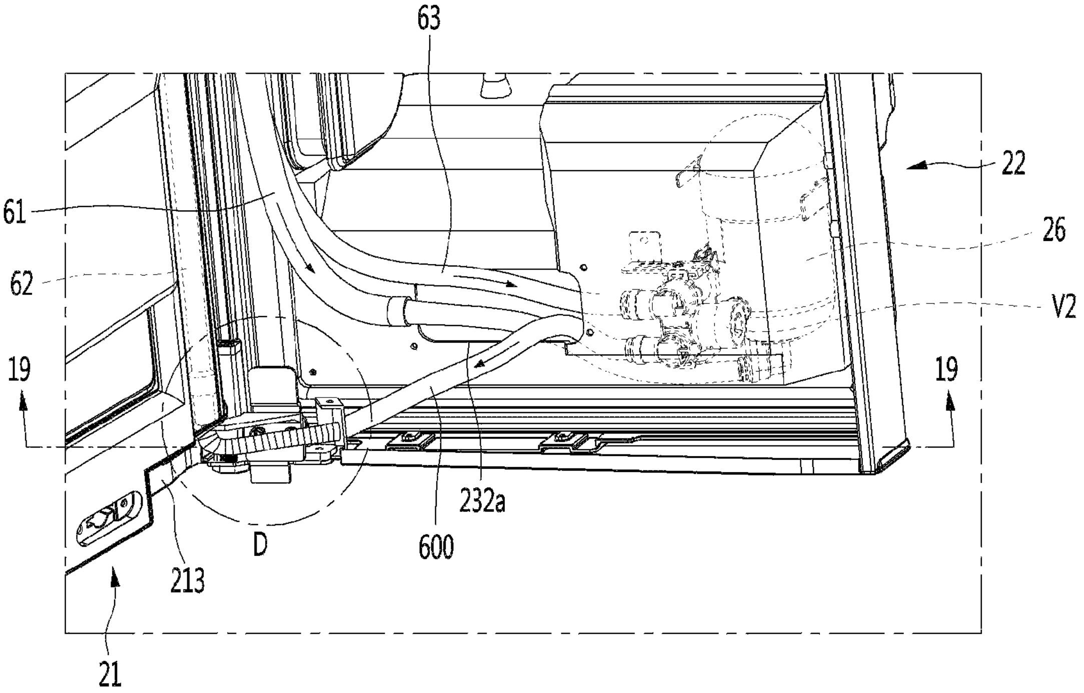
FIG. 17 is a front partial perspective view of the main door.
Figure 18:
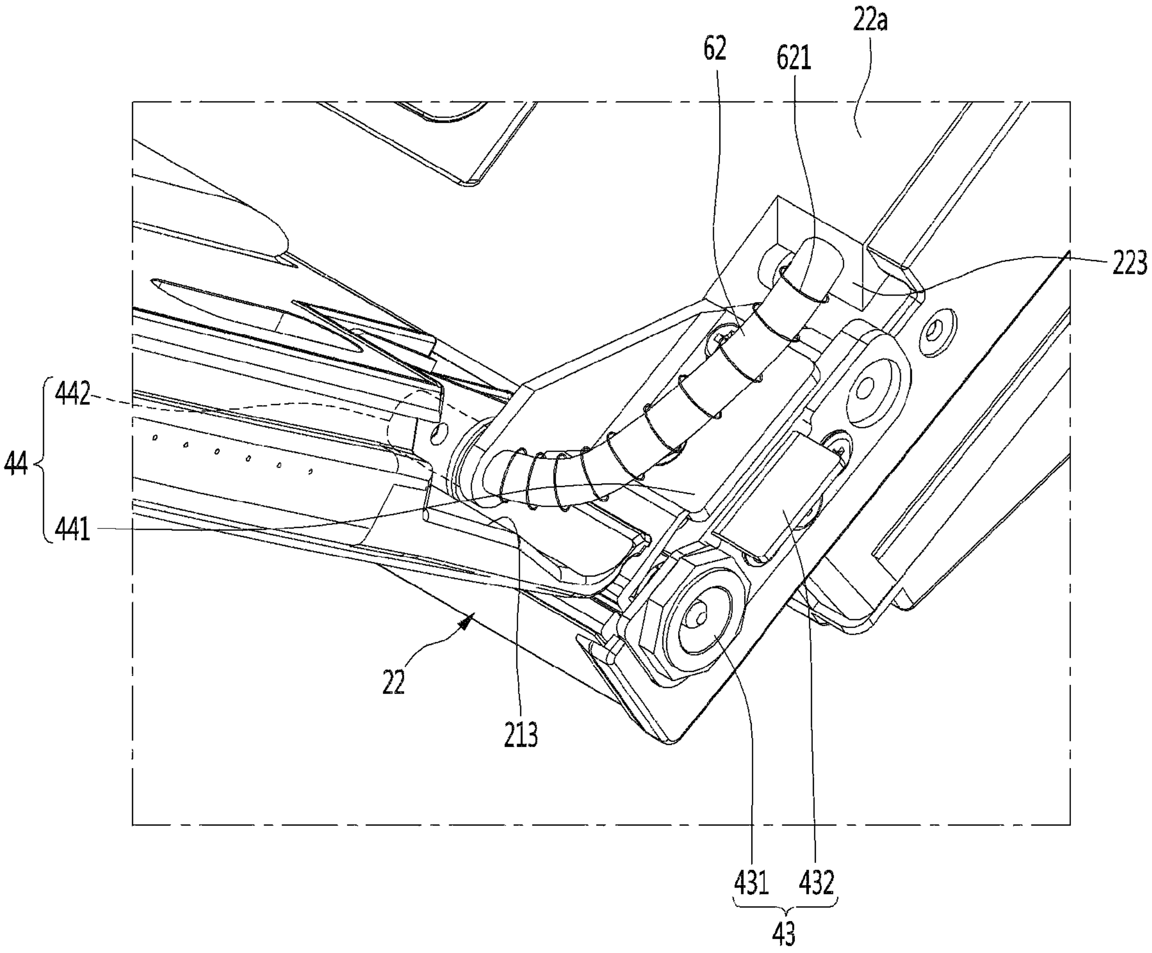
FIG. 18 is an enlarged perspective view of a portion D of FIG. 17.
Figure 19:
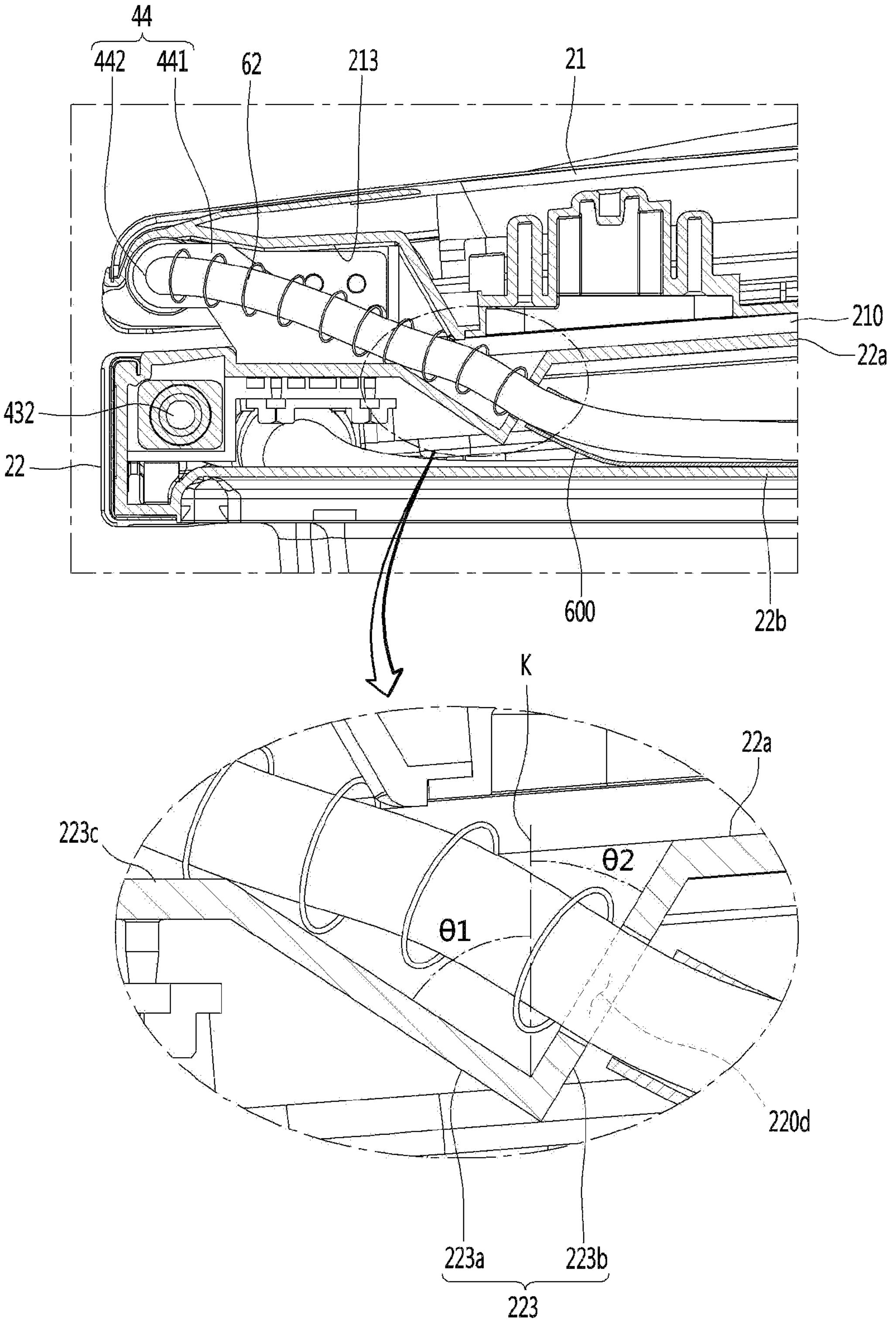
FIG. 19 is a cross-sectional view taken along line 19-19 of FIG. 17.

FIG. 16 is a rear perspective view of the door-in-door assembly according to an embodiment of the present invention, FIG. 17 is a front partial perspective view of the main door, FIG. 18 is an enlarged perspective view of a portion D of FIG. 17, and FIG. 19 is a cross-sectional view taken along line 19-19 of FIG. 17.

Referring to FIGS. 16 to 19, the main water supply tube 61 inserted through the upper hinge shaft 412 of the main door upper hinge unit 41 extends downward along the edge of the side surface of the main door 22.

Specifically, the main door 22 may include a front part 22*a* defining the front surface thereof and a rear part 22*b* defining the back surface thereof. The door duct assembly 50 and the water supply tubes may be accommodated in a space defined between the front part 22*a* and the rear part 22*b*. Also, a foamed insulation material is filled into the space between the front part 22*a* and the rear part 22*b*.

The inner housing 231 constituting the housing 23 may be a portion of the front part 22*a*, and the outer housing 232 may be a portion of the rear part 22*b*.

Specifically, the water tank 26 is mounted on the lower end of the main door 22, and the main water supply tube 61 is connected to the water tank 26. The water tank 26 may be disposed at a point that is close to a side surface opposite to the side surface of the main door 22 from which the main water supply tube 61 extends. That is, the water tank 26 may be disposed at a position that is close to a side surface opposite to the side surface in which the rotation center is defined.

Specifically, a space for accommodating the water tank 26, i.e., a water tank accommodation part 203*a* is defined in a lower end of a back surface of the rear part 22*b* constituting the main door 22, i.e., a point corresponding to a lower side of the outer housing 232 defining the chiller room 202. The water tank 26 is accommodated into the water tank accommodation part, and the water tank accommodation part is covered by the water tank cover 203.

An opening 232*a* is defined in a portion of the rear part 22*b*, which corresponds to a side of the water tank accommodation part. Thus, the main water supply tube 61 may be connected to the water tank 26. Also, the opening 232*a* may also be covered by the water tank cover 203 and thus not be exposed to the outside. The main water supply tube 61 is connected to an inlet of the water tank 26, and a switching valve V2 is mounted on an outlet of the water tank 26. Since only the water tank cover 203 is opened so as to repair the water tank 26 and the switching valve V2, it is unnecessary to disassemble the main door 22.

The main water supply tube 61 passes through the upper hinge shaft 412 of the main door upper hinge unit 41 to extend up to the lower end of the main door 22 and then is bent. The main water supply tube 61 passes through the opening 232*a* and is connected to the inlet of the water tank 26.

The switching valve V2 may be a three-way valve. A dispenser water supply tube 62 may be connected to one of two outlets, and an ice maker water supply tube 63 may be connected to the other outlet Specifically, the ice maker water supply tube 63 passes through the opening 232*a* to extend up to the ice maker 24 along the edge of the side surface of the main door 22. That is, all the ice maker water supply tube 63 and the main water supply tube 61 extend along an edge of a hinge-side side surface of the main door 22.

The dispenser water supply tube 62 extends from the outlet of the switching valve V2 to pass through the opening 232*a*. Then, the dispenser water supply tube 62 passes through the front part 22*a* and is exposed to the lower end of the front surface of the main door 22.

Although the housing 23 constituting the ice making room 201 and the chiller room 202 is integrated with the main door 22 as one body in the current embodiment, the housing 23 may be provided as a separate component and then mounted on the main door.

As illustrated in FIGS. 17 and 18, a stepped part 213 is disposed on the bottom surface of the sub door 21. The stepped part 213 is stepped upward from a point that is spaced apart backward from the front surface of the sub door 21, like the stepped part 212 disposed on the top surface of the sub door 21.

Specifically, the main door lower hinge unit 43 constituting the main door upper hinge unit includes a lower hinge bracket 431 and a lower hinge shaft 432. The sub door lower hinge unit 44 constituting the sub door hinge unit includes a lower hinge bracket 441 and a lower hinge shaft 442. The lower hinge shaft 432 may have the same diameter as the upper hinge shaft 422.

More specifically, the lower hinge bracket 431 of the main door lower hinge unit 43 is fixed to the front surface of the cabinet 11, and the lower hinge shaft 432 is inserted into the edge of the bottom surface of the main door 22. An auto closing module (not shown) is provided in the lower hinge shaft 432 to automatically close the main door 22 when the main door 22 is opened at an angle less than about 90 degrees.

The lower hinge bracket 441 constituting the sub door lower hinge unit 44 has one end fixed to the front surface of the main door 22 and the other end in which the lower hinge shaft 442 is disposed. The lower hinge bracket 441 may include a vertical part fixed to the front surface of the main door 22, i.e., the lower end of the front surface of the front part 22*a* and a horizontal part horizontally bent forward from an upper end of the vertical part to extend. The lower hinge shaft 442 extends upward from a front end of the horizontal part, and the lower hinge shaft 442 has an empty cylindrical shape.

The vertical part of the lower hinge bracket 441 is fixed to a seat part disposed on the front surface of the main door 22. The lower hinge shaft 442 passes through a top surface of the stepped part 213 and is inserted into the sub door 21. A bracket member made of a metal material may be mounted on the top surface of the stepped part 213. The lower hinge shaft 442 may pass through the bracket member and then pass through the top surface of the stepped part 213 and be inserted into the sub door 21.

A guide groove 223 for guiding the dispenser water supply tube 62 is recessed and defined in a lower portion of the front part 22*a* defining the front surface of the main door 22. A recess surface 223*c* that is further recessed than other portions may be designed to be defined in the front surface of the main door 22 to which the vertical part of the lower hinge bracket 441 is fixed.

The dispenser water supply tube 62 extending from the switching valve V is inserted into the lower hinge shaft 442 of the sub door lower hinge unit 44 and then led into the sub door 21. Then, the dispenser water supply tube 62 led into the sub door 21 extends upward along the edge of the side surface of the sub door 21 to extend up to the water faucet 35 of the dispenser 30.

Specifically, the guide groove 223 may be provided to minimize possibility of bending of the dispenser water supply tube 62 while the dispenser water supply tube 62 passes through the front surface of the main door 22 to extend up to the lower hinge shaft 442.

A folding prevention member 621 may be disposed around an outer circumferential surface of the dispenser water supply tube 62 extending up to the lower hinge shaft 442 by passing through the front surface of the main door 22. The folding prevention member 621 may be a spring member that has predetermined elasticity and is wound around the circumferential surface of the dispenser water supply tube 62. The folding prevention member 621 may be a plastic tube member having predetermined rigidity.

As illustrated in FIG. 19, a guide groove 223 may be recessed in the front part 22*a* defining the front surface of the main door 22.

Specifically, the guide groove 223 includes a first recess surface 223*a* inclined at a predetermined angle with respect to the front surface of the front part 22*a* and a second recess surface 223*b* inclined in a direction opposite to the first recess surface 223*a*. The first recess surface 223*a* and the second recess surface 223*b* may form a V-shaped recess part having a predetermined angle θ therebetween.

More specifically, the angle θ defined by the first recess surface 223*a* and the second recess surface 223*b* may be defined as the sum of a first inclination angle θ1 defined by a vertical surface k, which passes through a point at which the first recess surface 223*a* and the second recess surface 223*b* contact each other and is parallel to the side surface of the main door 22, and the first recess surface 223*a* and a second inclination angle θ2 defined by the second recess surface 223*b* and the vertical surface k. The first inclination angle θ1 may be greater than the second inclination angle θ2.

When the second recess surface 223*b* is parallel to the vertical surface k, the dispenser water supply tube 62 may pass through the guide groove 223 to extend up to the lower hinge shaft 442 in a bent state. To minimize this possibility, the second recess surface 223*b* may be inclined somewhat.

A tube through hole 220*d* may be defined in the second recess surface 223*b*. Thus, the dispenser water supply tube 62 extending from the switching valve V2 may extend up to the lower hinge shaft 442.

A portion of the dispenser water supply tube 62 extending from the switching valve V2 up to the tube through hole 220*d* may pass through a guide pipe 600 so as to be minimized in bending thereof. An end of the guide pipe 600, which corresponds to a lead-out side of the dispenser water supply tube 62, may be fixed to a back surface of the second recess surface 223*b*.

Figure 20:
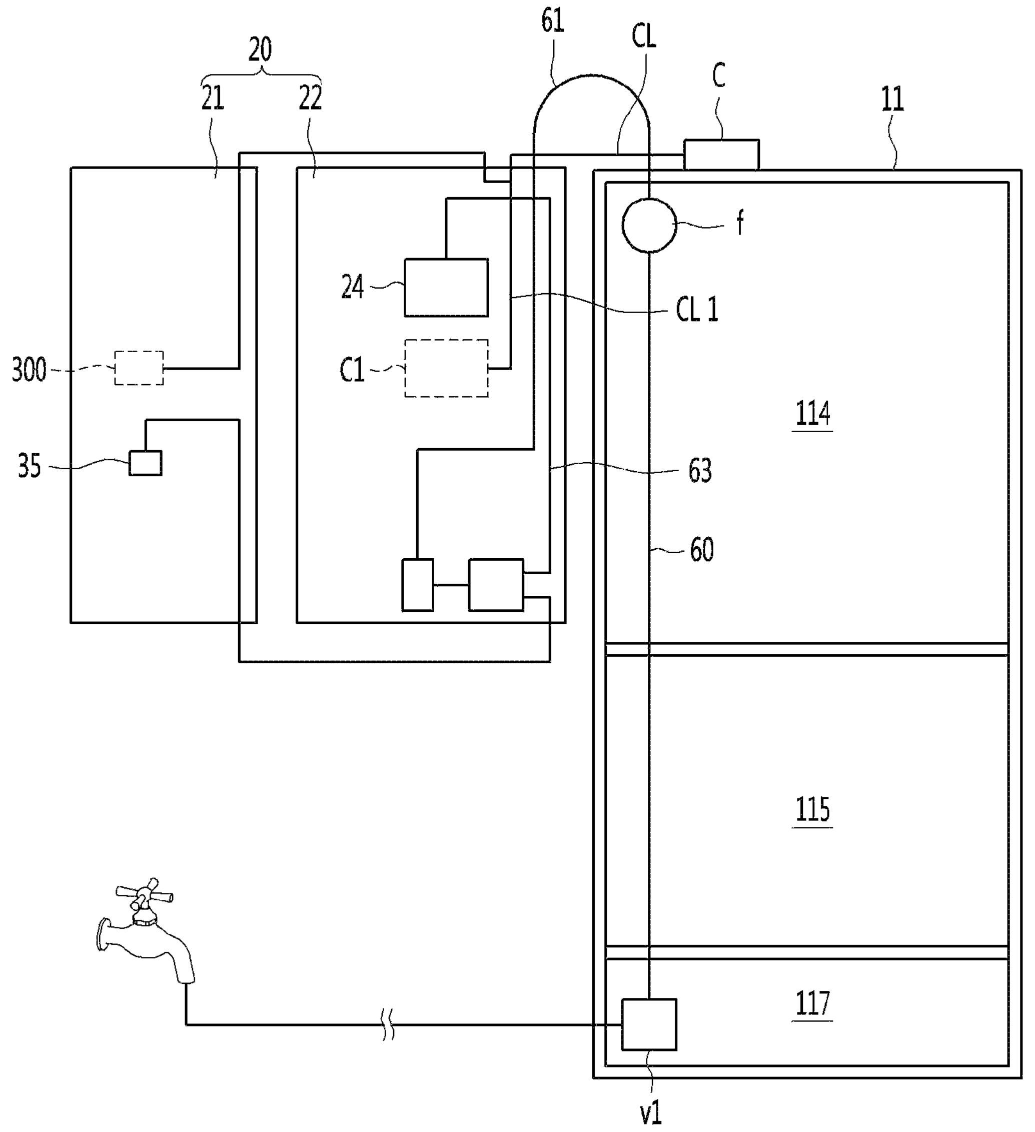
FIG. 20 is a view illustrating an arranged structure of a water supply tube and a cable of the refrigerator according to an embodiment of the present invention.

FIG. 20 is a view illustrating an arranged structure of a water supply tube and a cable of the refrigerator according to an embodiment of the present invention.

Referring to FIG. 20, a main valve v1 is mounted at any point of a water source tube 60 extending from an external water surface such as a faucet. The main valve v1 may be installed in the machine room 117 of the refrigerator 10. The main valve v1 may be a pilot valve.

Specifically, the water source tube 60 extending from an outlet of the main valve v1 may extend upward along the inside of the rear wall of the cabinet 11 or the outer circumferential surface of the rear wall of the cabinet 11. Also, the water source tube 60 may pass through the inner case 111 of the cabinet 11 defining the rear wall of the refrigerating compartment 114 and be connected to a filter assembly f mounted inside the refrigerating compartment 114.

The main water supply tube 61 extending from an outlet of the filter assembly f passes through the top surface of the cabinet 11 and is exposed to the outside. Then, the main water supply tube 61 is led into the main door 22 through the upper hinge shaft 412 of the main door upper hinge unit 41. The main water supply tube 61 led into the main door 22 is connected to the inlet of the water tank 26. The dispenser water supply tube 62 branched from the switching valve V2 passes through the front surface of the lower end of the main door 22 and is exposed to the outside. Then, the dispenser water supply tube 62 is led into the sub door 21 through the lower hinge shaft 442 of the sub door lower hinge unit 44. The dispenser water supply tube 62 led into the sub door 21 extends up to the water faucet 35 disposed on the top surface of the dispenser 30.

The ice maker water supply tube 63 branched from the switching valve V2 extends up to a water supply part of the ice maker along the side surface of the main door 22.

The cable unit CL extending from the main controller C is led into the main door 22 through the upper hinge shaft 412 of the main door upper hinge unit 41. The main door cable unit CL1 constituting the cable unit CL is connected to a main door controller Cl provided in the main door 22.

The sub door cable unit CL2 constituting the cable unit CL passes through the top surface of the main door 22 and is exposed to the outside. Then, the cable unit CL is led into the sub door 21 through the upper hinge shaft 422 of the sub door upper hinge unit 42. The sub door cable unit LC2 led into the sub door 21 may be connected to the control panel provided on the sub door 21.

As described above, the water supply tube and the power cable, which extend from the cabinet 11, may be respectively led into the doors through the hinge shafts constituting the door hinges, and the plurality of water supply tubes may be divided and led into the upper hinge shaft and the lower hinge shaft. Thus, the hinge according to the related art may be used as it is without changing in diameter.

Figure 21:
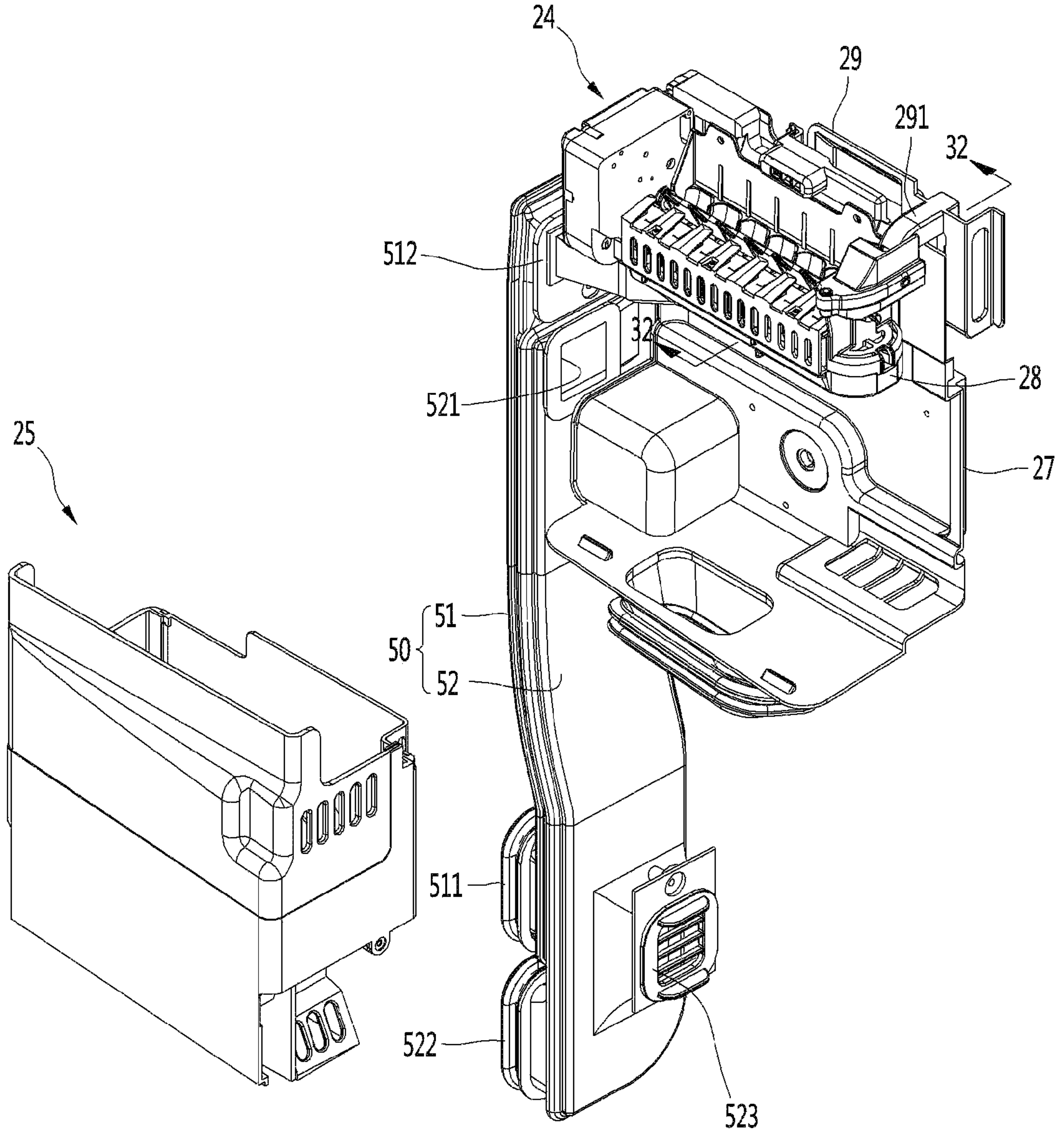
FIG. 21 is a perspective view illustrating a connection structure between an ice making assembly and the door duct assembly according to an embodiment of the present invention.
Figure 22:
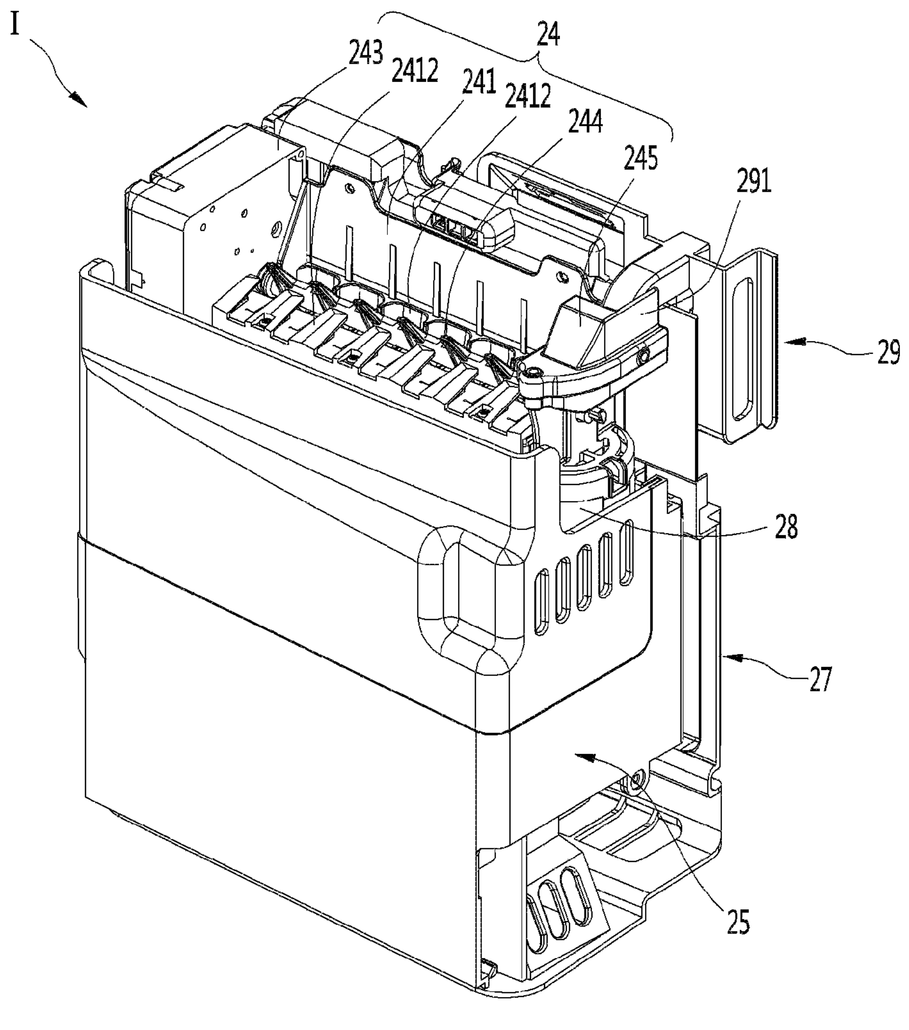
FIG. 22 is a perspective view of the ice making assembly according to an embodiment of the prevent invention.

FIG. 21 is a perspective view illustrating a connection structure between an ice making assembly and the door duct assembly according to an embodiment of the present invention, and FIG. 22 is a perspective view of the ice making assembly according to an embodiment of the prevent invention.

Referring to FIGS. 21 and 22, an ice making assembly I according to an embodiment of the present invention is provided a DID door assembly. Particularly, the ice making assembly I may be installed in the ice making room 201 provided in the upper side of the main door 22.

Specifically, supply of cool air into the ice making room 201 may be performed through the door duct assembly 50 installed in the side surface of the main door 22. The door duct assembly 50 is connected to a supply duct 181 and the return duct 182, which are buried in the side surface of the cabinet 11, to perform circulation of cool air between the evaporation chamber 116, the ice making room 201, and the freezer compartment 115.

The ice making assembly I may include the ice maker 24 making ice, the cool air guide duct 28 mounted on the bottom surface of the ice maker 24 to spread the cool air supplied from the cool air supply duct 51 toward the ice maker 24, the ice bin storing the ice made in the ice maker 24, and an ice discharge adjustment module 250 installed in the ice bin 25 to adjust a shape of the discharged ice.

A mounting plate 27 is mounted inside the ice making room 201. The mounting plate 27 is closely attached to the bottom and the rear wall of the ice making room 201. The ice maker 24 is fixed to an upper portion of the mounting plate 27, and the ice bin 25 is separably disposed below the ice maker 24.

A fixing bracket 29 may be disposed on a rear side of an upper end of the mounting plate 27. A water supply hose guide part 291 guiding an outlet of the ice maker water supply tube 63 to the ice maker 24 may be disposed on the fixing bracket 29. The fixing bracket 29 is fixed and mounted on the outer rear surface of the ice making room 201. That is, a hole covered by the fixing bracket 29 and a hole through which the water supply hose guide part 291 passes are defined in the rear surface of the ice making room 201. The fixing bracket 29 may be fixed and mounted in the holes.

Figure 23:
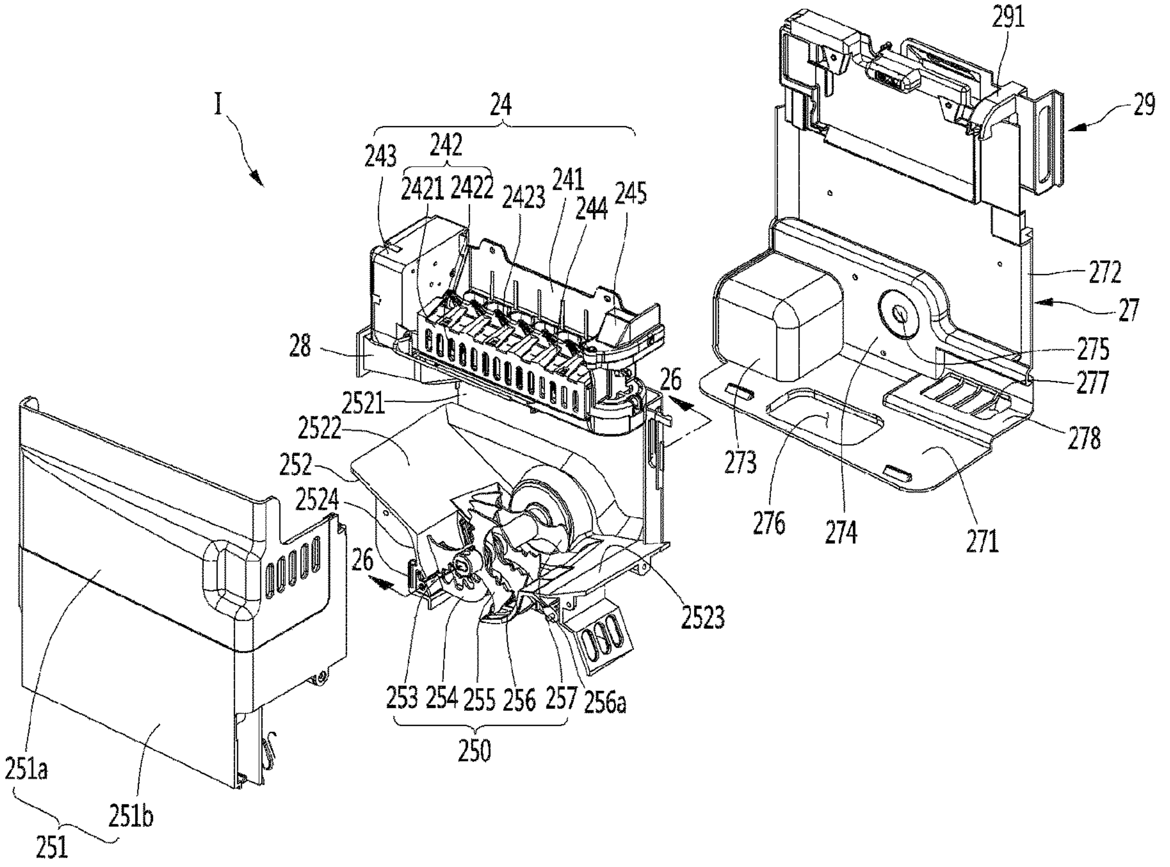
FIG. 23 is an exploded perspective view of the ice making assembly.
Figure 24:
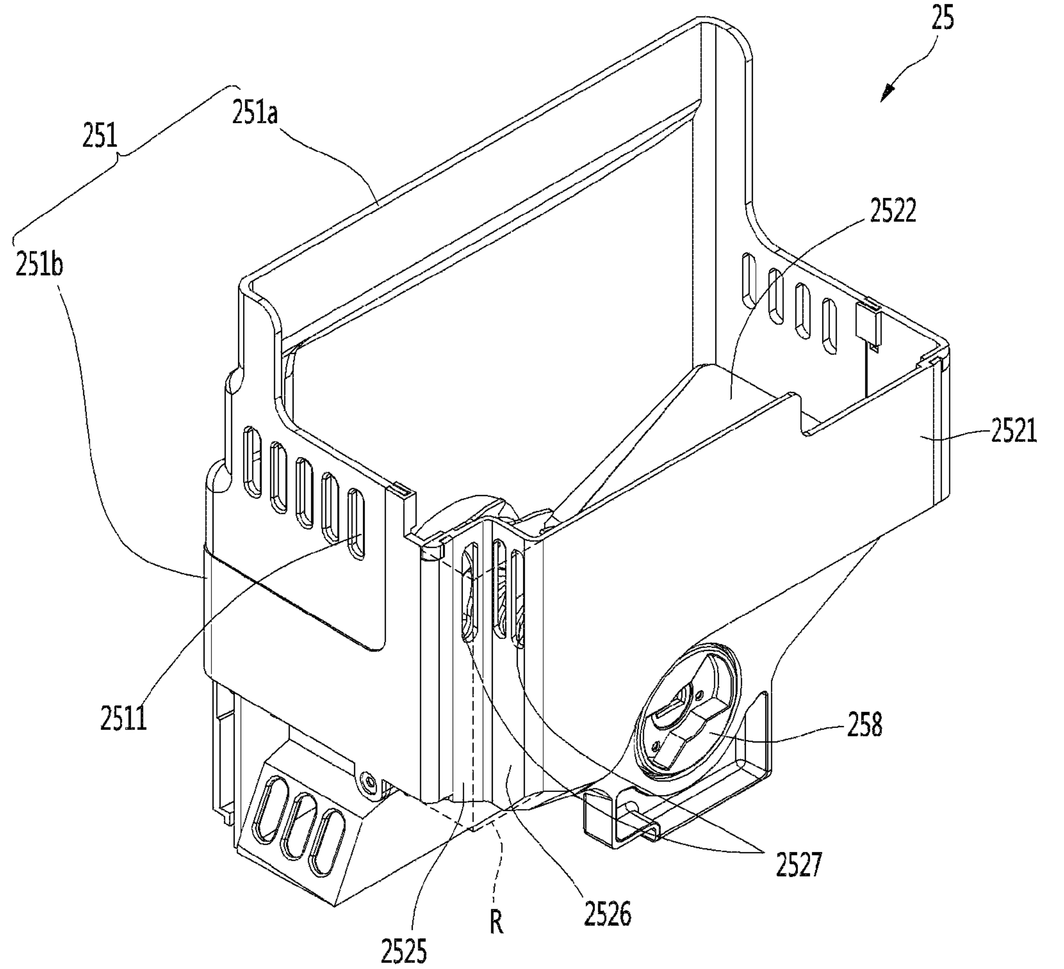
FIG. 24 is a rear perspective view of an ice bin constituting the ice making assembly.
Figure 25A:
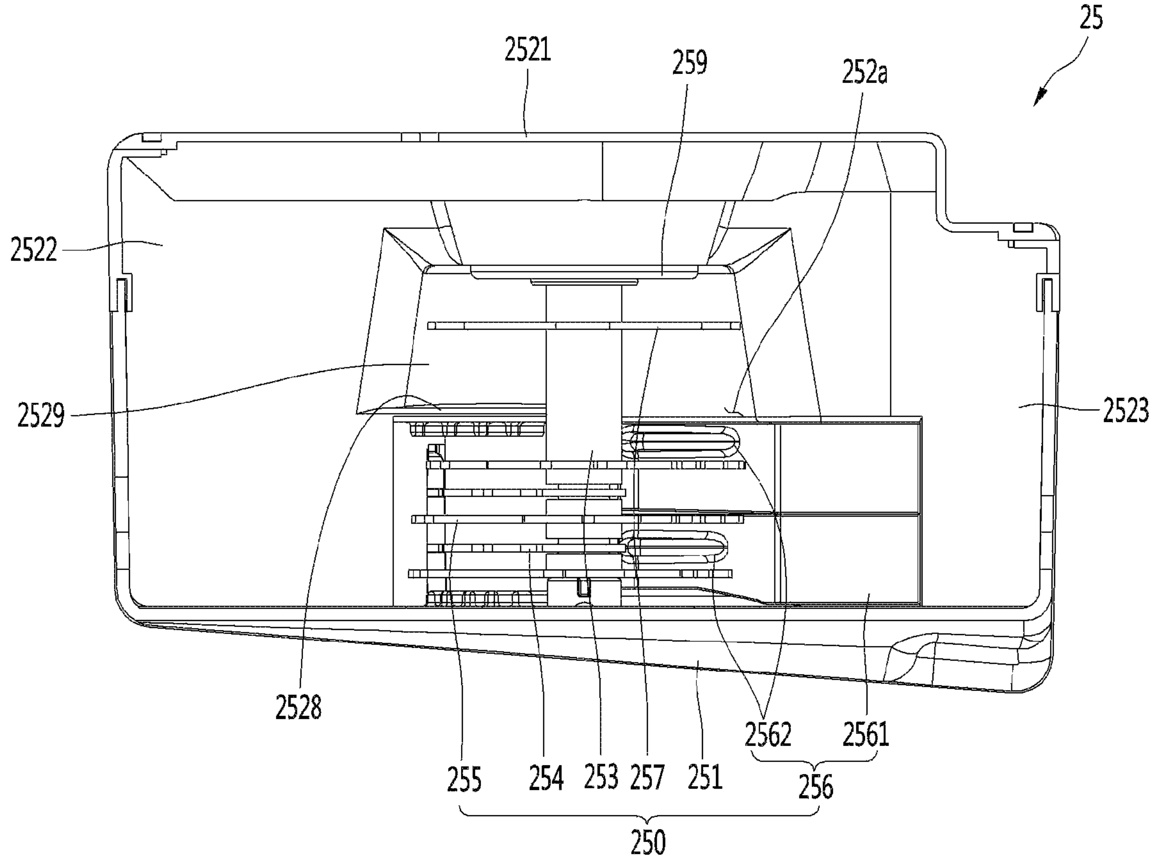
FIG. 25A is a plan view of the ice bin.
Figure 25B:
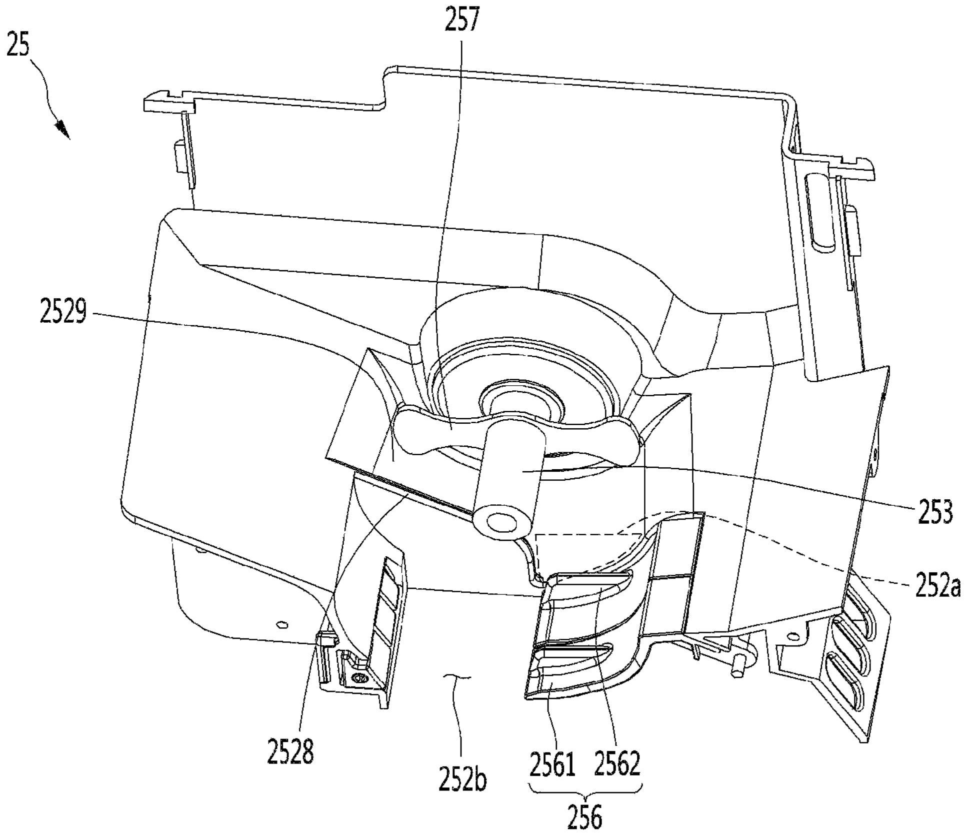
FIG. 25B is an enlarged perspective view illustrating the inside of the ice bin.
Figure 25C:
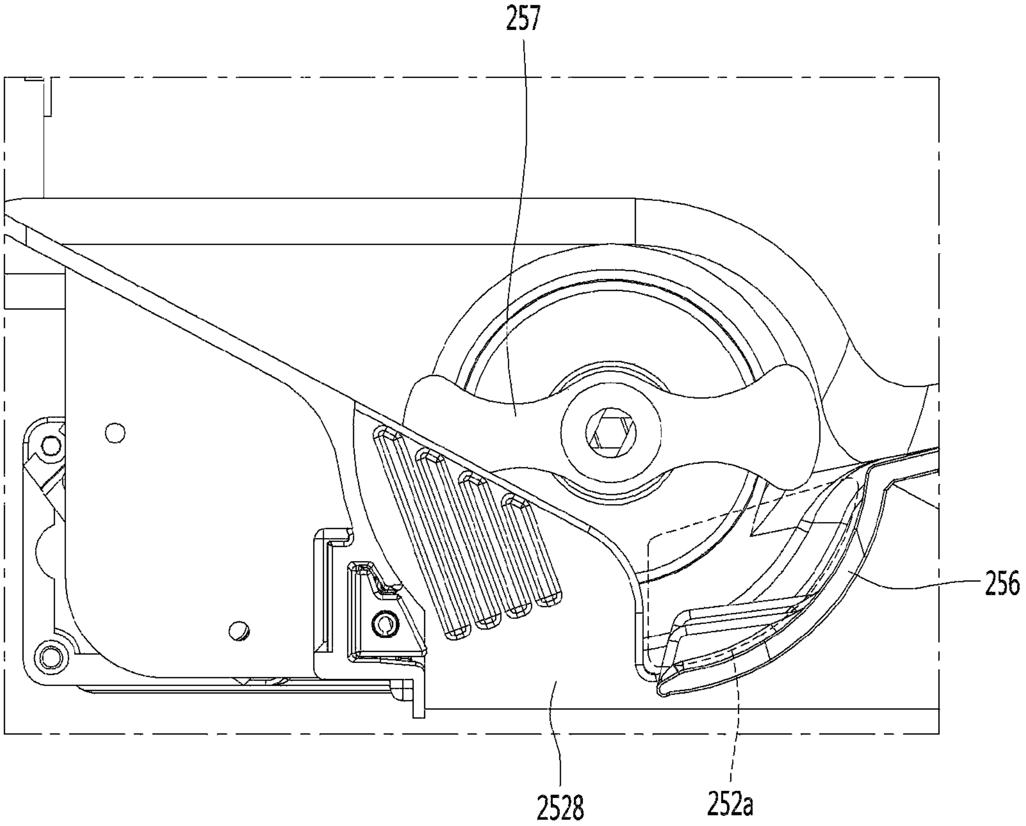
FIG. 25C is a front view illustrating the inside of the ice bin.
Figure 26:
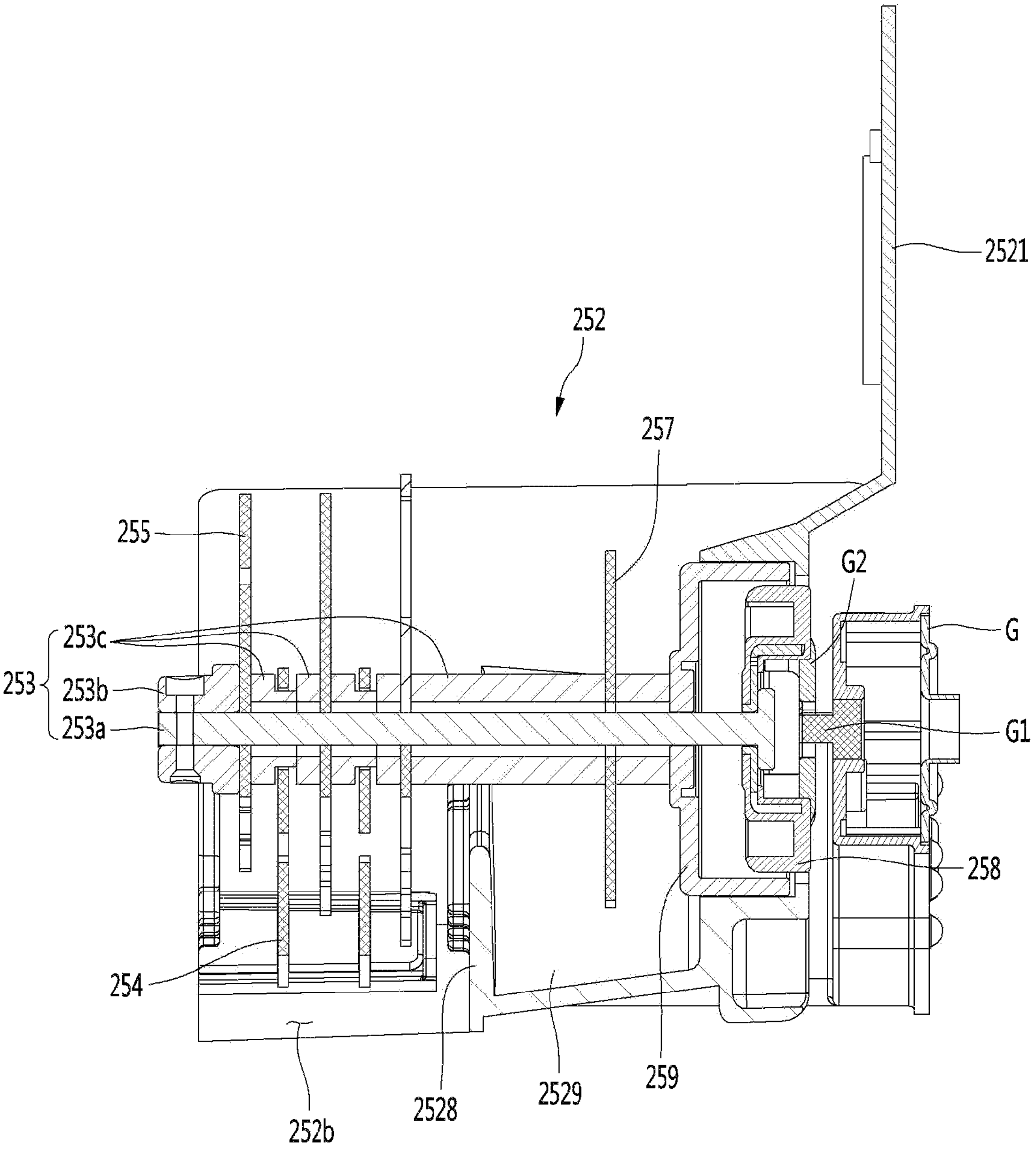
FIG. 26 is a longitudinal cross-sectional view taken along line 26-26 of FIG. 23.

FIG. 23 is an exploded perspective view of the ice making assembly, FIG. 24 is a rear perspective view of an ice bin constituting the ice making assembly, FIG. 25A is a plan view of the ice bin, FIG. 25B is an enlarged perspective view illustrating the inside of the ice bin, FIG. 25C is a front view illustrating the inside of the ice bin, and FIG. 26 is a longitudinal cross-sectional view taken along line 26-26 of FIG. 23.

Each of components constituting the ice making assembly will be described with reference to FIGS. 23 to 26.

First, the mounting plate 27 will be described.

When the ice maker 24 is directly fixed and mounted on the rear surface of the ice making room 201, the wall defining the ice making room 201 may be bent in an uneven shape by heat while the insulation material is filled into the main door 22. As a result, the ice maker may not be mounted at a regular position, and also, the discharge hole of the water supply tube connected to the ice maker may not be disposed at a regular position.

To solve the above-described limitations, after the insulation material is completely foamed into the main door 22, the mounting plate 27 is mounted on the wall of the ice making room 201, and then, the ice maker 24 is mounted on the mounting plate 27.

In addition, since the mounting plate 27 is provided, a blade motor (that will be described later) and a gear assembly (that will be described later) may be hidden behind the mounting plate 27. Thus, although the ice bin 25 is separated, the blade motor and the gear assembly are not exposed to the outside.

Specifically, the mounting plate 27 includes a bottom part 271 disposed on the bottom of the ice making room 201 and a rear surface part 272 bent upward from a rear end of the bottom part 271 to extend and then closely attached to the rear wall of the ice making room 201.

An ice discharge hole 276 is defined in a center of a front end of the bottom part 271 to communicate with the cool air discharge hole 277 defined in the bottom of the ice making room 201.

Also, a stepped part 278 is disposed on a rear edge of the bottom part 271, and the cool air discharge hole 277 is defined in the stepped part 278. The cool air discharge hole 277 communicates with the communication hole 207*b* defined in the partition wall 207.

The stepped part 278 may protrude upward from the bottom part 271 to prevent ice pieces dropping onto the bottom part 271 or water generated by melted ice from being introduced into the cool air discharge hole 277.

A blade motor cover part 273 protrudes from an edge portion at which the bottom part 271 and the rear surface part 272 contact each other. The blade motor cover part 273 is disposed on an edge of a side surface opposite to the cool air discharge hole 277. That is, when the blade motor cover part 273 is disposed on one side of the left and right edges of the mounting plate 27, the cool air discharge hole 277 may be defined in the other side of the left and right edges. Thus, a portion of cool air supplied to the ice making room 201 may be smoothly supplied to the chiller room 202 through the communication hole 207*b*.

A gear accommodation part 274 into which the gear assembly is accommodated is defined in the rear surface part 272. The gear accommodation part 274 slightly protrudes forward from the configuration of the gear assembly. A gear shaft hole 275 through which a gear shaft passes is defined in any point of the gear accommodation part 274.

The ice maker 24 is mounted on an upper end of a front surface of the mounting plate 27. Specifically, the ice maker 24 includes an ice tray 241 in which a plurality of cells 2412 for making ice are provided, an ejector 244 provided above the ice tray 241 to eject the ice made in the cells 2412, an ice separating motor 243 mounted on one surface (a left surface in FIG. 22) of the ice tray 241 to rotate the ejector 244, a water supply part 245 disposed above the other surface (a right surface in FIG. 22) of the ice tray 241, and an ice separating guide 242 (or called a tray cover) covering a portion or entire surface of the top surface of the ice tray 241.

The ice separating guide 242 includes a top surface part 2423 extending from a front side of the ejector 244 to a front end of the ice tray 241 and a front surface part 2421 bent from an end of the top surface part 2423 to cover an entire surface of the ice tray 241. A plurality of cool air holes 2422 may be defined in the front surface part 2421.

The front surface part 2421 is spaced apart from the front surface of the ice tray 241, and the top surface part 2423 is a surface along which the ice ejected by the ejector 244 is slid.

The cool air guide duct 28 is fixed to a bottom surface of the ice tray 241. Specifically, the cool air discharge hole 512 defined in the upper end of the cool air supply duct 51 constituting the door duct assembly 50 is connected to the cool air inflow hole 231*a* defined in the side surface of the ice making room 201. A suction hole of the cool air guide duct 28 is closely attached to the cool air inflow hole 231*a* within the ice making room 201.

In the related art, the cool air guide duct 28 for guiding the cool air to the ice maker is disposed above the ice maker 24. The cool air introduced to the side surface of the ice making room 201 through the cool air supply duct 51 flows to a side surface opposite to the ice making room 201 and then is bent to a rear side of the ice maker 24. Then, the cool air collides with the rear surface part 272 of the mounting plate 27 to descend to a lower side of the ice making room 201 and then flows again to a front side of the ice making room 201.

When the cool air guide duct 28 is disposed above the ice maker 24, the ice maker 24 has to be designed so that a vertical width between the top surface of the ice making room 201 and the ice maker 24 is greater than a height of the cool air guide duct 28. As a result, it is limited to increase a height of the ice bin 25. Particularly, in the structure in which the separate chiller room is added to the lower side of the ice making room, it is very disadvantageous that the cool air guide duct 28 is disposed above the ice maker 24.

The ice bin 25 is mounted below the cool air guide duct 28. Here, the ice bin 25 is separable from the ice making room 201.

Specifically, the ice bin 25 includes a case and the ice discharge adjustment module 250 installed in the case. The case may include a front case 251 and a rear case 252 coupled to a rear side of the front case 251. According to design conditions, the front case 251 may include an upper part 251*a* and a lower part 251*b*, but the present invention is not limited thereto. For example, the front case 251 may be provided as a single body. The upper part 251*a* may have a structure that is inserted slidably from an upper side of the lower part 251*b*. The upper part 251 is made of a transparent material and also designed so that the user is capable of confirming the inside of the ice bin 25.

Although the front case 251 defines front and side surfaces of the ice bin 25, the present invention is not limited thereto. For example, the rear case 252 may be designed to define the rear surface, both side surfaces, and the bottom part of the ice bin 25. Of course, the case may be provided as a single injection-molded part.

The rear case may include a back surface part 2521, a bottom part disposed on a lower end of a front surface of the back surface part 2521, and an ice discharge hole 252*b* defined in an approximate center of the bottom part.

The bottom part may include a left inclination part 2522, a right inclination part 2523, a blade accommodation part disposed between the left inclination part 2522 and the right inclination part 2523, and an ice storage part 2529. The left inclination part 2522 is inclined downward from a lower end of a left surface of the case to a center of the case, and the right inclination part 2523 is inclined downward from a lower end of a right surface of the case to a center of the case. The ice storage part 2529 and the blade accommodation part are disposed between the lower ends of the left and right inclination parts 2522 and 2523.

The ice storage part 2529 is disposed at a rear side of the blade accommodation part. As illustrated in FIG. 26, the bottom part of the ice storage part 2529 is inclined downward toward the blade accommodation part.

A blocking wall 2528 is disposed between the ice storage part 2529 and the blade accommodation part. The blocking wall blocks only a portion of the vertical surface that separates the ice storage part 2529 from the blade accommodation part. The vertical surface that is not blocked by the blocking wall 2528 is opened to define an ice through hole 252*a*. That is, ice, which is received in the ice storage part 2529, of ice dropping from the ice maker 24 is guided to the blade accommodation part through the ice through hole 252*a*.

Here, the ice storage part 2529 may be defined as an ice storage region, and the blade accommodation part may be defined as an ice discharge region. A portion of a boundary surface between the ice storage region and the ice discharge region is partitioned by the blocking wall 2528, and the other portion of the boundary surface is opened to define the ice through hole 252*a*.

A left edge of the blade accommodation part is defined by a discharge guide part 2524 that extends at a predetermined curvature from a front end of the blocking wall 2528 of the lower end of the left inclination part 2522. The discharge guide part 2524 may be rounded at the same curvature as a rotation trace of the rotation blade that will be described later.

A shutter 256 that will be described later is rotatably mounted on a right edge of the blade accommodation part. A space between a lower end of the discharge guide part 2524 and a lower end of the shutter 256 is defined as the ice discharge hole 252*b*. The ice discharge hole 252*b* may ascend or descend according to a position of the lower end of the shutter.

That is, in a crushed ice dispensing mode, an end of the discharge guide part 2524 and an end of the shutter 256 may be closet to each other, i.e., a left/right width of the ice discharge hole 252*b* may be minimized. In a cubed ice dispensing mode, the shutter 256 may rotate to become a state in which the end of the discharge guide part 2524 and the end of the shutter 256 are farthest away from each other, i.e., the left/right width of the ice discharge hole 252*b* may be maximized.

The ice discharge adjustment module 250 mounted inside the case of the ice bin 25 may include a shaft 253 extending from the rear surface to the front surface of the ice bin 25, a mixing blade 257 and a plurality of rotatable blades 255, which rotate together with the shaft 253, a plurality of fixed blades 254 having one end fixed to an end of the discharge guide part 2524 and the other end fixed to the shaft 253, and a shutter 256 selectively rotating according to the ice dispensing modes.

Specifically, the mixing blade 257 is disposed within the ice storage part 2529. When the shaft 253 rotates, the mixing blade 257 rotates together with the shaft 253 to stir ices stored in the ice storage part 2529, thereby preventing the ices from being clogged.

In the ice bin mounted on the door ice maker assembly according to the related art, the front/rear width of the ice bin, which corresponds to the extension direction of the shaft, decreases to realize a slim refrigerator door. As a result, only the accommodation part in which the fixed blades and the rotatable blades are accommodated is provided, but the ice storage part 2529 is not provided.

However, in the structure in which the ice making room and the chiller room are vertically disposed in one door according to the present invention, the vertical width of the ice making room may be slightly reduced by the chiller room. In the above-described conditions, it is preferable that the front/rear width of the ice bin increase so as to maintain an ice storage amount of ice bin to the same level. As a result, the storage space corresponding to the ice storage part 2529 may be secured. The bottom part of the ice storage part 2529 is designed to be inclined downward toward the blade accommodation part so that ices are not accumulated in the ice storage part 2529, but moved to the blade accommodation part through the ice through hole 252*a*.

A spaced space is defined between the bottom part of the ice storage part 2529 and the rearmost rotatable blade of the plurality of rotatable blades 255. In an mode except for the ice dispensing mode, the ice stored in the ice storage part 2529 may be discharged through the ice discharge hole 252*b* via the spaced space. To prevent this phenomenon from occurring, the blocking wall 2528 is disposed at a portion corresponding to the boundary surface between the ice storage part 2529 and the blade accommodation part.

The blocking wall 2528 may not block the entire boundary surface and thus be not disposed at the ice through hole 252*a*. Thus, the ice may be discharged through the spaced space between the ice through hole 252*a* and the rearmost rotatable blade at the ice through hole 252*a*. However, since the shutter 256 is disposed at the front of the ice through hole 252*a*, the ice may not be discharged by the shutter 256.

The plurality of fixed blades 254 are disposed between the plurality of rotatable blades 255 and also disposed on one side of the left and right sides with respect to a center of the shaft 253. The shutter 256 is rotatably installed at a side opposite to the fixed blade 254. The fixed blade 254 and the rotatable blade 255 are disposed in the blade accommodation part to allow ice guided to the blade accommodation part through the ice through hole 252*a* or ice directly dropping from the ice maker 24 to the blade accommodation part to be discharged through the ice discharge hole 252*b* in one state of the cubed ice or crushed ice.

The shaft 253 may include a shaft body 253*a*, a plurality of spacers 253*c* surrounding an outer circumferential surface of the shaft body 253*a*, and a cap 253*b* fixed to an end of the shaft body 253*a*. The plurality of spacers 253*c* may be inserted between the members to always maintain a designed space between the mixing blade 257, the fixed blades 254, and the rotatable blades 255.

Referring to FIG. 25, the shutter 256 may include a shutter body 2561 and a protrusion 2562 protruding from a top surface of the shutter body 2561. The protrusion 2562 is disposed between the plurality of rotatable blades 255 to prevent ice from being discharged through a space between the plurality of rotatable blades 255 in the mode except for the ice dispensing mode.

The shutter body 2561 may include one end on which the shutter shaft 256*a* is disposed and the other end opposite to the one end. Also, the shutter body 2561 may include a first side edge adjacent to the ice through hole 252*a* and a second side edge adjacent to a back surface of the front case 251. That is, the second side edge may be an edge opposite to the first side edge.

The protrusion 2562 may protrude from any point of a top surface of the shutter body 2561 to extend up to the other end. The protrusion 2562 is disposed between the rotatable blades 255 adjacent to each other. Here, the protrusion 2562 has to be disposed at a point between the first side edge and the rotatable blades 255.

The shutter 256 may be provided in plurality that are disposed parallel to each other. Alternatively, a single shutter having a relatively large width may be provided. The plurality of protrusions 2562 may protrude from the top surface of the shutter body 2561.

When the protrusion 2562 is not provided at a point corresponding to the space between the first side edge and the rotatable blade 255 that is closest to the first side edge, ice may be broken in a cubed ice discharge mode.

Specifically, referring to an ice piece picture expressed by a dotted line, when the protrusion 2562 is not provided, one end of an ice piece may be disposed below the mixing blade 257, and the other end may be disposed below the rotatable blade 255. In this state, when the shaft 253 rotates in a clockwise direction in the drawing so as to discharge the cubed ice, the other end of the ice piece may be compressed downward by the rotatable blade 255.

Simultaneously, since the mixing blade 257 rotates in the same direction as the rotatable blade 255, the one end of the ice piece may be compressed downward. Thus, when the rotatable blade 255 continuously rotates, both ends of the rotatable blade 255 and the mixing blade 257 may break the ice piece jammed therebetween.

To minimize this limitation, the protrusion 2562 has to be provided on the edge of the top surface of the shutter body 2561 that is adjacent to the portion in which the ice through hole 252*a* is defined. Thus, possibility in which the ice pieces disposed on the bottom of the ice storage part 2529 pass through the ice through hole 252*a* may be minimized by the protrusion 2562.

Although a region in which the protrusion 2562 is not provided between the rotatable blades adjacent to each other exists in the drawings, this may be a matter of selection in design. As expressed by the dotted line, the protrusion 2562 may be provided in the empty region.

Referring to FIG. 24, a stepped part or recess part for forming a cool air descending passage R may be provided on rear edges of the cases 251 and 252 constituting the ice bin 25.

Specifically, when the ice bin 25 is disposed on the mounting plate 27, the cool air discharge hole 277 is disposed at the rear edge of the ice bin 25. To smoothly supply a portion of cool air supplied to the ice making room 201 to the chiller room 202 through the cool air discharge hole 277, the cool air descending passage R may be defined above the cool air discharge hole 277.

For this, the rear edge of the ice bin 25 (or the case) corresponding to a direct upper side of the cool air discharge hole 277 may be bent or recessed into the ice bin 25.

In the current embodiment, a first bent part 2525 in which the rear end of the side surface of the ice bin 25 is bent to the inside of the ice bin 25 and a second bent part 2526 in which the edge of the rear surface of the ice bin 25 is bent to the inside of the ice bin 25 are provided. However, the present invention is not limited thereto. The bent part may be smoothly rounded at a predetermined curvature and recessed. Thus, when the ice bin 25 is mounted on the mounting plate 27, the cool air descending passage R may be completely formed by the bent parts 2525 and 2526, the rear surface part 272 of the mounting plate 27, and the side surface of the ice making room 201.

One or plurality of cool air holes 2527 (or cool air slits) may be defined in upper portions of the first and second bent parts 2525 and 2526. Thus, a portion of cool air descending into the ice bin 25 is discharged through the cool air hole 2527 and then descends along the cool air descending passage R.

Here, the formation point of the cool air descending passage R may change according to the position of the cool air discharge hole 277. For example, the cool air discharge hole 277 may be defined in a point that is spaced apart from the rear edge toward a center of the rear surface of the ice bin 25, but not the rear edge of the ice bin 25. Thus, the rounded part or bent part for defining the cool air descending passage R may have a U-shaped transverse section or an arc-shaped transverse section, but not an L-shape transverse cross-section. That is to say, only the rear surface part of the case may be bent, stopped, or recessed according to the position of the cool air discharge hole 277 in addition to the bending of the edge portion at which the side surface and the back surface part of the case defining the ice bin 25 contact each other.

To form the cool air descending passage R, a portion at which a portion of the case of the ice bin 25 is deformed may be defined as a recess part, a stepped part, or a cool air descending passage formation part.

Here, although the case of the ice bin 25 is completely assembled by being coupled to the front case 251 and the rear case 252, the case of the ice bin 25 may be provided as a single part. Thus, when the shape of the ice bin 25 is generally defined, the ice bin 25 may be defined to be provided with a front surface part, a back surface part, a left surface part, a right surface part, a bottom part, and an opened top surface part. The bottom part may be defined as a left inclination part that is inclined downward from a lower end of the left surface, a right inclination part that is inclined downward from a lower end of the right surface, and the ice storage part and ice discharge part, which are disposed between ends of the left and right inclination parts. The structure in which the ice storage part is disposed at a rear side of the ice discharge hole, and the bottom part is inclined downward toward the ice discharge hole may be described.

Also, the structure in which the cool air descending passage formation part including the first and second bent parts is disposed on the edge portion at which the side surface and the back surface part of the ice bin 25 contact each other may be described. The cool air descending passage formation part may be disposed on the back surface part of the ice bin 25 according to the position of the communication hole.

Referring to FIG. 26, a gear assembly G is disposed at a rear side of the rear case 252 of the ice bin 25. Although not shown in the cross-sectional view of FIG. 26, as described above, the gear assembly G is disposed between the mounting plate 27 and the rear wall of the ice making room 201.

The blade motor (see reference symbol Ml of FIG. 33) supplying rotation force to the gear assembly G is disposed at a front side of the gear assembly G and covered by the blade motor cover part 273 disposed on the mounting plate 27. The rear case 252 of the ice bin 25 is disposed at a front side of the mounting plate 27.

A gear shaft G1 protruding from the gear assembly G passes through the gear shaft hole 275 defined in the mounting plate 27 to extend to the rear surface of the ice bin 25. A connector G2 is connected to the gear shaft G1 and engaged with a connector receiver 258 mounted on the rear surface of the ice bin 25 to rotate in one body.

A rear end of the shaft body 253*a* of the shaft 253 is fixed to the connector receiver 258 to rotate together with the connector receiver 258 in one body. A mounting hole in which the connector receiver 258 is mounted is defined in the rear case 252 of the ice bin 25. The connector receiver 258 is covered by the receiver cover 259. The shaft body 253*a* passes through the receiver cover 259 to extend to the front surface of the ice bin 25.

Figure 27:
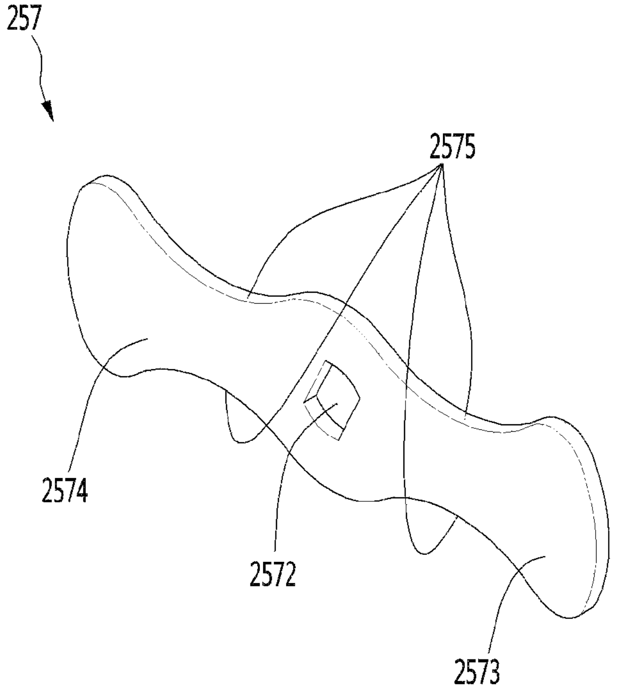
FIG. 27 is a front view of a mixing blade constituting an ice discharge adjustment module installed in the ice bin according to an embodiment of the present invention.

FIG. 27 is a front view of the mixing blade constituting the ice discharge adjustment module installed in the ice bin according to an embodiment of the present invention.

Referring to FIG. 27, as described above, a blade accommodation part in which, so-called, a blade unit including the rotatable blade 255 and the fixed blade 254 is accommodated and an ice storage part 2529 disposed at a rear side of the blade accommodation part are disposed in the ice bin 25 according to an embodiment of the present invention.

Specifically, the ice directly dropping into the blade accommodation part may be discharged in a cubed ice state or crushed ice state according to the rotation direction of the rotatable blade 255. On the other hand, the ice dropping into the ice storage part 2529 may be stored for a predetermined time without directly moving to the blade accommodation part.

Also, a phenomenon in which the ices are clogged for the storage period may be prevented. To prevent this phenomenon from occurring, the mixing blade 257 is disposed within the ice storage part 2529. The mixing blade 257 is mounted on the shaft 253 and then rotates together with the shaft 253 in one body in a clockwise direction or counter-clockwise direction.

The mixing blade may include a center part 2571, a first extension part 2573 extending from the center part 2571, and a second extension part extending from the center part 2571 in a direction opposite to the extension direction of the first extension part 2573.

Specifically, a shaft hole 2572 may be defined in the center part 2571. The shaft 253 passing through the shaft hole 2572 may have a non-circular cross-section. This is done for preventing the mixing blade 257 from being stopped or idling when the shaft 253 rotates.

A catching recess 2575 that is concavely recessed is defined in each of both edges of each of the first and second extension parts 2573 and 2574. The mixing blade 257 rotates in a first direction (for example, a clockwise direction) in a cubed ice mode and rotates in a second direction (for example, a counterclockwise direction) in a crushed ice mode. Thus, since it is necessary to mix the ices stored in the ice storage part 2529 regardless of the modes, the catching recesses may be provided on all both sides of the first and second extension parts 2573 and 2574.

Each of the first extension part 2573 and the second extension part 2574 has an end that is rounded at a curvature corresponding to the rotation trace of the mixing blade 257. Also, a portion at which the catching recess 2575 and each of the extension parts 2573 and 2574 contact each other may be rounded.

Figure 28:
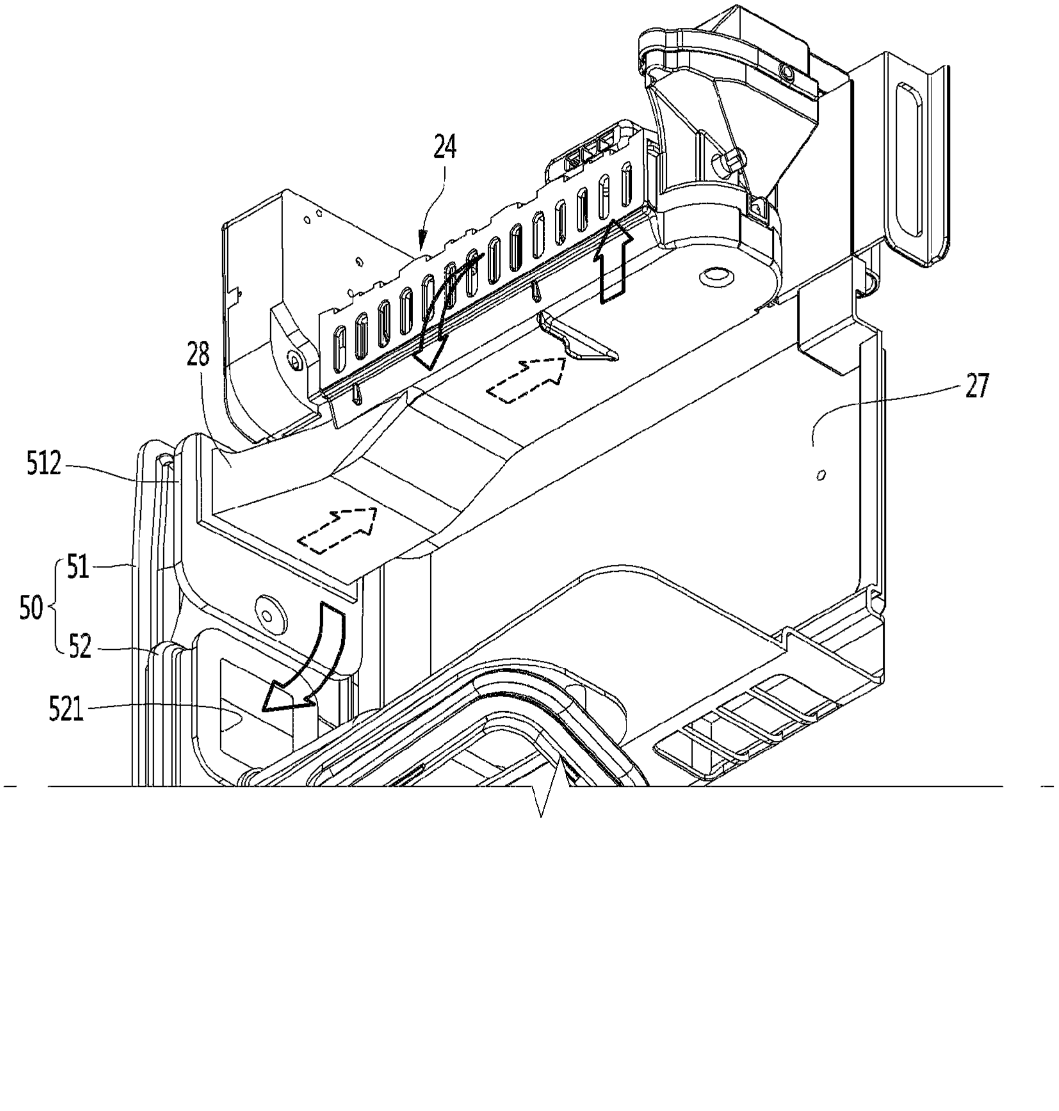
FIG. 28 is a bottom perspective view of an ice maker according to an embodiment of the present invention.

FIG. 28 is a bottom perspective view of the ice maker according to an embodiment of the present invention.

Referring to FIG. 28, the ice making assembly according to an embodiment of the present invention is characterized in that the cool air guide duct 28 is mounted on the bottom surface of the ice maker 24.

Specifically, cool air ascending along the cool air supply duct 51 is discharged through the cool air discharge hole 512 to flow along the cool air guide duct 28. The cool air flowing along the cool air guide duct 28 directly collides with the bottom surface of the ice tray 241 to cool the ice tray 241. In case of the ice making assembly in which the cool air guide duct 28 is disposed above the ice tray 241 according to the related art, cool air guided along the cool air guide duct 28 may flows to a rear side of the ice tray 241. Then, the cool air descends along the rear wall of the ice making room, and then, flows to the front side of the ice making room to cool the bottom portion of the ice tray 241. As a result, cooling efficiency may be deteriorated.

However, according to the present invention, the cool air guide duct 28 may be directly mounted on the bottom surface of the ice tray 241 to directly collide with the bottom surface of the ice tray. Thus, ice making efficiency may be improved.

Figure 29:
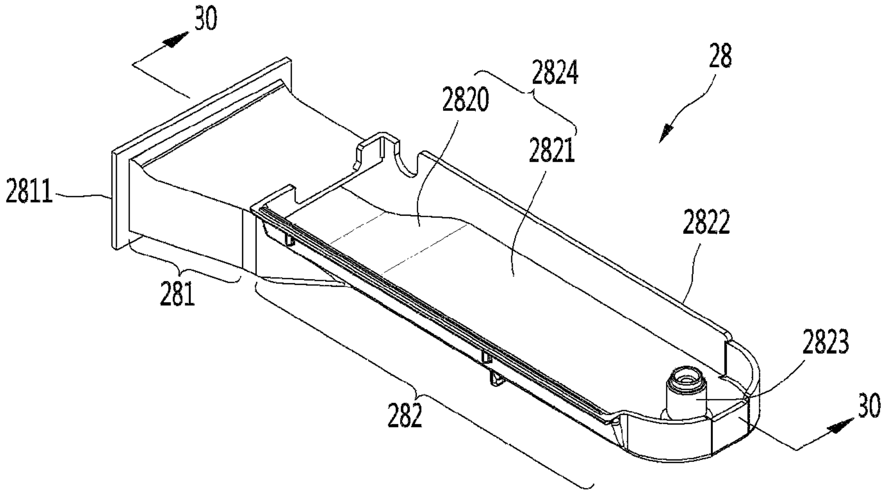
FIG. 29 is a perspective view of a cool air guide according to an embodiment of the present invention.
Figure 30:
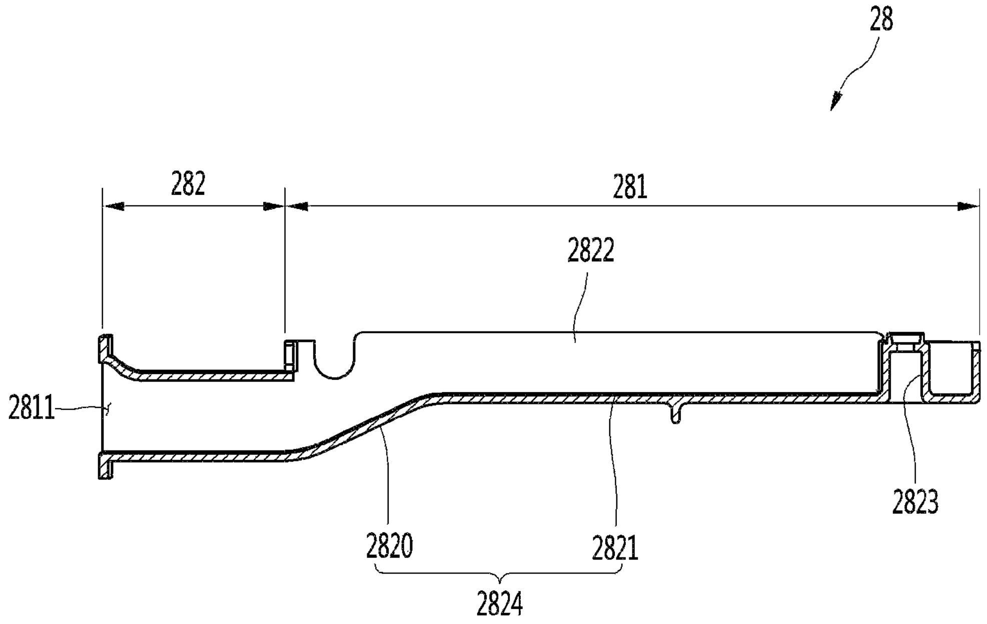
FIG. 30 is a longitudinal cross-sectional view taken along line 30-30 of FIG. 29.

FIG. 29 is a perspective view of the cool air guide according to an embodiment of the present invention, and FIG. 30 is a longitudinal cross-sectional view taken along line 30-30 of FIG. 29.

Referring to FIGS. 29 and 30, the cool air guide duct 28 according to an embodiment of the present invention may include a suction duct part having a duct shape and a tray coupling part 282 disposed on an outlet side of the suction duct part 281.

Specifically, a suction hole 2811 is defined in a side surface of the suction duct part 281. The suction hole 2811 is closely attached to the cool air supply duct 51 to communicate with the cool air discharge hole 512.

Also, a top surface of the tray coupling part 282 is opened to allow the cool air passing through the suction duct part 281 to collide with the bottom surface of the ice tray 241.

The tray coupling part 282 includes a bottom part 2824 and a wall part 2822 extending upward along an edge of the bottom part 2824. An upper end of the wall part 2822 is fixed to the bottom surface of the ice tray 241.

The bottom part 2824 may include an inclination part 2820 extending upward from an end of the bottom part constituting the suction duct part and a horizontal part 2821 horizontally extending from an end of the inclination part 2820.

A coupling boss 2823 protrudes from the end of the tray coupling part 282, and a coupling member is inserted into the coupling boss 2823. The coupling member may be fixed to the bottom surface of the ice tray 241.

Figure 31:
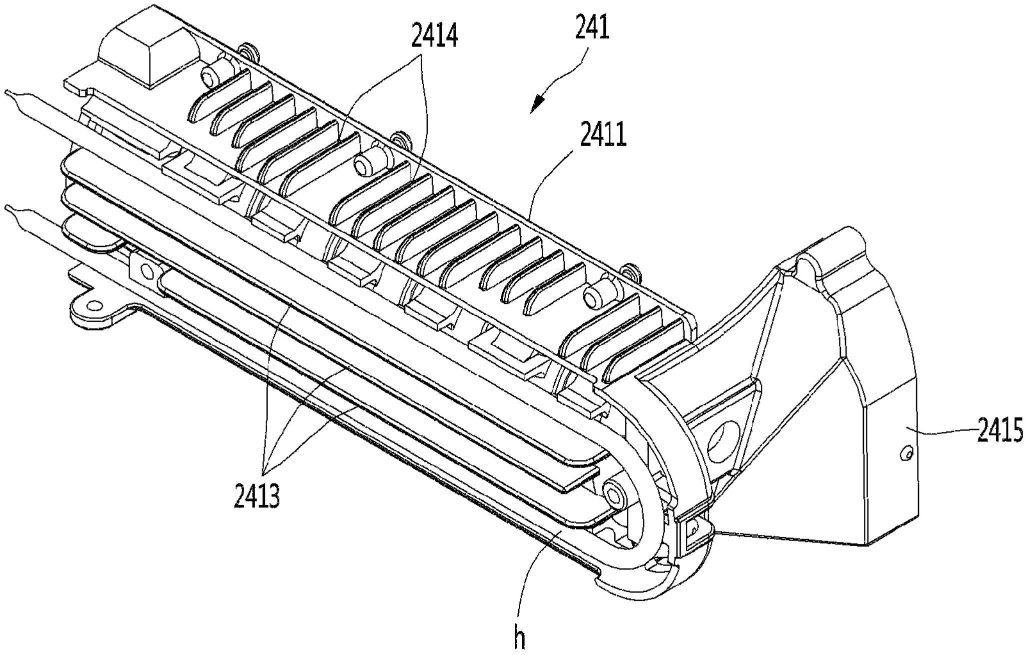
FIG. 31 is a bottom perspective view of an ice tray constituting the ice maker according to an embodiment of the present invention.

FIG. 31 is a bottom perspective view of the ice tray constituting the ice maker according to an embodiment of the present invention.

Referring to FIG. 31, the ice tray 241 according to an embodiment of the present invention includes a left surface on which the ice separating motor 243 is mounted, a right surface corresponding to a surface opposite to the left surface and on which the water supply part 2415 is disposed, a front surface part connecting a front end of the left surface to a front end of the right surface, a rear surface part connecting a rear end of the left surface to a rear end of the right surface, and a bottom part connecting a lower end of the left surface to a lower end of the right surface.

A plurality of cells 2412 for making ice are provided inside the ice tray 241, and a plurality of cool air guide ribs 2413 are disposed on the bottom part of the ice tray 241.

The plurality of cool air guide ribs 2413 are made of the same aluminum material as the ice tray 241. Also, the plurality of cool air guide ribs may be heat-exchanged with cool air supplied along the cool air guide duct 28 to perform a function of a heat-exchange fin. Thus, the cool air guide rib 2413 may be defined as a heat-exchange fin or cool guide fin.

The plurality of cool air guide ribs 2413 vertically extend from the front surface part and are disposed to be spaced a predetermined distance from the left surface to the right surface. A flange 2411 protrudes forward by a predetermined width from an upper end of the front surface part.

The cool air guide ribs 2413 disposed on the bottom part have a length from the left surface to the right surface and are disposed to be spaced a predetermined distance from the front surface part to the rear surface part. An end of the cool air guide rib 2413 has a length at which the cool air guide rib 2413 does not contact the bottom part 2824 of the cool air guide duct 28 in a state in which the cool air guide duct 28 is mounted on the bottom surface of the ice tray 241.

An ice separating heater h is mounted on the bottom part of the ice tray 241. The ice separating heater h may be a sheath heater having a U shape as illustrated in the drawings. Thus, the ice separating heater h may extend along an edge of the bottom part of the ice tray 241. Particularly, a right edge of the bottom surface of the ice tray 241 may be rounded along the shape of the ice separating heater h.

Figure 32:
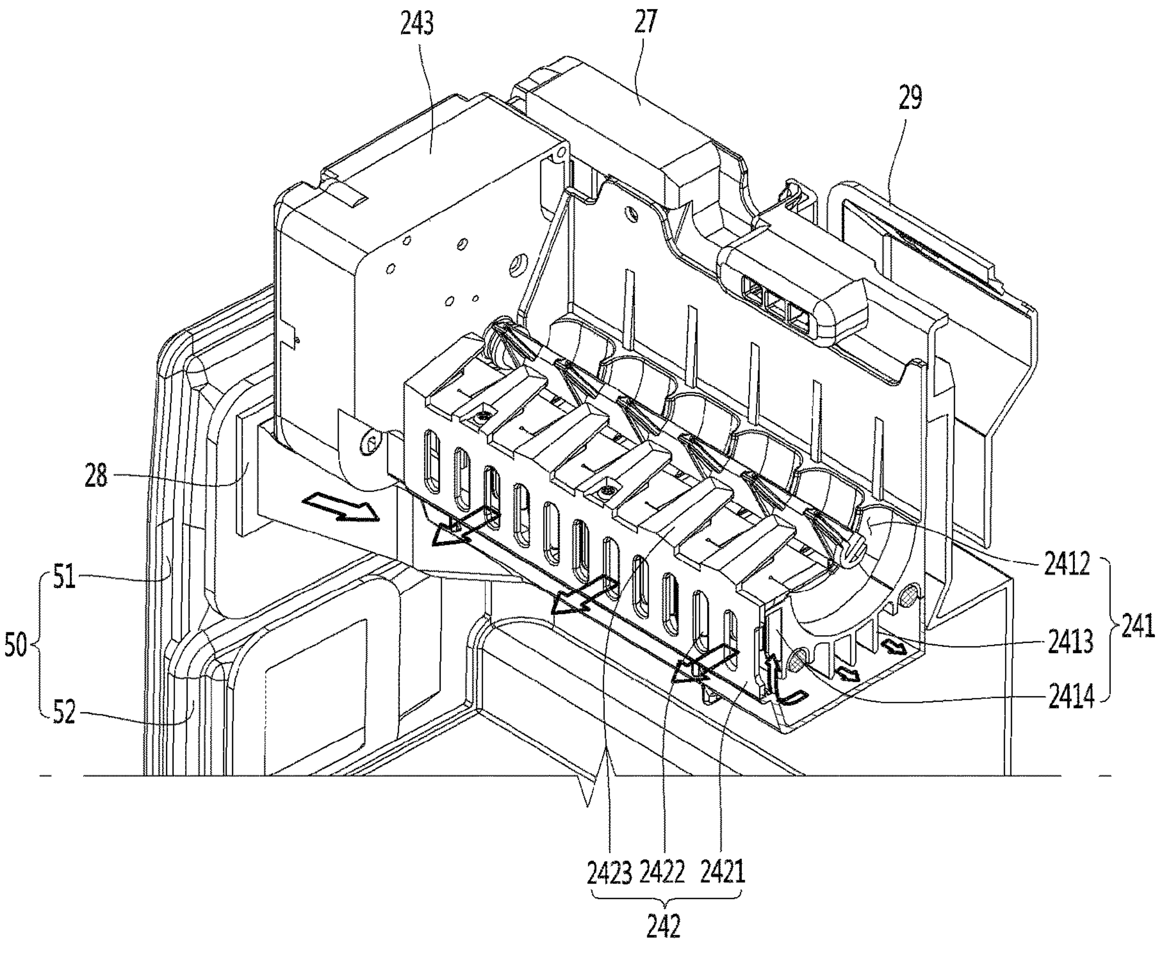
FIG. 32 is a cut-away perspective taken along line 32-32 of FIG. 21.

FIG. 32 is a cut-away perspective taken along line 32-32 of FIG. 21.

Referring to FIG. 32, cool air supplied from the cool air supply duct 51 to the cool air guide duct 28 flows from a left end of the ice tray 241 to a right end of the ice tray 241 along the cool air guide passage defined between the cool air guide ribs 2413 that are adjacent to each other. The cool air flowing through the inside of the cool air guide duct 28 collides with the bottom part of the ice tray 241 to cool the ice tray 241.

The ice separating guide 242 is mounted on the front surface part of the ice tray 241, and the front surface part 2421 of the ice separating guide 242 is closely attached to the flange 2411. Thus, the front surface part 2421 of the ice separating guide 242 is spaced a predetermined distance from the front surface part of the ice tray 241.

A lower end of the front surface part 2421 of the ice separating guide 242 is seated on an upper end of the front surface of the tray coupling part 282 constituting the cool air guide duct 28. Thus, the cool air flowing along a space defined between the bottom part of the cool air guide duct 28 and the plurality of cool air guide ribs 2413 ascends to a space between the front surface part of the ice tray 241 and the front surface part 2421 of the ice separating guide 242.

Specifically, the cool air ascending along the front surface part of the ice separating guide 242 ascends along a space defined between the plurality of cool air guide ribs 2414 disposed on the front surface of the ice tray 241. The ascending cool air is discharged into the ice making room 201 through cool air holes 2422 defined in the front surface part 2421 of the ice separating guide 242. The cool air colliding with the flange 2411 is switched in flow direction and discharged into the ice making room 201 through the cool air holes 2422.

The cool air holes 2422 may be defined in the front of the space defined between the plurality of cool air guide ribs 2414 adjacent to each other so that the cool air is smoothly discharged.

As described above, since the cool air guide duct 28 is mounted on the button surface of the ice tray 241, until the cool air collides with the button surface of the ice tray 241, the number of cool air flowing direction switching may be reduced to improve air pressure drop due to flow resistance. Particularly, in the related art, the cool air flowing direction is switched five times to six times. According to the present invention, the switching number is reduced to two times to three times. As described above, since the air pressure drop is improved, an amount of air supplied to the ice maker 24 increases to reduce an ice making time. Thus, an amount of made ice per unit time may increase.

A mounted position of the ice maker 24 within the ice making room 201 may be higher. That is, the ice maker 24 may be mounted on the upper end of the ice making room 201. As a result, since the ice bin 25 increases in height, an amount of ice to be stored may increase.

The upper end of the front surface part of the ice bin 25 may be higher than that of the cool air guide duct 28. Thus, the cool air discharged through the cool air hole 2422 descends within the ice bin 25. As a result, the ices stored in the ice bin 25 may be prevented from being melted and clogged.

In addition, a portion of the cool air supplied into the ice bin 25 is discharged through the cool air hole 2527. The discharged cool air may descend along the cool air descending passage R to pass through the communication hole 207*b* and then be supplied to the chiller room 202.

Figure 33:
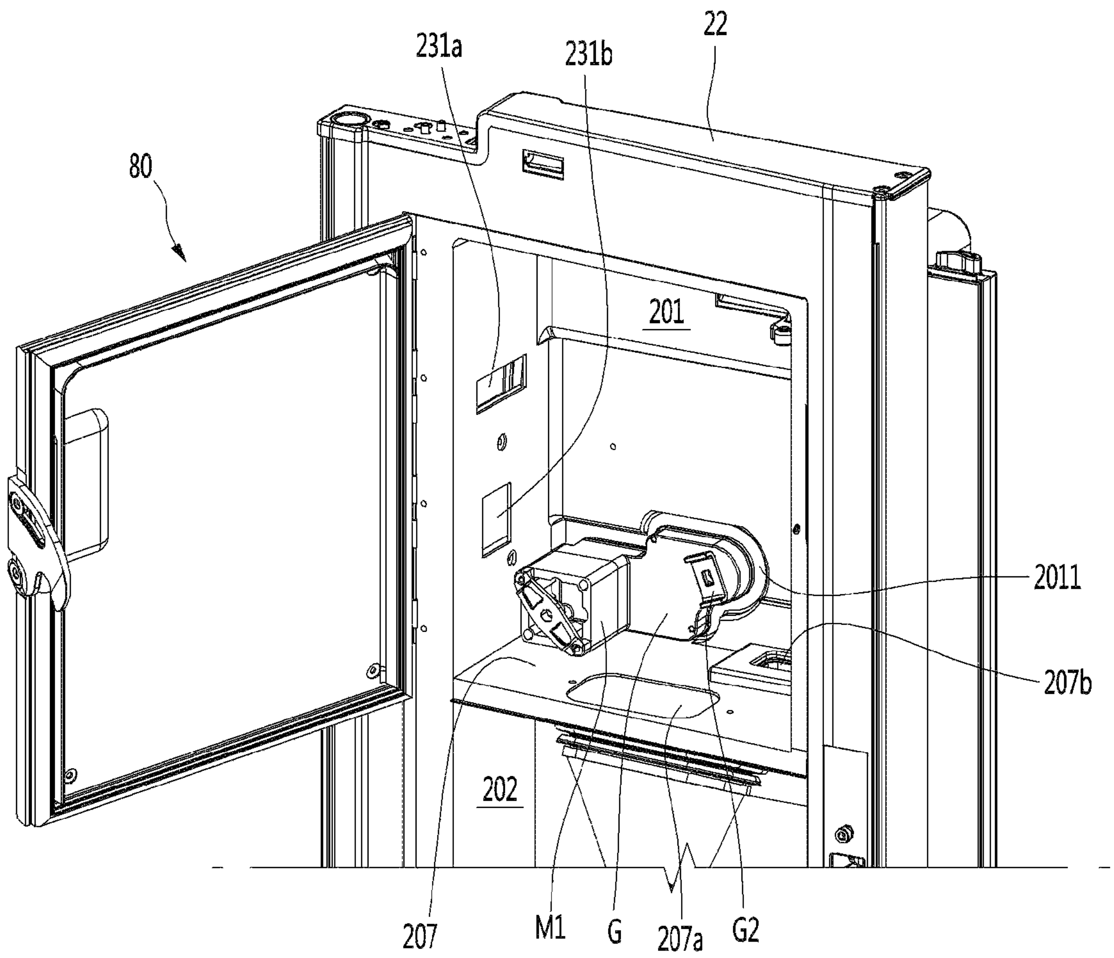
FIG. 33 is a partial perspective view of the ice making room provided in the main door according to an embodiment of the present invention.
Figure 34:
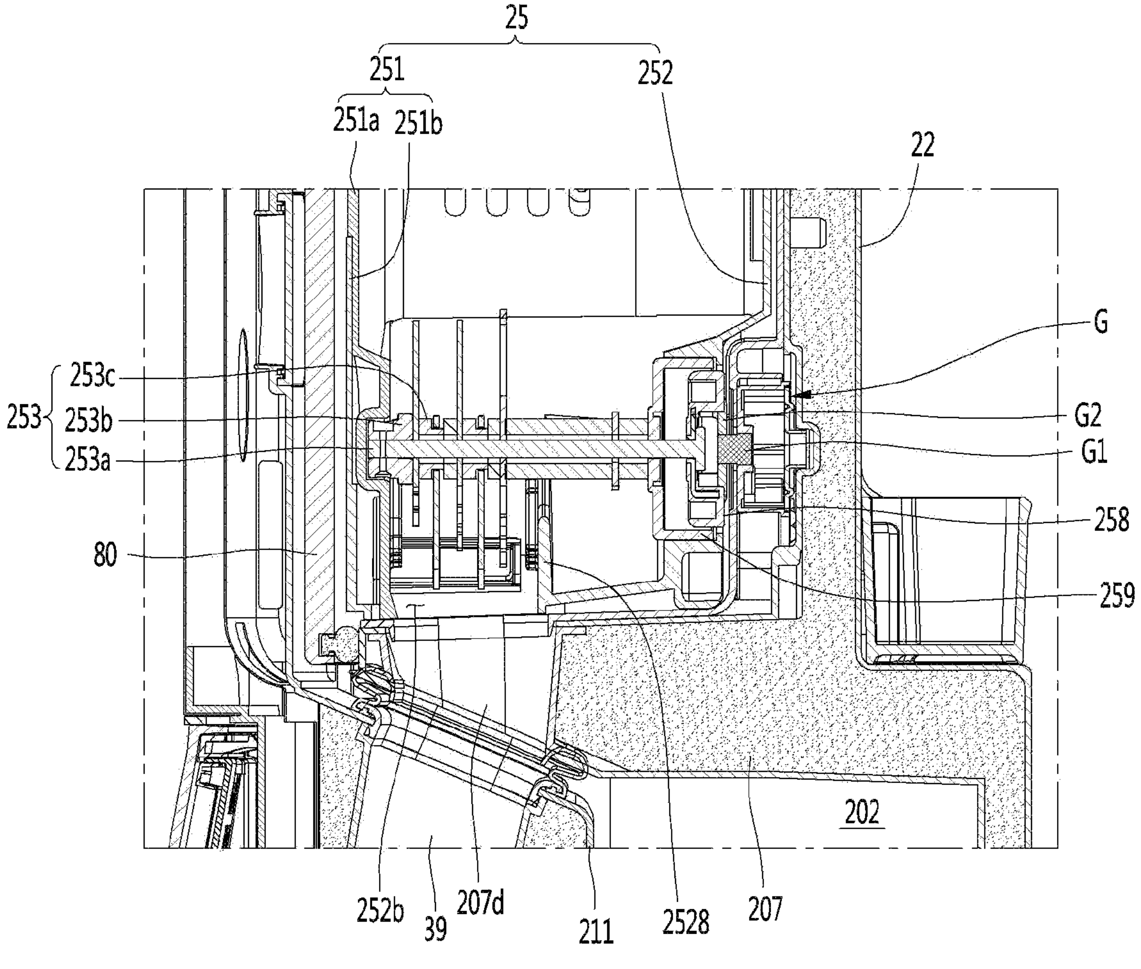
FIG. 34 is an enlarged cross-sectional view of a portion B of FIG. 3.

FIG. 33 is a partial perspective view of the ice making room provided in the main door according to an embodiment of the present invention, and FIG. 34 is an enlarged cross-sectional view of a portion B of FIG. 3.

Referring to FIGS. 33 and 34, the ice making room 201 and the chiller room 202 are provided in the main door 22 constituting the door-in-door assembly according to an embodiment of the present invention. The ice making room 201 and the chiller room 202 are vertically partitioned by the partition wall 207.

Specifically, the front surface part of the chiller room 202 is opened, and the opened front surface part is covered by the sub door 21. Particularly, when the sub door 21 is closely attached to the front surface of the main door 22, the dispenser liner 211 further protruding from the back surface of the sub door 21 is led into the chiller room 202.

Although the front surface part of the ice making room is opened also, like the chiller room 202, a separate ice making room door 80 may be provided. Although the sub door 21 is opened, since the ice making room 201 is not opened, external air may be prevented from being introduced into the ice making room 201.

A gear seat groove 2011 is defined in the rear surface of the ice making room 201. The gear assembly G is seated in the gear seat groove 2011. The blade motor Ml is mounted on a front surface of the gear assembly G. The gear assembly G and the blade motor Ml are covered by the mounting plate 27.

The gear shaft G1 extends from the front surface of the gear assembly G, and the connector G2 is mounted on the gear shaft G1. The rotation shaft of the blade motor Ml is connected to a driving gear shaft (not shown) of the gear assembly G. The rotation force transmitted to the driving shaft is reduced by reduction gears provided in the gear assembly G, and thus, the reduced rotation force may be transmitted to the gear shaft G1. The rotation force transmitted to the gear shaft G1 is transmitted to the shaft 253. Thus, the gear shaft G1 may be defined as a transmission gear shaft.

The driving shaft of the gear assembly G is disposed on an end of one side of the gear assembly G, and the gear shaft G1, i.e., the transmission shaft is disposed on an end of the other side that is away from the driving shaft. The blade motor Ml is disposed on a rear edge portion of the ice making room, and the gear shaft G1 is disposed at an approximate center of the rear surface of the ice making room 201, which corresponds to a point that equally divides the ice making room 201 in half.

As illustrated in FIG. 34, since the gear assembly G is mounted on the rear surface (or the rear wall) of the ice making room 201, when the ice bin 25 is mounted on the ice making room 201, the blade unit is disposed at a position that is close to the front surface of the main door 22. Thus, the ice discharge hole 207*a* defined in the partition wall 207 may also be disposed at a position that is close to the front end of the partition wall 207.

In addition, since the ice discharge hole 207*a* and the guide duct 207*d* are disposed close to the front end of the partition wall 207, an angle defined by the discharge duct 39 and the vertical surface may be significantly reduced. As a result, since the front/rear width of the dispenser 30 is reduced, the capacity of the chiller room 202 may increase.

In the door ice making structure according to the related art, in which the front surface of the ice making room 201 is closed, and the ice making room door 80 is mounted on the rear surface of the ice making room 201, the blade motor Ml and the gear assembly G have to be mounted to the inside of the door, which corresponds to the front surface of the ice making room. When the ice bin 25 according to the present invention is mounted inside the ice making room, the blade unit may be disposed at a position that is farthest away from the back surface of the door. Thus, the inclined angle of the discharge duct 39 may increase, and also, the dispenser may increase in front/rear thickness. As a result, the capacity of the chiller room 202 may be reduced.

Figure 35:
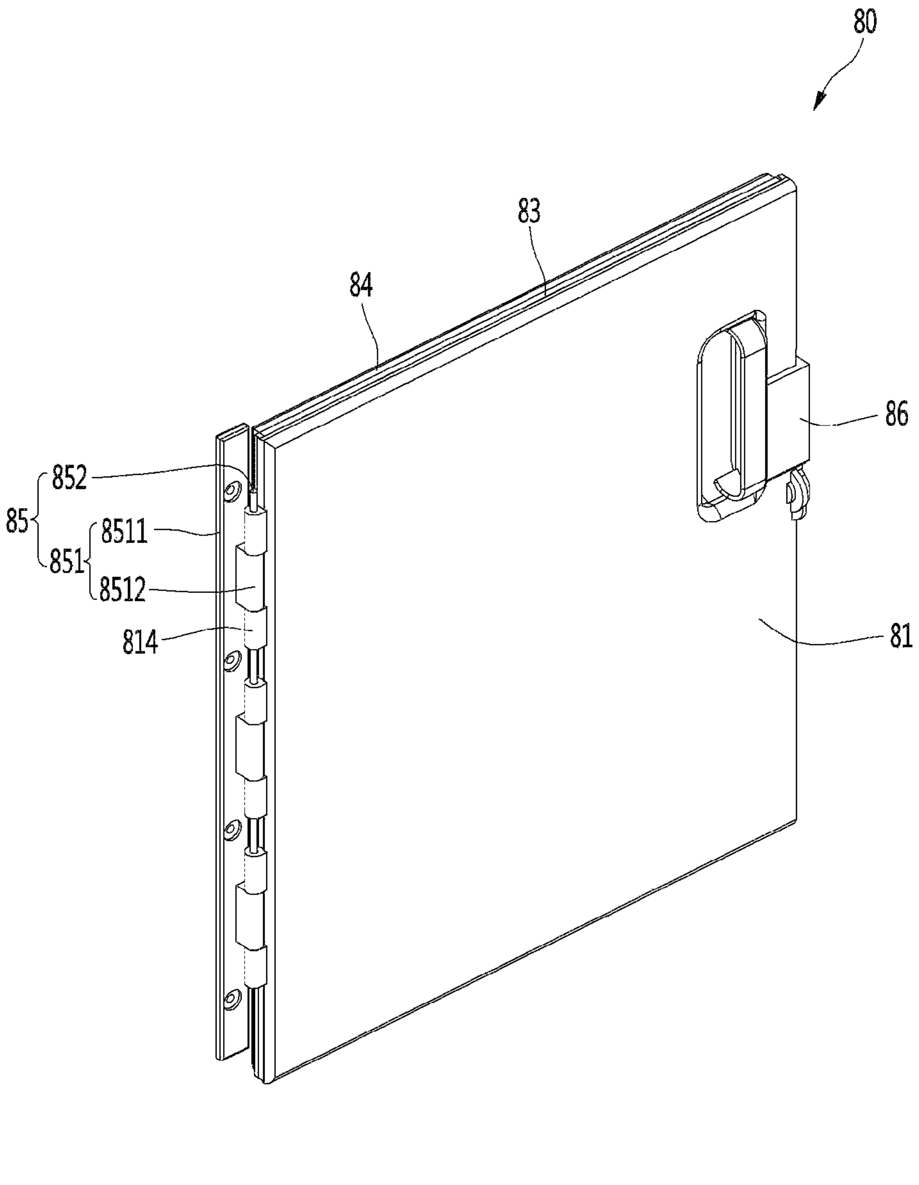
FIG. 35 is a left perspective view of an ice making room door according to an embodiment of the present invention.
Figure 36:
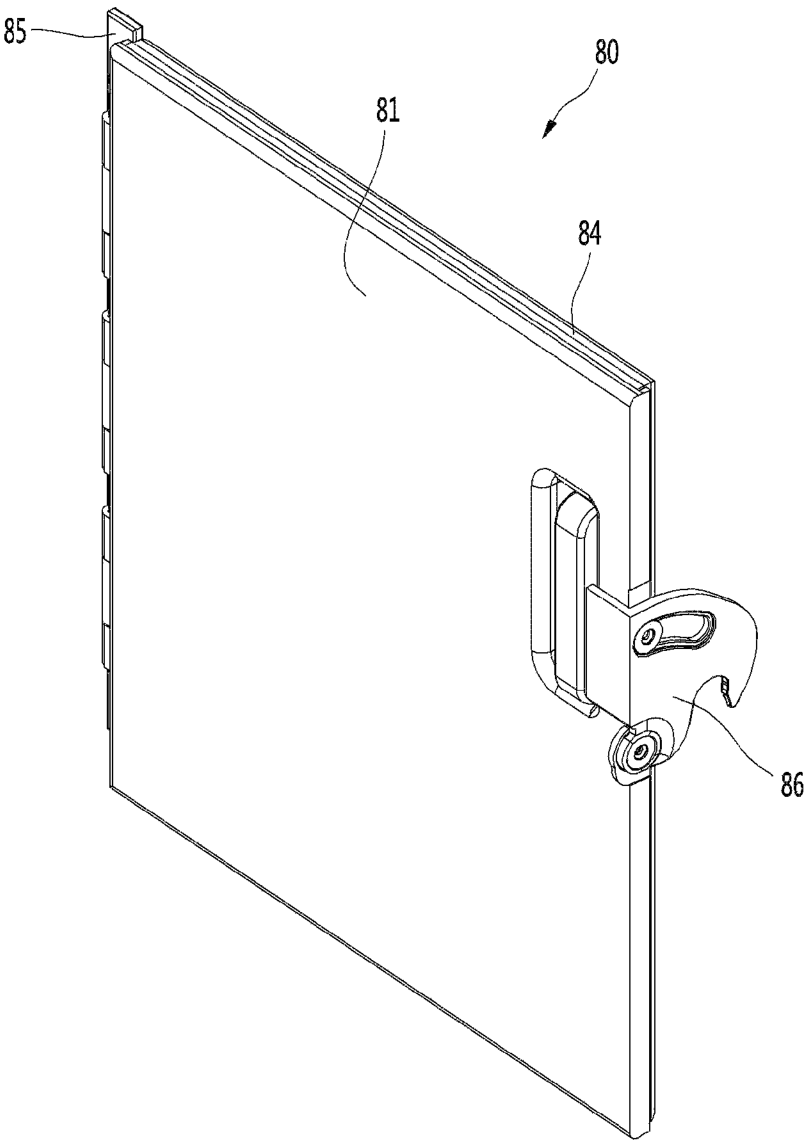
FIG. 36 is a right perspective view of the ice making room door.
Figure 37:
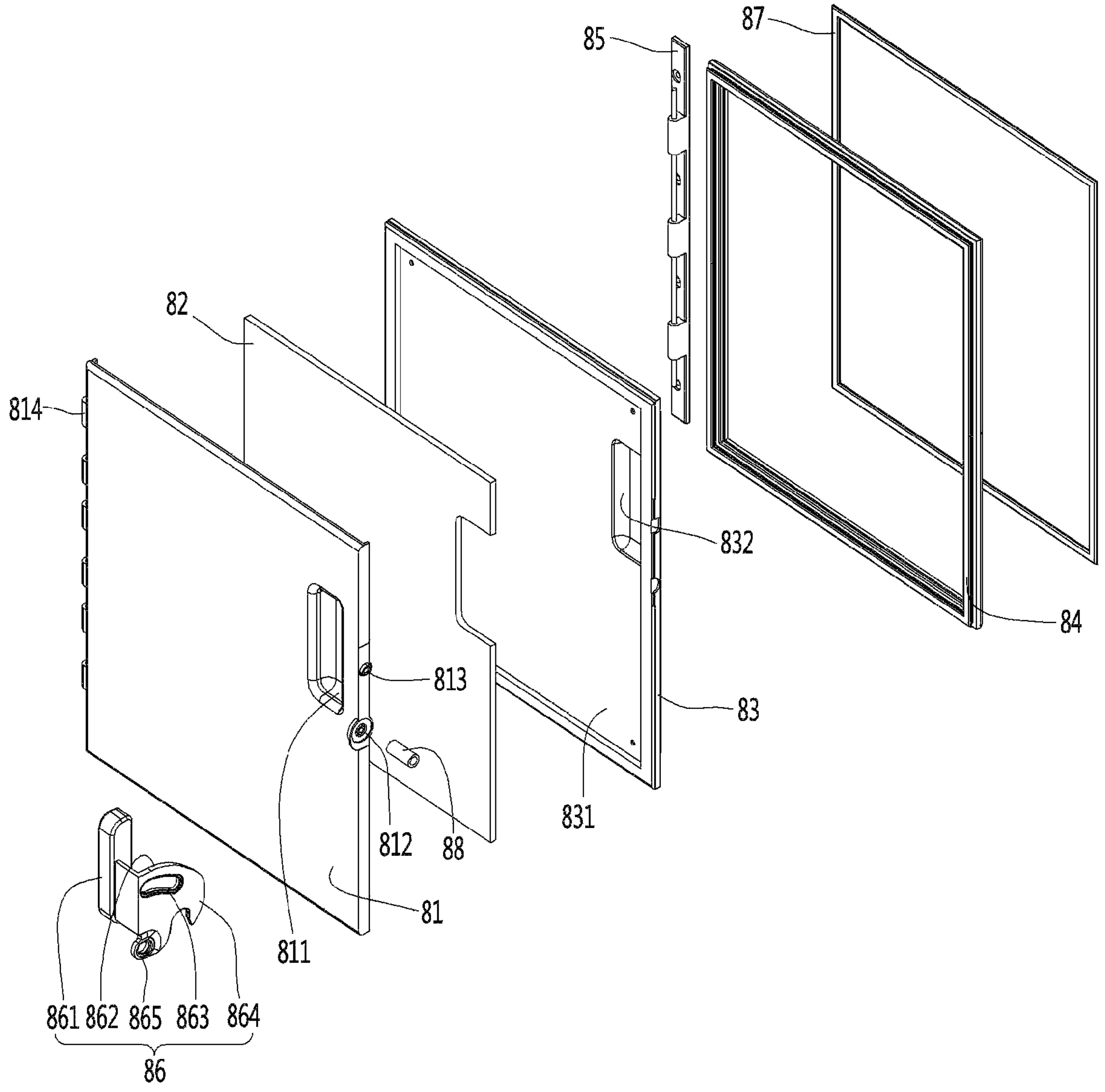
FIG. 37 is an exploded perspective view of the ice making room door.

FIG. 35 is a left perspective view of the ice making room door according to an embodiment of the present invention, FIG. 36 is a right perspective view of the ice making room door, and FIG. 37 is an exploded perspective view of the ice making room door.

Referring to FIGS. 35 to 37, the ice making room door 80 according to an embodiment of the present invention is mounted on the front surface of the main door 22.

In the refrigerator according to the related art, in which the ice making room is provided in the refrigerating compartment door, since the ice making room door is mounted on the rear surface of the ice making room, an insulation thickness of the ice making room door may be sufficiently secured to improve insulation performance.

However, in case of the present invention, since the opening of the ice making room is defined in the front surface of the main door 22, it is limited to sufficiently secure the insulation thickness of the ice making room door.

To solve this limitation and improve the insulation performance, a vacuum insulation material may be mounted inside the ice making room door 80.

Specifically, the ice making room door 80 may include a front cover 81, a rear cover 83, a vacuum insulation panel 82, a frame, a handle 86, a gasket 87, and an ice making room door hinge assembly 85.

Specifically, the frame 84 may have a rectangular frame shape having an opened inside. The gasket 87 is mounted on a back surface of the frame 84. When the ice making room door 80 is closed, cool air within the ice making room may be prevented from leaking to the outside. The rear cover 83 is seated on a front surface of the frame 84, and the front cover 81 is coupled to a front surface of the rear cover 83.

The vacuum insulation panel (VIP) may be disposed between the front cover 81 and the rear cover 83. Each of the front cover 81, the rear cover 83, and the frame 84 may be made of a plastic material.

Here, a coupled body of the front cover 81, the rear cover 83, the vacuum insulation panel 82, the frame 84, and the gasket 87 may be defined as a door part. The ice making room door hinge assembly 85 is mounted on a left edge of the door part, and the handle 86 is mounted on a right edge of the door part. Thus, the ice making room door 80 may include the door part, a hinge part including the ice making room door hinge assembly 85, and a handle part including the handle 86.

The ice making room door hinge assembly 85 may be fixed to one side of the left edge and right edge of the ice making room 201. Preferably, the ice making room door hinge assembly 85 may be disposed on the same side surface as that in which the rotation center of the sub door 21 is defined. That is to say, when the rotation center of the sub door 21 is defined in the left edge, the ice making room door hinge assembly 85 may also be attached to the left edge of the door part.

As a result, although the sub door 21 is closed in the state in which the ice making room door 80 is opened, since the ice making room door 80 is closed together with the sub door 21, damage of the ice making room door 80 may be prevented. When the rotation shaft of the sub door 21 is disposed on the left edge, and the rotation shaft of the ice making room door 80 is disposed on the right edge, if the user closes the sub door 21 in a state in which the ice making room door 80 is opened at an angle of about 90 degrees or more, the damage of the ice making room door 80 may occur.

Thus, the ice making room door 80 and the sub door 21 may rotate in the same direction and be opened.

The ice making room door hinge assembly 85 may include a hinge bracket 851 fixed to the front surface of the main door 22, which corresponds to the left edge of the ice making room 201, and a hinge shaft 852 inserted into the hinge bracket 851.

Specifically, the hinge bracket 851 includes a bracket body 8511 mounted on an edge of the side surface of the ice making room 201 to extend by a predetermined length along an edge of the side surface of the door part and a plurality of hinge shaft accommodation parts 8512 protruding from a front surface of the bracket body 8511 and having holes into which the hinge shaft 852 is inserted. The plurality of hinge shaft accommodation parts 8512 are spaced a predetermined distance from each other in a longitudinal direction of the bracket body 8511.

Also, a plurality of hinge shaft accommodation parts 814 are provided in an edge of a side surface of the front cover 81, i.e., a side surface on which the ice making room door hinge assembly 85 is provided. The plurality of hinge shaft accommodation parts 814 may be disposed between the plurality of hinge shaft accommodation parts 8512 constituting the hinge bracket 851. Particularly, one or plurality of hinge shaft accommodation parts 814 may be disposed between the hinge shaft accommodation parts 8512 of the hinge brackets 851 adjacent to each other. Here, for convenience of description, the hinge shaft accommodation part 8512 may be defined as a first hinge shaft accommodation part, and the hinge shaft accommodation part 814 may be defined as a second hinge shaft accommodation part.

The hinge shaft 852 passes through the hinge shaft accommodation parts 8512 and 814, and the front cover 81 and the ice making room door hinge assembly 85 are coupled to each other to form one body. The door part of the ice making room door 80 rotates about the hinge shaft 852 of the ice making room door hinge assembly 85 to open or close the front opening of the ice making room 201.

The hinge shaft accommodation parts 814 and 8512 are disposed on the side surface of the door part, and the hinge shaft 852 passes through the hinge shaft accommodation parts 814 and 8512 to couple the hinge bracket 851 to the door part. Thus, the rotation center of the door part is vertically defined on the side surface of the door part.

Specifically, the rotation center of the ice making room door 80 is defined outside the side surface of the door part. Thus, while the door part of the ice making room door 80 rotates, interference between the rear edge of the door part and the front surface of the main door 22 may not occur.

More specifically, the rotation center of the door part of the ice making room door 80 is defined at a point that corresponds to a vertical axis between a vertical surface passing through the front surface of the door part and a vertical surface passing through the rear surface of the door part and is spaced apart outward from the side surface of the door part.

In case of the main door 22 or the sub door 21, the rotation center is defined inside the door, i.e., at a point that is spaced apart from the edge of the side surface of the door in a center direction of the door. As a result, a spaced space for preventing fingers from being jammed may be defined between the edge of the rear surface of the main door 22 and the front surface part of the cabinet 11 or between the front surface of the main door 22 and the edge of the rear surface of the sub door 21.

However, in case of the ice making room door hinge assembly 85, the hinge shaft 852 that serves as the rotation center is disposed outside the door part, i.e., at a point that is spaced apart outward from the side surface of the door part. Thus, the spaced space may not be provided between the door part and the edge of the front surface of the ice making room.

Since the hinge structure is applied as described above, it is unnecessary to design the sub door 21 so that the back surface of the sub door 21 corresponding to the mounted position of the ice making room door hinge assembly 85 is recessed or stepped to prevent the sub door 21 from interfering with the ice making room door hinge assembly 85. Thus, deterioration in insulation performance of the sub door 21 may be prevented.

When the hinge assembly such as the main door upper hinge unit 41 or the sub door upper hinge unit 42 is used as the ice making room door hinge assembly 85, the back surface of the sub door 21 may be recessed or stepped by the hinge bracket portion that protrudes forward.

Also, a stopper 813 and a hinge groove 812 are provided on the side surface (right surface in the drawing) of the front cover 81, which corresponds to a side opposite to the side surface on which the hinge shaft accommodation part 814 is disposed. Also, a handle hinge 88 is inserted into the hinge groove 812.

Also, a handle groove 811 may be recessed in an edge of a right side of the front surface part of the front cover 81, which is close to the side surface in which the stopper 813 and the hinge groove 812 are provided.

Also, a handle groove 832 corresponding to the handle groove 811 of the front cover 81 may be recessed from a right edge of the front surface part of the rear cover 83. Thus, when the front cover 81 is coupled to the front surface of the rear cover 83, the handle groove 811 of the front cover 81 is seated in the handle groove 832 of the rear cover 83.

The vacuum insulation panel may not be provided at the portion in which the handle grooves 811 and 832 are defined. That is, as illustrated in the drawings, an edge of a side surface of the vacuum insulation panel 82 corresponding to the portion in which the handle grooves 811 and 832 are defined may be cut to prevent the interference with the handle grooves 811 and 832.

An insulation panel seat part 831 on which the vacuum insulation panel 82 is seated is stepped on the front surface of the rear cover 83.

The handle 86 may be rotatably mounted on the right surface of the front cover 81. Specifically, the handle 86 may include a grip part 861, a latch part 862 extending laterally from an edge of a side surface of the grip part 861 and then bent backward, a hinge hole 865 defined in a lower end of the latch part 862, a stopper hole 863 rounded at a predetermined curvature on an upper end of the latch part 862, and a hook protrusion 864 disposed on a rear end of the latch part 862.

More specifically, the handle hinge 88 passes through the hinge hole 865 of the handle 86 and is inserted into the hinge groove 812 of the front cover 81. Thus, the handle 86 is rotatable in a front/rear direction with respect to a center of the handle hinge 88.

The stopper 813 is inserted into the stopper hole 863 to set a rotation limitation of the handle 86. That is, a rotation angle of the handle 86 in a front direction may be determined by a length of the stopper hole 863.

The hook protrusion 864 is selectively hooked with a hook part (not shown) to be disposed on a front end of the side surface of the ice making room 201. For example, when the grip part 861 is pushed backward, the handle 86 rotates backward, and the hook protrusion 864 is hooked with the hook part disposed on the side surface of the ice making room 201. In this state, the grip part 861 is seated in the handle groove 811.

Figure 38:
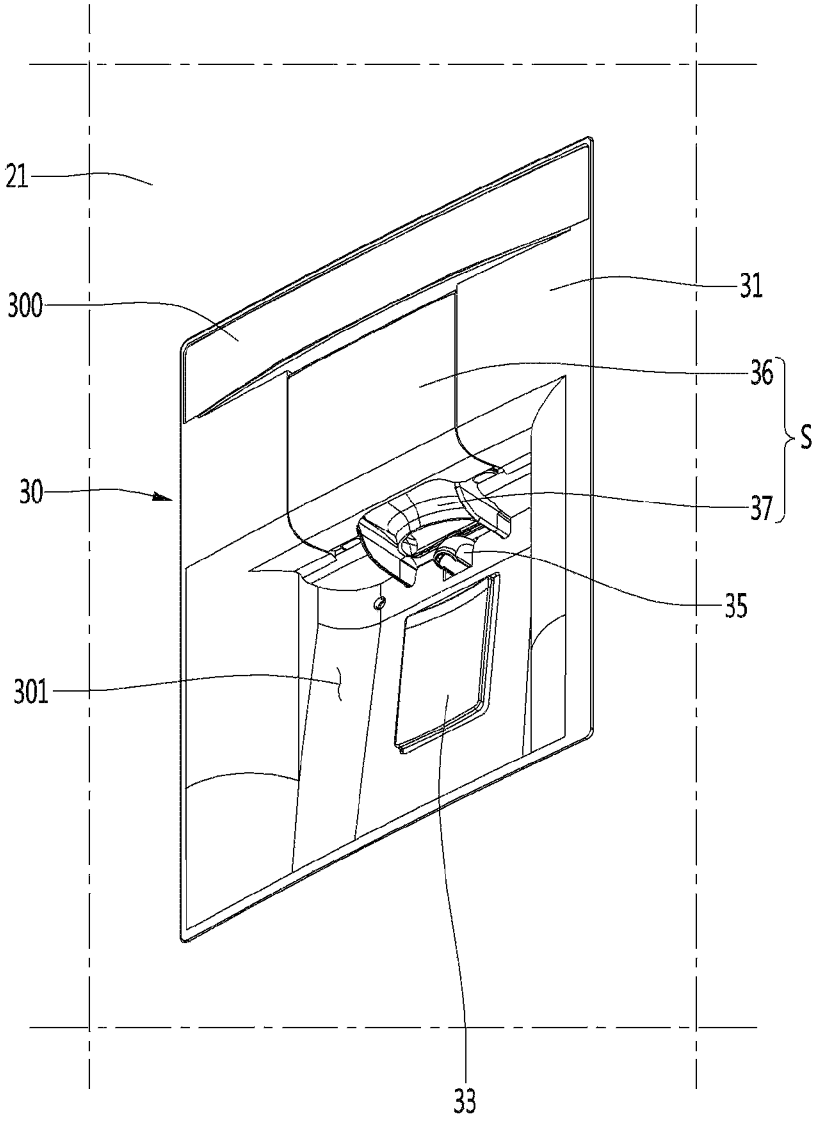
FIG. 38 is an enlarged perspective view of a dispenser provided in the door of the refrigerator according to an embodiment of the present invention.
Figure 39:
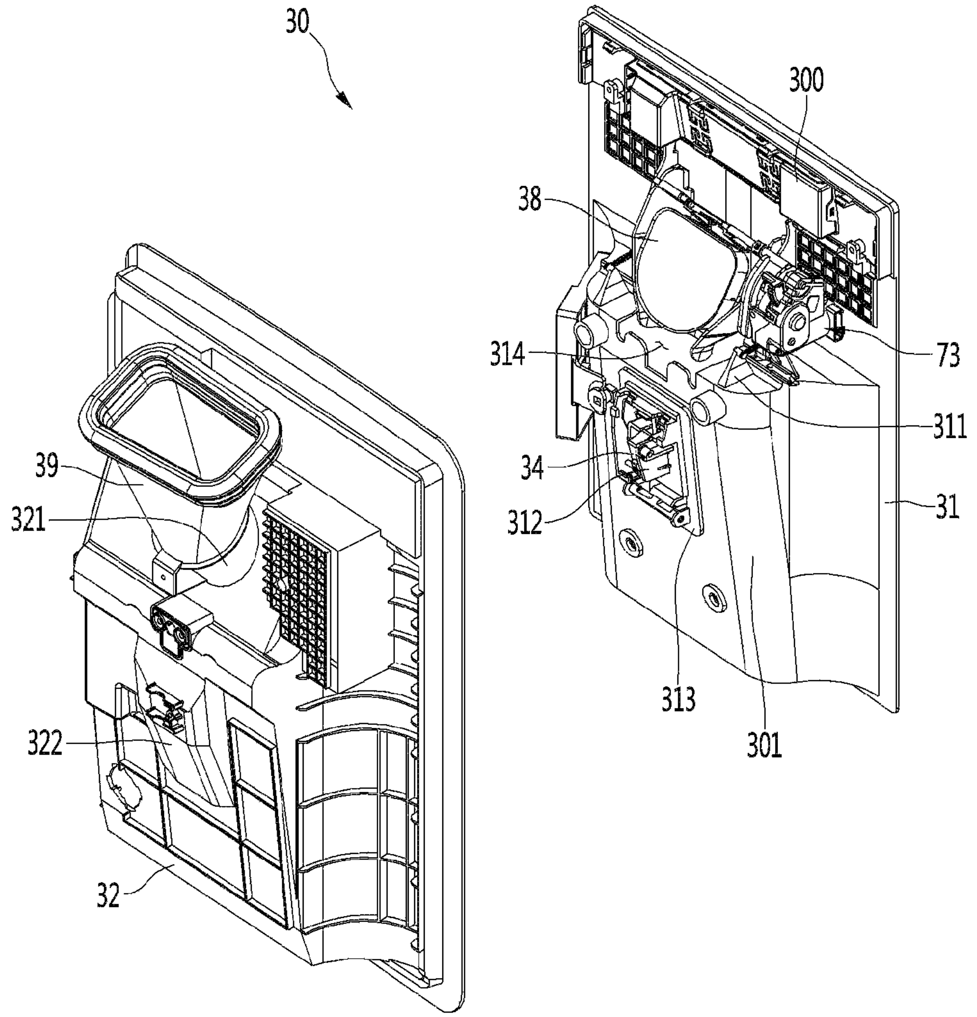
FIGS. 39 and 40 are exploded perspective views of a dispenser casing constituting the dispenser according to an embodiment of the present invention.
Figure 40:
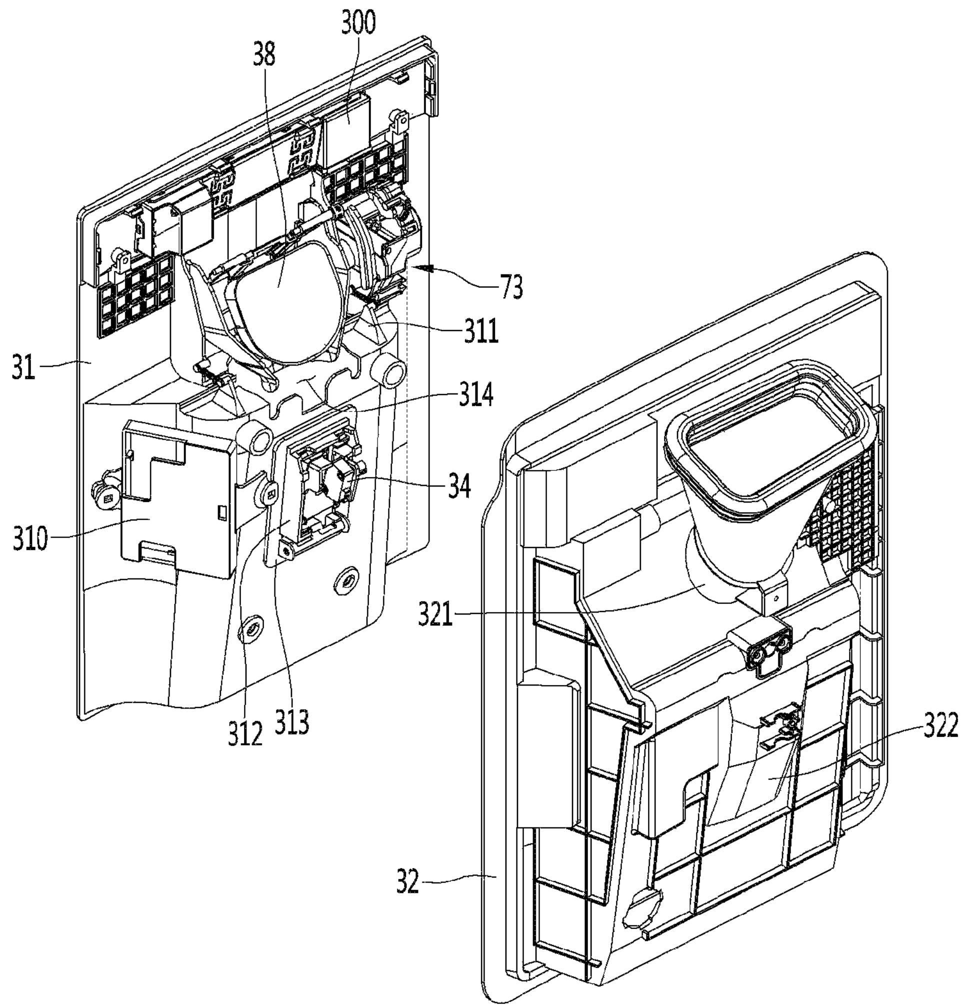

FIG. 38 is an enlarged perspective view of the dispenser provided in the door of the refrigerator according to an embodiment of the present invention, and FIGS. 39 and 40 are exploded perspective views of a dispenser casing constituting the dispenser according to an embodiment of the present invention.

Referring to FIGS. 38 to 40, the dispenser 30 according to an embodiment of the present invention is disposed on the front surface of the door.

Hereinafter, a structure in which the dispenser is disposed in the sub door 21, which is disposed at a front side, of the main door and the sub door, which constitute the door-in-door assembly, and the ice making room is provided in the main door 22 will be described as an example.

However, the present invention is not limited to a refrigerator in which the dispenser and the ice making room according to an embodiment of the present invention are provided in a different door. For example, the ice making room and the dispenser may be provided in one door.

Specifically, the dispenser 30 according to an embodiment of the present invention may include a dispenser casing including a front casing 31 and a rear casing 32, a discharge duct 39 connected to an upper portion of the dispenser casing, a discharge duct switching module 73 driving a duct cap (that will be described later) for opening and closing an outlet of the discharge duct 39, and a dispensing button 33 disposed on a front surface of the dispensing casing, and a funnel S that is tilted forward from the front surface of the dispenser casing.

A control panel 300 including a display part may be mounted above the dispenser 30, i.e., on an upper end of the dispenser casing. Although the control panel 300 is mounted on the dispenser casing as illustrated in the drawings, the control panel 300 may be disposed on an outer edge of the dispenser casing.

The control panel 300 may include a touch screen-type display part. An item desired to be dispensed may be selected through the control panel 300 by touching a button image or icon for a water or ice dispensing command input that is displayed on the display part. The item desired to be dispensed may include water and ice. The use may select one of the water and the ice through manipulation of the control panel 300. Furthermore, if it is desired to dispense the ice, one of cubed ice and crushed ice may be additionally selected.

Also, temperatures of the refrigerating compartment, the freezer compartment, and the chiller room may be set through the display part provided on the control panel 300.

The front casing 31 has a container accommodation part 301 in which a portion of the front surface of the front casing 31 is recessed backward. As the container accommodation part 301 increases in depth, the dispenser 30 increases in thickness in a front/rear direction. Thus, to realize a slim dispenser 30, it is important that the container accommodation part 301 decreases in recessed depth.

A rear surface of the container accommodation part 301 is obliquely inclined so that the recessed depth increases from a lower end to an upper end of the container accommodation part 301. A funnel hole 314 is defined in a top surface of the container accommodation part 301. A funnel S including an inner funnel 37 and an outer funnel 36 may be disposed in the funnel hole 314. The funnel S is rotatably coupled to a back surface of the front casing 31.

The outer funnel 36 constituting the funnel S may be exposed to the front surface of the door as illustrated in the drawing. That is, the front surface part of the front casing 31 and a front surface of the outer funnel 36 are designed to be disposed on the same plane. The funnel S may be tilted forward in the ice dispensing process. Here, a tilting operation method will be described later.

An outlet of the funnel S is exposed to the container accommodation part 301 through the funnel hole 314 defined in the top surface of the container accommodation part 301. Thus, a container such as a cup contacts the container accommodation part 301 to receive ice dispensed through the funnel S.

Specifically, a dispensing button accommodation groove 313 is recessed from a portion of the front casing 31 on which an inclined surface of the container accommodation part 301 is disposed, and the dispensing button 33 is rotatably disposed in the dispensing button accommodation groove 313. A switch mounting part 312 is disposed on a back surface of the dispensing button accommodation groove 313. A micro switch 34 is mounted on the switch mounting part 312.

Thus, the user manipulates the control panel 300 to select one of the water dispensing mode and the ice dispensing mode. Then, when the dispensing button 33 is pushed, the micro switch 34 is turned on to dispense a selected item of the water and the ice.

Here, the selection of the water dispensing mode and the ice dispensing mode is performed through an input unit provided on the control panel 300. Although the dispensing button 33 is used as a unit for inputting a dispensing command of the selected item, the dispensing button may be used for various methods.

For example, the water dispensing button and the ice dispensing button may be separately installed on the inclined surface of the container accommodation part 301. The water dispensing button and the ice dispensing button may be disposed to overlap each other in a stair shape at upper front and lower rear sides. When being manipulated, the dispensing buttons may be disposed so that the dispensing buttons do not interfere with each other. Thus, the user may push a button for dispensing a desired item. Thus, it is unnecessary to select the dispensing mode through the control panel.

A water faucet (or drinking water dispensing hole) 35 protrudes from an upper end of the container accommodation part 301. Specifically, an end of the dispenser water supply tube 62 extending along a space between the rear casing 32 and the dispenser liner 211 is connected to the water faucet 35 to dispense drinking water through the water faucet 35. The water faucet 35 protrudes forward from the inclined surface on which the container accommodation part 301 is disposed. When the user pushes the dispensing button 33 by using a container in which the water or the ice is received, the water dispensed from the water faucet 35 or the ice discharged through the funnel S may be received.

A spring support rib 311 protrudes from a portion corresponding to the top surface of the container accommodation part 301 on the back surface of the front casing 31. One end of a return spring 301 that will be described later is connected to the spring support rib 311, and the other end of the return spring 301 is connected to a spring hook part 363 of the outer funnel 36.

The duct cap 38 for selectively opening and closing the outlet of the discharge duct 39 is disposed on the funnel hole 314. The duct cap 38 is connected to the front surface of the rear casing 32 by the discharge duct switching module 73.

A dispenser controller 310 may be mounted on a rear edge of the container accommodation part 301. The dispenser controller 310 may be a controller for controlling an operation of the micro switch 34.

The rear casing 32 constituting the dispenser casing is coupled to the back surface of the front casing 31 to cover the micro switch 34, the dispenser controller 310, the duct cap 38, and the discharge duct switching module 73. A switch cover part 322 is recessed backward along the shape of the container accommodation part 301 to protrude backward at the portion corresponding to the mounted position of the micro switch 34.

A guide sleeve 321 extends by a predetermined length on the back surface of the rear casing 32 on which the duct cap 38 is disposed. An upper end of the guide sleeve 321 is connected to an outlet of the discharge duct 39, i.e., a lower end, and the guide sleeve 321 is selectively opened and closed by the duct cap 38.

In the detailed description and claims of the present invention, although the duct cap 38 selectively opens and closes the discharge duct 39, the duct cap 38 may exactingly open and close a lower end of the guide sleeve 321. However, the opening/closing of the discharge duct 39 through the duct cap 38 may represent opening/closing of an end of the ice discharge passage defined in the door or an outlet of the ice discharge passage. That is, the discharge duct 39 may represent the ice discharge passage including the guide sleeve 321.

Figure 41:
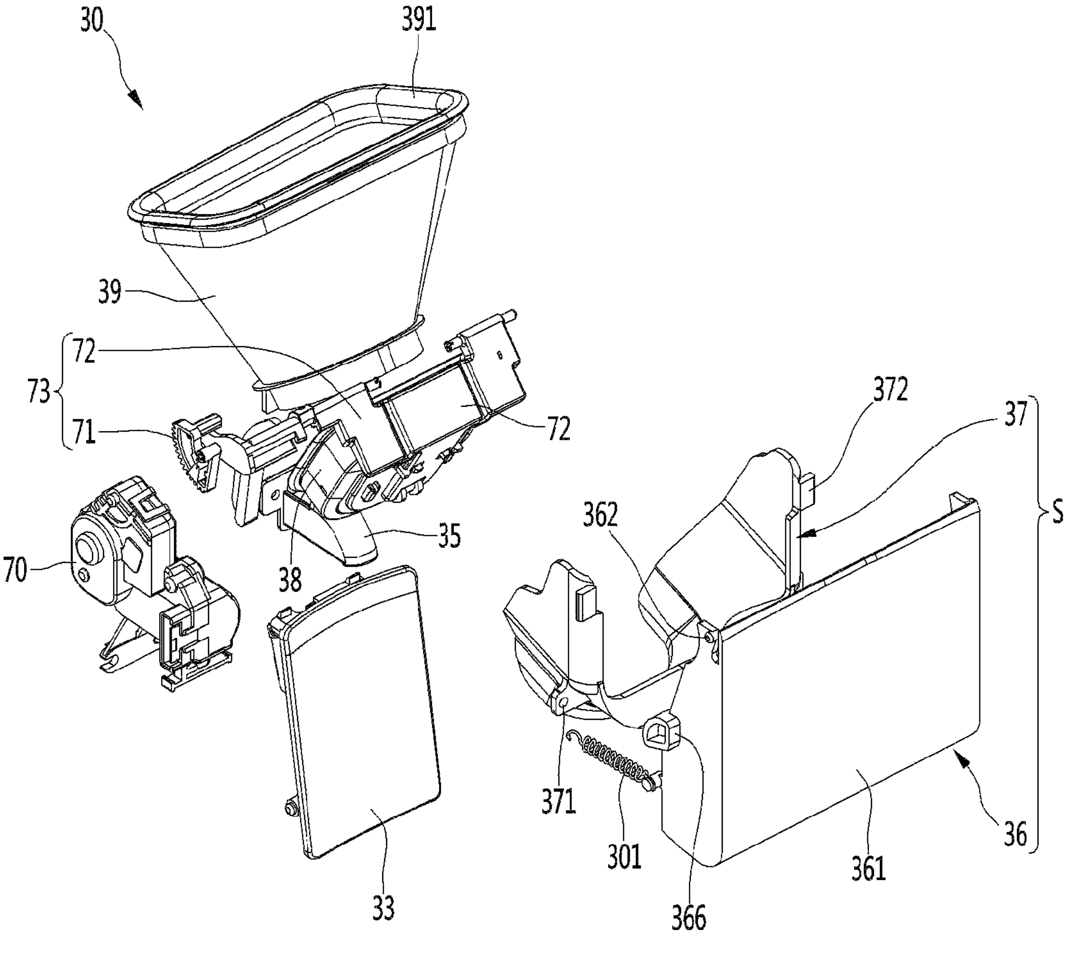
FIG. 41 is a front exploded perspective of the dispenser in a state in which the dispenser casing is removed according to an embodiment of the present invention.
Figure 42:
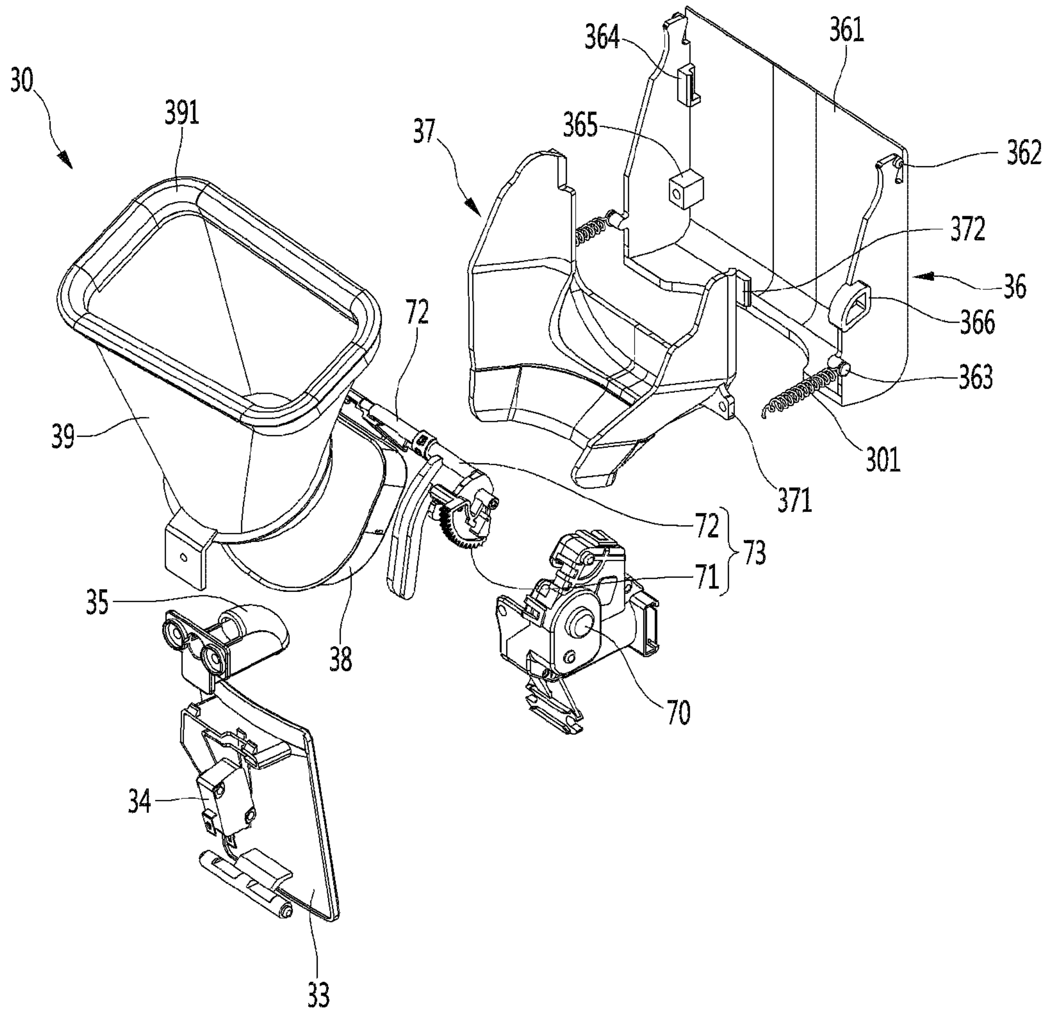
FIG. 42 is a rear exploded perspective view of the dispenser.

FIG. 41 is a front exploded perspective of the dispenser in a state in which the dispenser casing is removed according to an embodiment of the present invention, and FIG. 42 is a rear exploded perspective view of the dispenser.

Referring to FIGS. 41 and 42, the dispenser 30 according to an embodiment of the present invention may include a portion of all of the dispensing casing 31, the dispensing button 33, the funnel S including the inner funnel 37 and the outer funnel 36, the discharge duct switching module 73, and the water faucet 35. The dispenser 30 may further include a micro switch 34 disposed at a rare side of the dispensing button 33.

Specifically, the funnel S may include the outer funnel 36 and the inner funnel 37 disposed at a rear side of the outer funnel 36. The outer funnel 36 is made of an opaque material, and the inner funnel 37 is made of a transparent material. Thus, the inside of the funnel S is not seen from a front side of the dispenser 30. When a lighting unit provided in the funnel S is turned on, the funnel S may be recognized by the user at night to improve use convenience.

The front surface of the outer funnel 36 may be disposed on the same plane as that of the front casing 31. Thus, when the dispenser 30 is viewed from the front side of the refrigerator, the front surface of the outer funnel 36 is exposed to the outside. The front surface of the outer funnel 36 may be used as the display part. That is to say, an image or moving picture for displaying the ice dispensing mode or the ice dispensing state may be displayed on the front surface of the outer funnel 36.

The outer funnel 36 may include a front surface and left and right surface parts which respectively extend backward from left and right edges of the front surface part. A rotation shaft 362 protrudes from an upper end of each of the left and right surface parts of the outer funnel 36. The rotation shaft 362 is rotatably connected to the back surface of the front casing 31.

The spring hook part 363 extends from a rear end of each of the left and right surface parts, and a front end of the return spring is connected to the spring hook part 363. As described above, the rear end of the return spring 301 is connected to the spring support rib 311 protruding from the back surface of the front casing 31. When the outer funnel 36 rotates forward about the center of the rotation shaft 362, restoring force is accumulated while the return spring 301 is expanded. When force for rotating the outer funnel 36 is removed, the return spring 301 is contracted by the restoring force, and then the outer funnel 36 is returned to its original position.

A guide protrusion 366 protrudes one side or each of both sides of the left and right surface parts of the outer funnel 36. Although the guide protrusion 366 is disposed on only one side of the left and right surface parts in the drawing, the present invention is not limited thereto. For example, the guide protrusions 366 may be disposed on both side surfaces, respectively.

The guide protrusion 366 is interlocked with a push link, which will be described later, constituting the discharge duct switching module 73 to allow the outer funnel 36 to be tilted in the front/rear direction. This will be described in detail with reference to the accompanying drawings.

A hook rib 364 is bent from each of left and right edges of the back surface of the outer funnel 36. The coupling boss 365 may be disposed on each of the left and right edges of the back surface of the outer funnel 36, which correspond to the lower side of the hook rib 364.

The inner funnel 37 is integrally coupled to the outer funnel 36 to form the funnel S.

Specifically, the inner funnel 37 may have an opened front upper surface, a front lower surface, and left and right surfaces. Since the front upper surface of the inner funnel 37 is opened, interference between the inner funnel 37 and the duct cap 38 may be prevented.

A guide hole guiding discharge of ice is defined in a lower end of the inner funnel 37. The guide hole may extend in a shape of which a width gradually decreases toward the lower end thereof.

A hook end 372 is disposed on the inner funnel 37. Particularly, the hook end 372 may be disposed on an edge portion at which the front surface part and both side surfaces of the inner funnel 37 contact each other and also disposed at an upper end point of the inner funnel 37. The hook end 372 may be inserted into the hook rib 364 disposed in the back surface of the outer funnel 36.

A coupling rib 371 extends from each of the left and right edges of the lower end of the front surface part of the inner funnel 37. A coupling hole may be defined in the coupling rib 371. A coupling member may pass through the coupling hole of the coupling rib 371 and then be inserted into the coupling boss 365. Thus, in the inner funnel 37, the hook end 372 is hooked with the hook rib 364, and the coupling rib 371 is fixed to the coupling boss 365 by the coupling member. Thus, the inner funnel 37 may be coupled to the back surface of the outer funnel 36 to form one body. A method for integrally coupling the inner funnel 37 to the outer funnel 36 may be variously performed in addition to the method described in the current embodiment.

Figure 43:
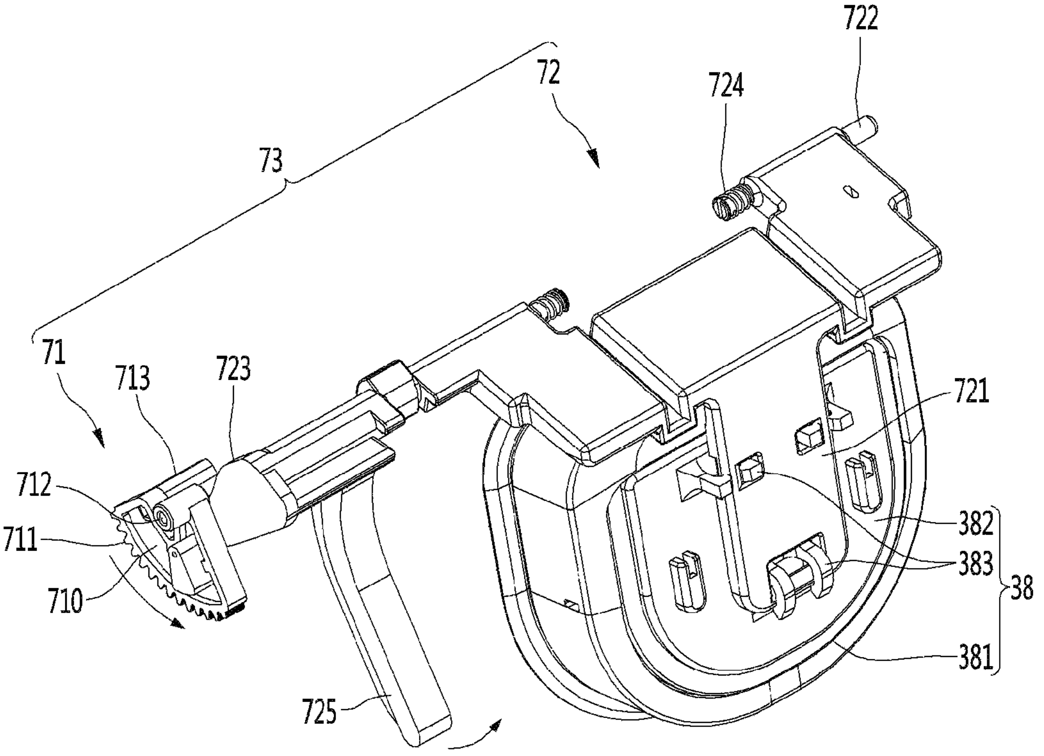
FIG. 43 is a front perspective view of a discharge duct switching module constituting the dispenser according to an embodiment of the present invention.
Figure 44:
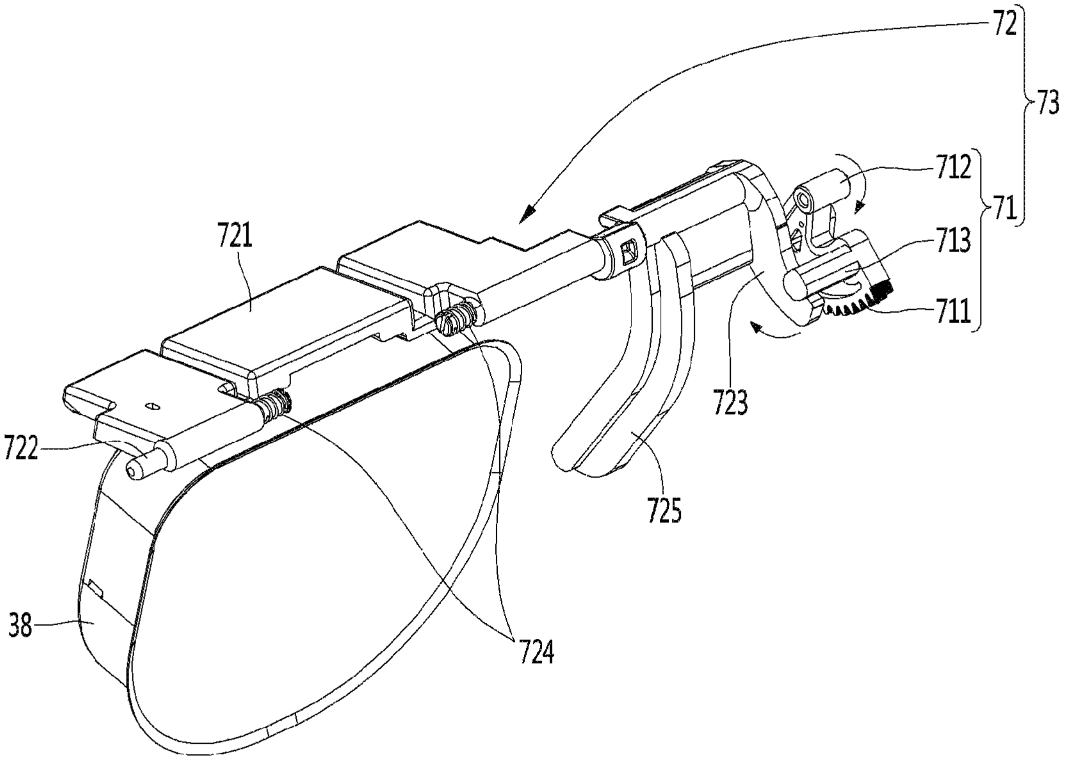
FIG. 44 is a rear perspective view of the discharge duct switching module.

FIG. 43 is a front perspective view of the discharge duct switching module constituting the dispenser according to an embodiment of the present invention, and FIG. 44 is a rear perspective view of the discharge duct switching module.

Referring to FIGS. 43 and 44, the discharge duct switching module 73 according to an embodiment of the present invention includes a duct cap driving motor 70, a rack gear 71 connected to a driving shaft of the duct cap driving motor 70, and a duct cap support 72 interlocked with the rack gear 71 to rotate.

The duct cap 38 is mounted on the duct cap support 72, and the duct cap support 72 and the duct cap 38 rotate in one body.

Specifically, the duct cap support 72 may include a cap holder 721 coupled to a front surface of the duct cap 38, a holder shaft 722 extending from an upper end of the cap holder 721 in a left/right direction, a rotation arm 723 extending from an end of the holder shaft 722 in a direction crossing the holder shaft 722, and a push link 725 extending in a direction crossing the holder shaft 722 and angled at a predetermined angle with respect to the rotation arm 723. The push link 725 may further extend than the rotation arm 723.

The return spring is wound around the holder shaft 722. When rotation force applied to the holder shaft 722 is removed, restoring force may be provided so that the duct cap support 72 is returned to its original position. Here, the original position of the duct cap support 72 may represent a position at which the duct cap 38 closes a lower end of the guide sleeve 321, i.e., a lower end of the ice discharge passage.

The cap holder 721 extends in the direction crossing the holder shaft 722 to cover a top surface of the duct cap 38 and then extends after being bent downward to be closely attached to a front surface of the duct cap 38. Specifically, a plurality of coupling holes may be defined in a portion of the cap holder 721 to which the front surface of the duct cap 38 is closely attached.

The duct cap 38 may include a duct cap body 381 having a predetermined thickness and also having a size and shape that are enough to cover the lower end of the guide sleeve 321 and a duct cap cover 382 mounted on the front surface of the duct cap body 381. A plurality of coupling protrusions 383 protrude from the front surface of the duct cap cover 382 and are respectively inserted into the plurality of coupling holes defined in the cap holder 721. Thus, when the holder shaft 722 rotates, the duct cap 38 rotates together with the duct cap support 72 in one body.

The rack gear 71 may include a gear body 710 having a fan shape, a gear part 711 disposed on a circumferential surface of the gear body 710, a rack gear shaft 712 disposed at a center of the gear body 710, and an extension end 713 extending parallel to the holder shaft 722 from the back surface of the gear body 710.

Specifically, the extension end 713 is disposed at a point that is spaced apart form the rack gear shaft 712 and has a shape in which the duct cap support 72 crosses the rotation arm 723 and is placed on a top surface of the rotation arm 723.

A driving gear (not shown) is mounted on the rotation shaft of the duct cap driving motor 70 and engaged with the gear part 711 of the rack gear 71 on an outer circumferential surface of the driving gear. When the duct cap driving motor 70 is driven, the driving gear rotates, and then, the gear part 711 rotates together with the driving gear.

When the duct cap driving motor 70 is driven, the rack gear shaft 712 rotates, and then, the extension end 713 rotates about the rack gear shaft 712. The extension end 713 compresses the rotation arm 723 to allow the rotation arm 723 to rotate about the holder shaft 722.

Hereinafter, a process in which the ice discharge passage is opened, and the ice shutter is tilted according to an operation of the discharge duct switching module will be described with reference to the accompanying drawings.

Figure 45:
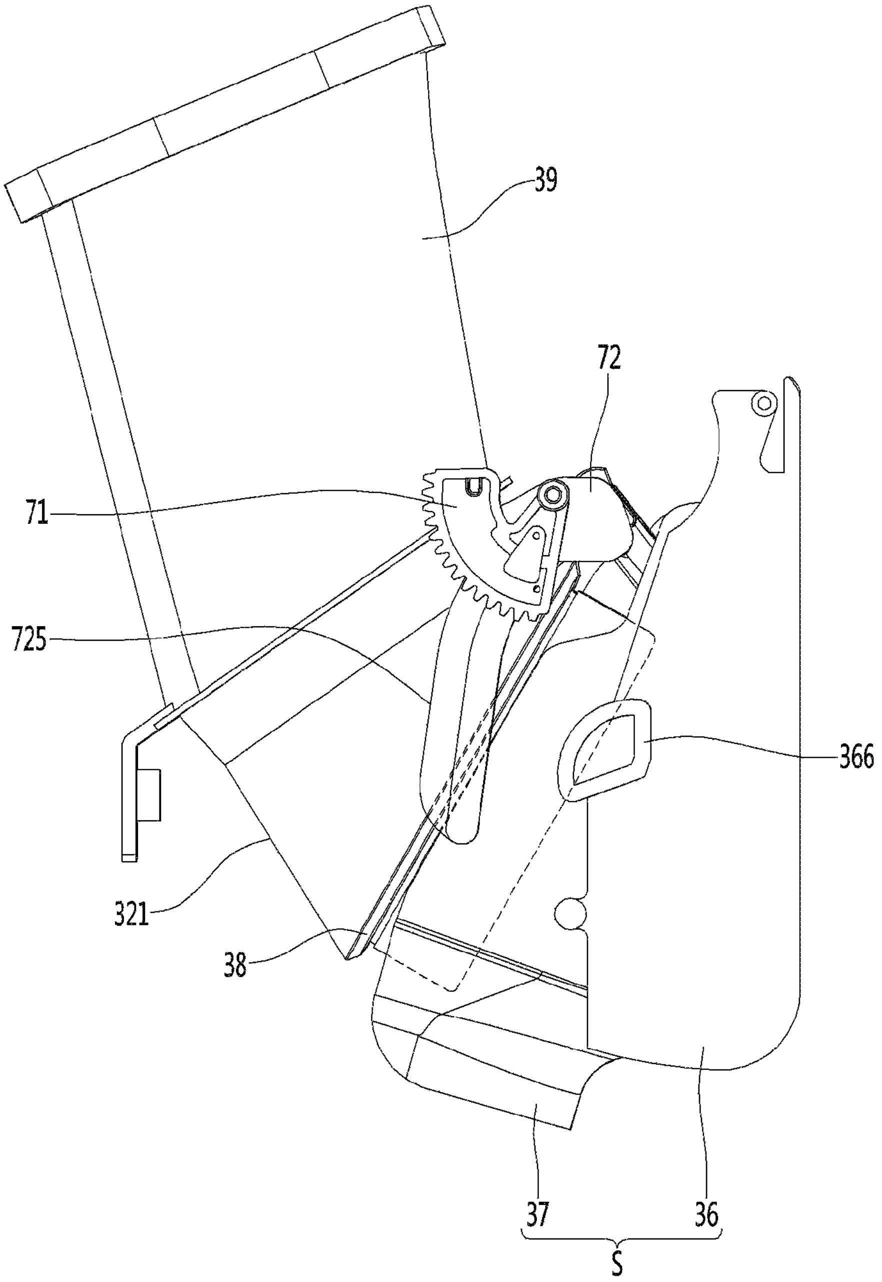
FIG. 45 is a side view of the dispenser in a state in which the discharge duct switching module is stopped.
Figure 46:
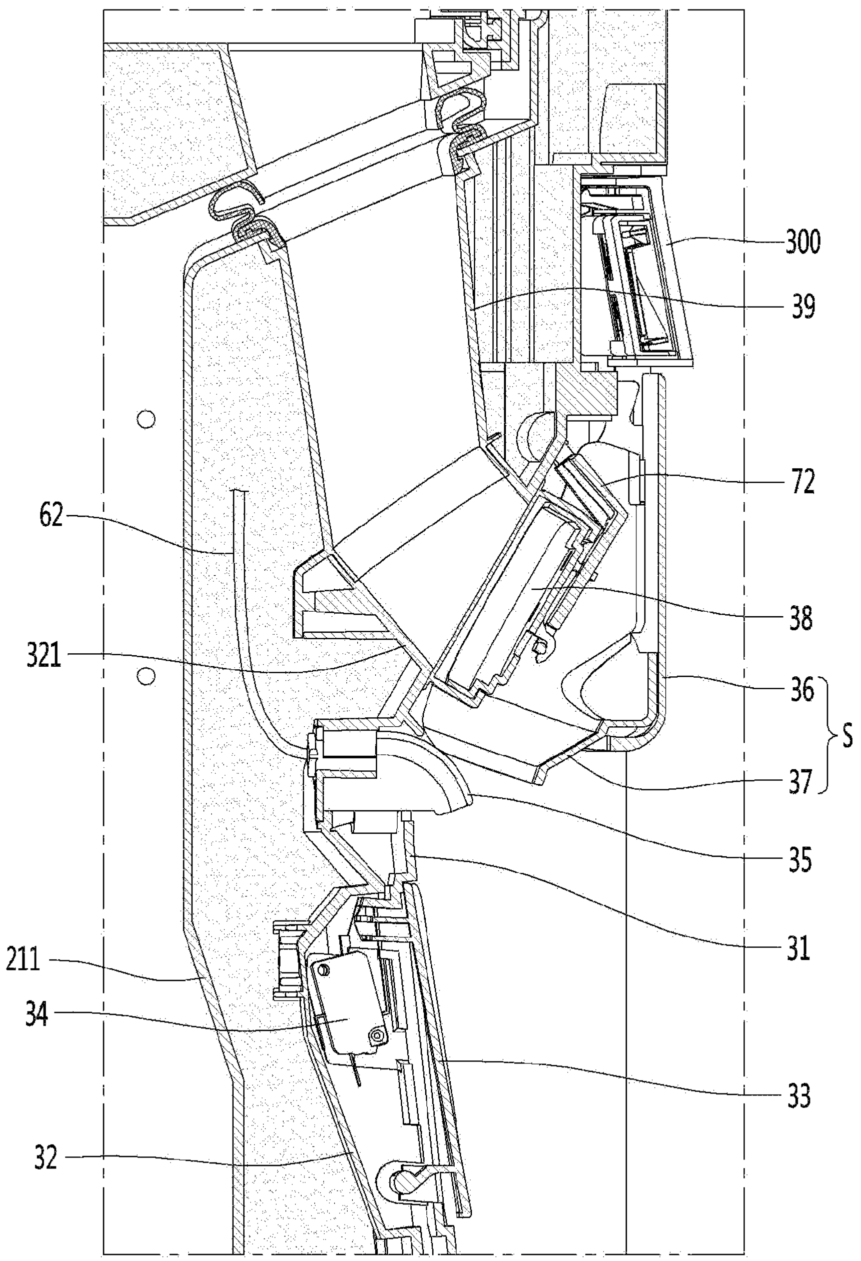
FIG. 46 is a side cross-sectional view of the dispenser.

FIG. 45 is a side view of the dispenser in a state in which the discharge duct switching module is stopped, and FIG. 46 is a side cross-sectional view of the dispenser.

Referring to FIGS. 45 and 46, in a state in which the ice dispensing command is not inputted, the ice discharge passage connecting the dispenser 30 to the ice making room 201 is maintained in a closed state by the duct cap 38.

Specifically, the duct cap 38 is maintained in a state in which the duct cap 38 closes the outlet of the guide sleeve 321. In this state, a state in which the push link 725 is spaced apart from the guide protrusion 366 disposed on the rear end of the side surface of the outer funnel 36 may be maintained.

Also, the front surface of the outer funnel 36 may be disposed on the same plane as that of the front casing 31.

Figure 47:
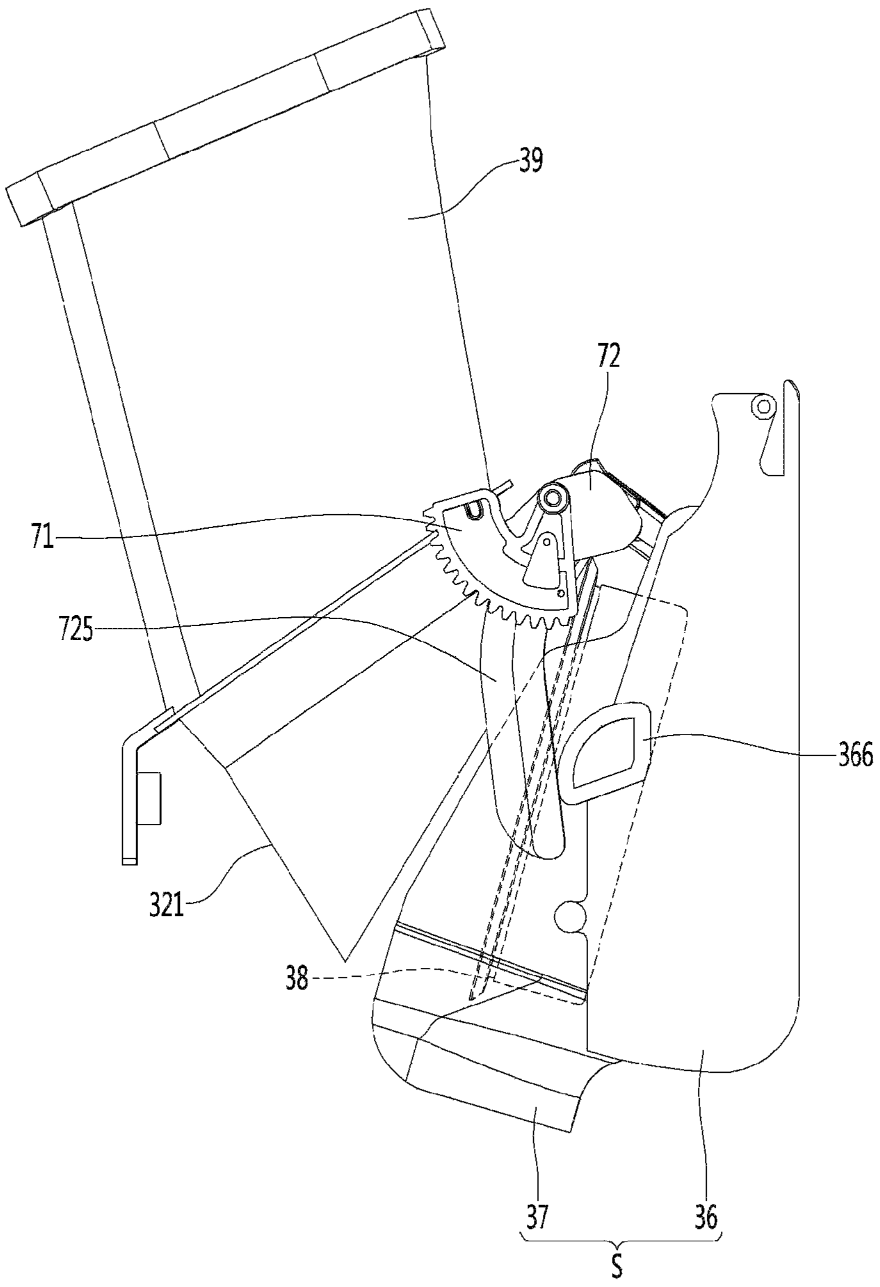
FIG. 47 is a side view of the dispenser in a state in which a duct cap rotates at a predetermined angle.
Figure 48:
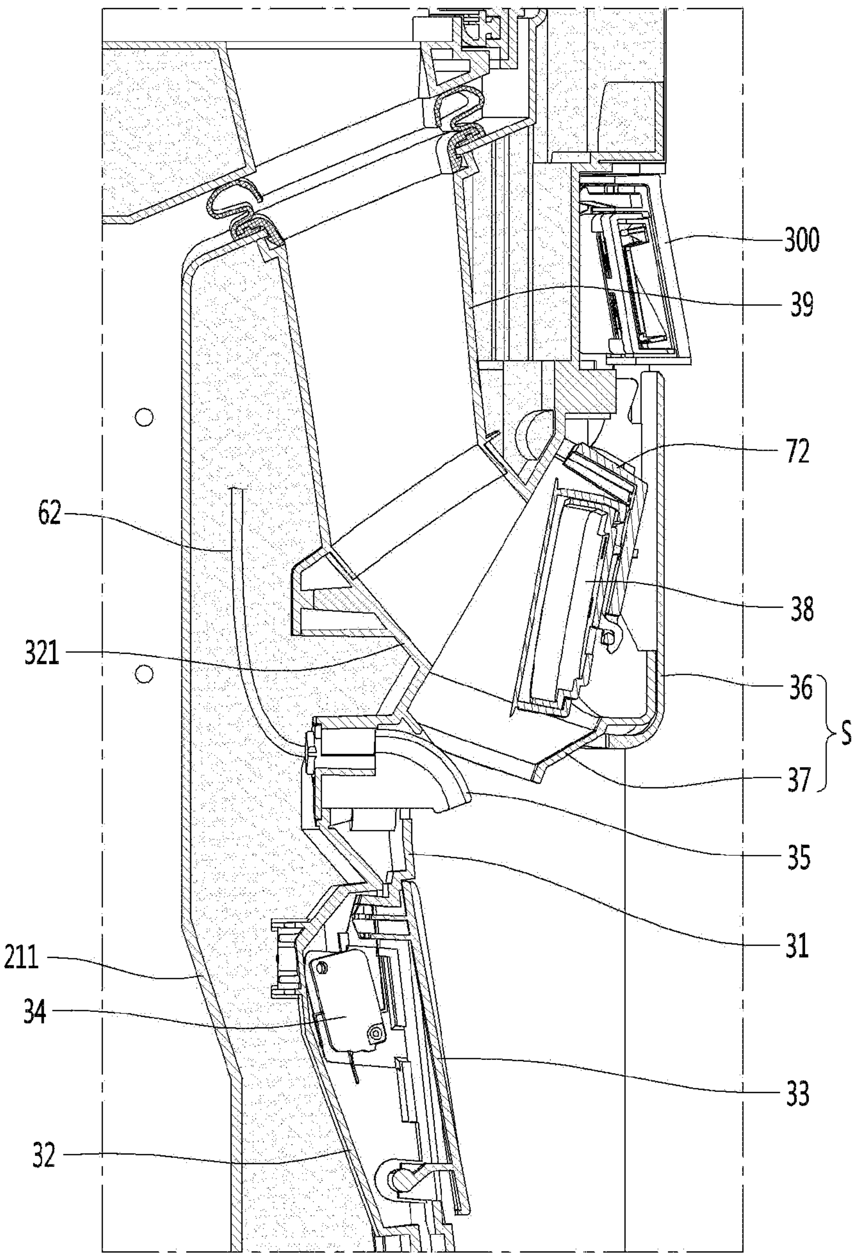
FIG. 48 is a side cross-sectional view of the dispenser.

FIG. 47 is a side view of the dispenser in a state in which a duct cap rotates at a predetermined angle, and FIG. 48 is a side cross-sectional view of the dispenser.

Referring to FIGS. 47 and 48, when the user pushes the dispensing button 33 to input the ice dispensing command, power is applied to the duct cap driving motor 70 to allow the driving shaft (or the rotation shaft) of the duct cap driving motor 70 to rotate.

Specifically, when the driving gear connected to the driving shaft of the duct cap driving motor 70 rotates, the rack gear 71 engaged with the driving gear rotates. As the rack gear 71 rotates, the extension end 713 rotates.

When the extension end 713 rotates, the rotation arm 723 placed on the bottom surface of the extension end 713 rotates together with the extension end 713 in a direction crossing the extension end 713. As a result, the push link 725 rotates together.

Only the duct cap rotates, and the funnel S is maintained in the former state until the push link 725 contacts the guide protrusion 366 of the outer funnel 36.

When the duct cap 38 and the funnel S rotate at the same time, a rotation amount of funnel S may excessively increase, and thus, the outer funnel 36 may excessively protrude from the front surface of the sub door 21. Thus, a time difference between a rotation start time point of the funnel S and a rotation start time point of the duct cap 38 may be set.

Figure 49:
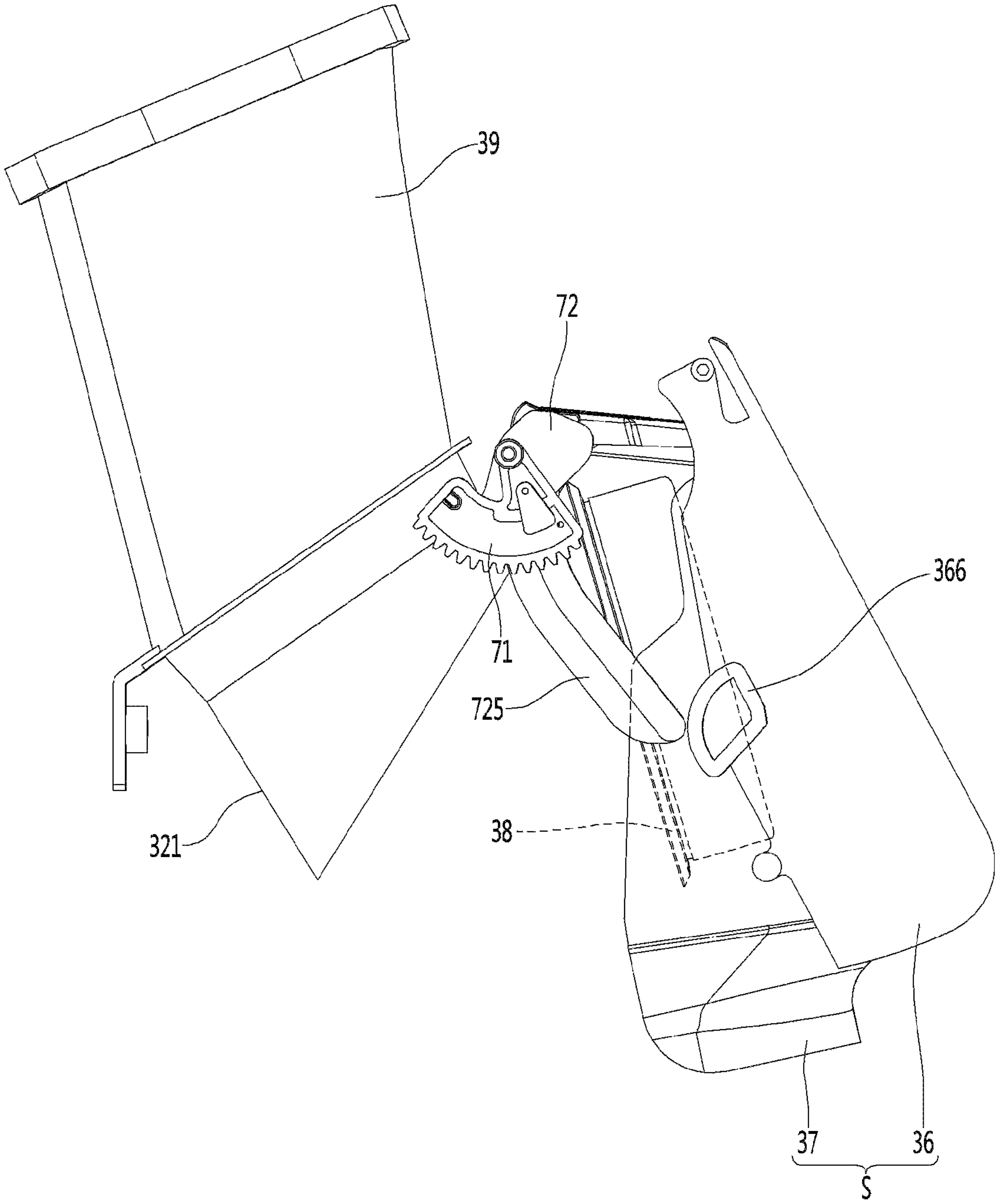
FIG. 49 is a side view of the dispenser in a state in which the duct cap maximally rotates.
Figure 50:
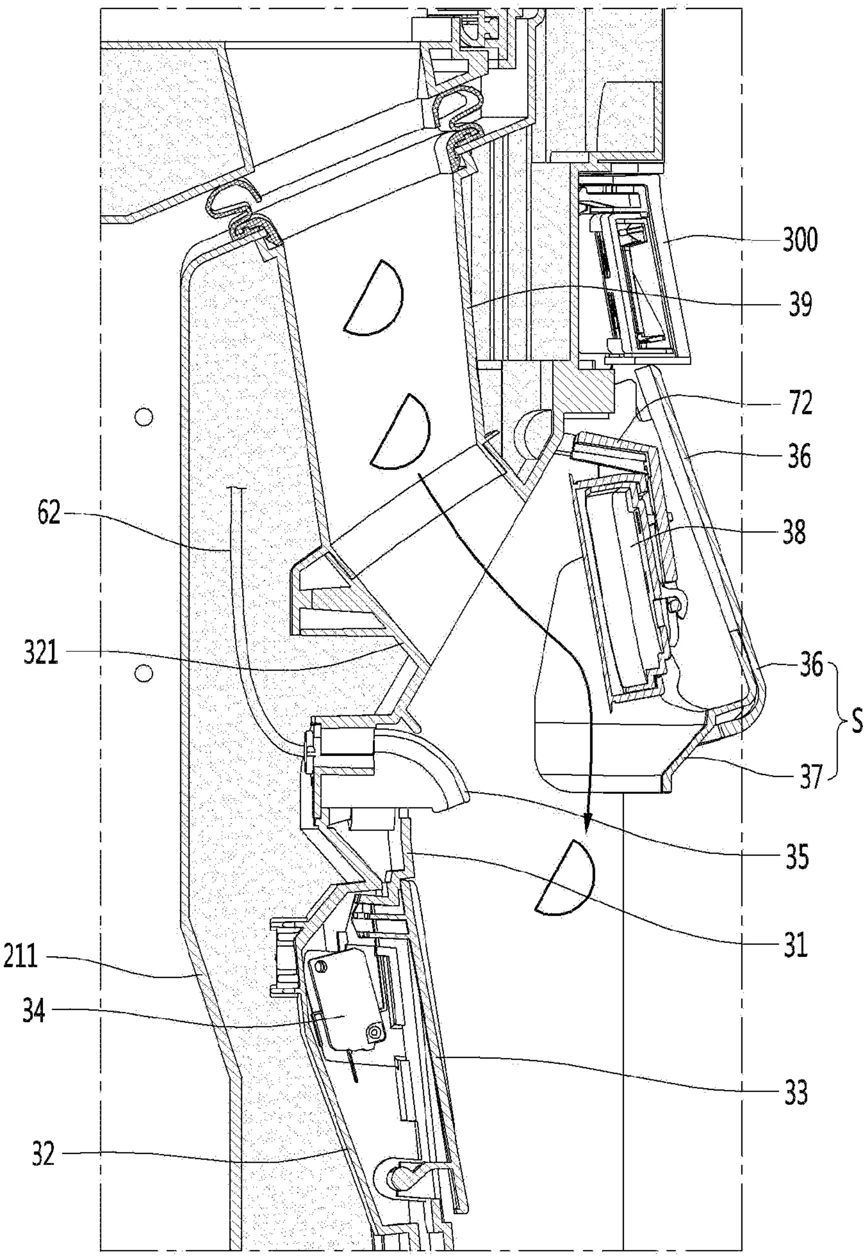
FIG. 50 is a side cross-sectional view of the dispenser.

FIG. 49 is a side view of the dispenser in a state in which the duct cap maximally rotates, and FIG. 50 is a side cross-sectional view of the dispenser.

Referring to FIGS. 49 and 50, in a state in which the push link 725 rotates until the push link 725 contacts the guide protrusion 366, when the push link 725 further rotates, the outer funnel 36 may also rotate together with the duct cap 38.

When the outer funnel 36 rotates forward, the inner funnel 37 coupled to the back surface of the outer funnel 36 rotates in one body. Thus, the outer funnel 36 is tilted about the rotation shaft 362 of the outer funnel 36 by a predetermined angle from the front surface of the dispenser casing, i.e., the front casing 31.

As a result, the ice discharge hole defined in the lower end of the inner funnel 37 may rotate forward. The ice discharge hole defined in the lower end of the inner funnel 37 may be further expanded forward on the top surface of the container accommodation part 301 disposed on the front surface of the dispenser 30. Thus, the inner funnel 37 may more easily receive ice through the ice discharge hole.

That is, since the ice discharge hole moves to the front side of the dispenser while the ice discharge hole increases in transverse cross-sectional area, it is unnecessary to deeply push a container into the container accommodation part 301 so as to receive the ice.

In addition, since the funnel S is tilted to the front side of the dispenser casing in the ice dispensing mode, the container accommodation part 301 may have a thinner depth in the front/rear direction when compared to the related art, thereby realizing the slim dispenser.

Since a dead volume that is secured for accommodating the rear protrusion of the dispenser may be reduced through the slim dispenser 30. Thus, an effective storage volume of the chiller room 202 may increase.

An inclination of the ice discharge passage constituted by the discharge duct 39 and the guide sleeve 321, i.e., an angle inclined backward from the vertical surface may decrease when compared to the related art. Thus, the thickness of the door in which the dispenser 30 is provided may decrease.

When the duct cap driving motor 70 rotates reversely after the dispensing of ice is completed, the rack gear 71 may also reversely rotate to return to its original position.

Specifically, when the rack gear 71 rotates reversely, pressing force applied to the rotation arm 723 is removed. Thus, the duct cap support 72 may rotate reversely to return to its original position by the restoring force of the return spring 724 that is wound around the holder shaft 722. Since the duct cap support 72 rotates reversely, the duct cap 38 closes the outlet of the guide sleeve 321.

As the push link 725 rotates reversely, pressing force applied to the funnel S is removed. The outer funnel 36 may rotate to return its original position by the restoring force accumulated in the return spring 301 connected to the rear end of both side surfaces of the outer funnel 36. Thus, the outer funnel 36 and the inner funnel 37 may return together to its original position. Since separate driving force for returning the duct cap 38 to its original position is unnecessary by the return spring 301, a power consumption reduction effect may be obtained.

As described above, although the rack gear 71 is connected to the rotation shaft of the duct cap driving motor 70, and the duct cap support 72 rotates by the rack gear 71, the present invention is not limited thereto.

Particularly, the rack gear 71 may be removed, and the holder shaft 722 of the duct cap support 72 may be directly connected to the rotation shaft of the duct cap driving motor 70.

Figure 51:
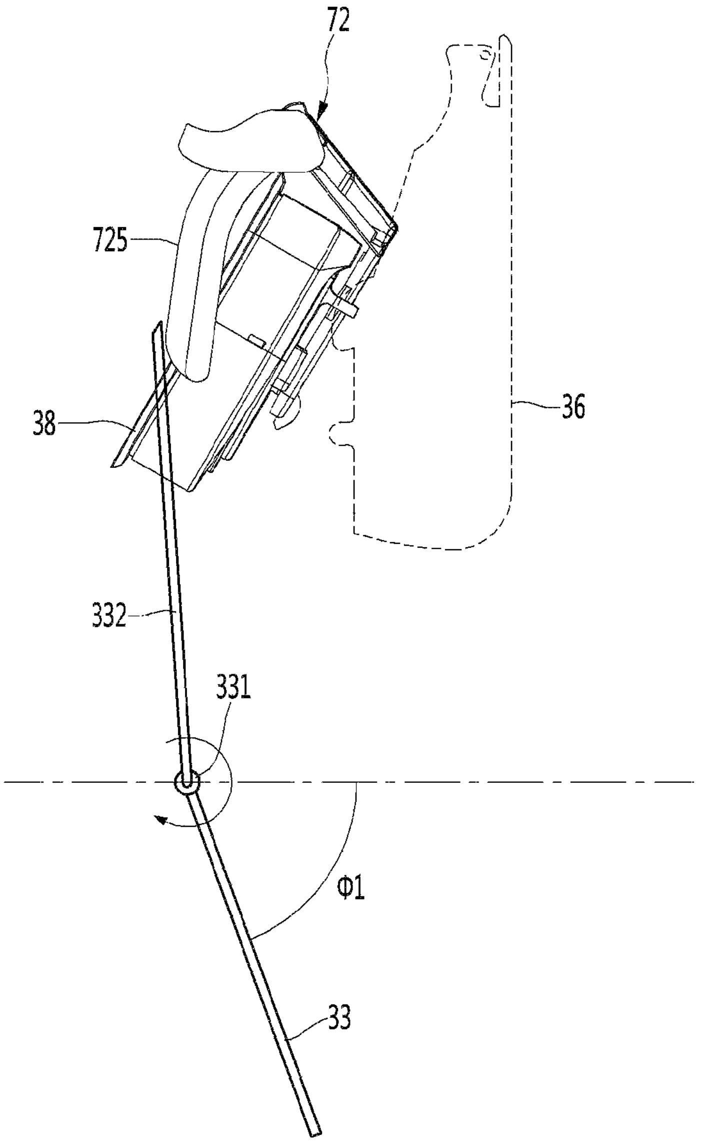
FIGS. 51 to 53 are views successively illustrating operations of a discharge duct switching module according to another embodiment of the present invention.
Figure 52:
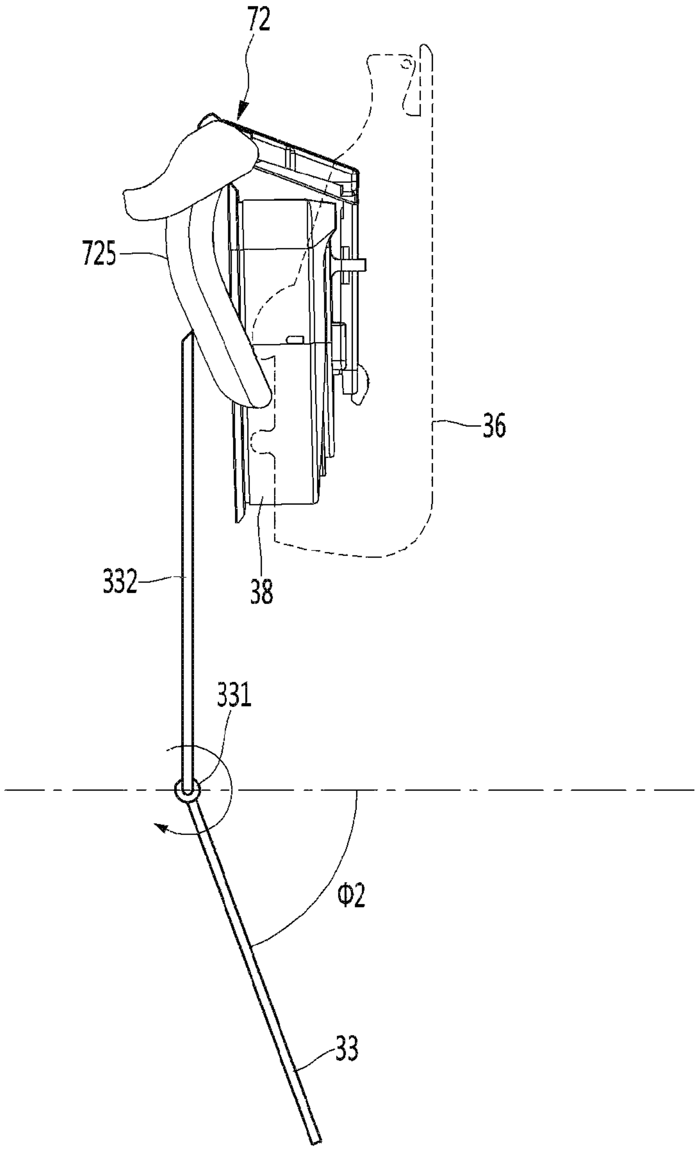
Figure 53:
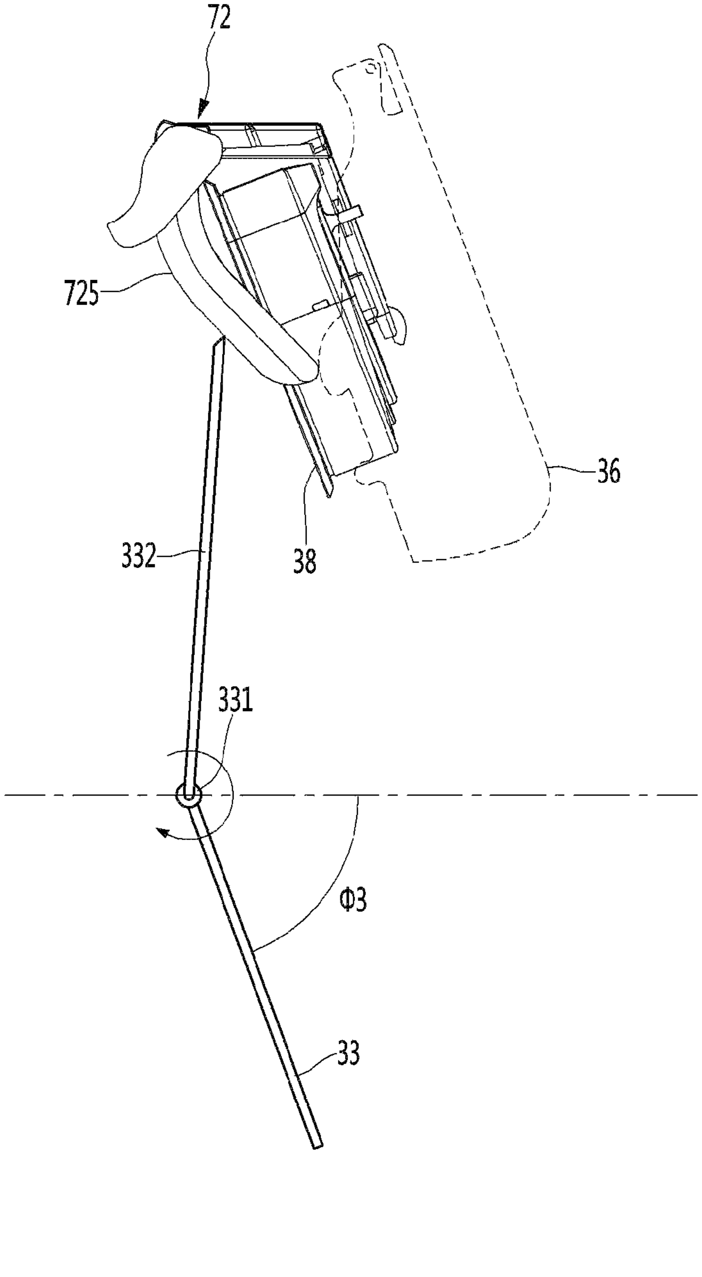

FIGS. 51 to 53 are views successively illustrating operations of a discharge duct switching module according to another embodiment of the present invention.

Referring to FIG. 51, in a discharge duct cap module according to another embodiment of the present invention, the driving motor for rotating the duct cap 38 to open the ice discharge passage is not provided.

Specifically, the discharge duct switching module according to another embodiment is the same as that according to the foregoing embodiment except for a driving unit that is substitute for the duct cap driving motor 70 according to the foregoing embodiment.

Specifically, the driving unit that is substitute for the duct cap driving motor 70 may include a transmission link 332 connected to a hinge shaft 331 of the dispensing button 33. The transmission link 332 may be a separate link extending from an upper end of the dispensing button 33 or an injection-molded single body in which the dispensing button 33 and the transmission link 332 are angled at a predetermined angle. The hinge shaft 331 may be disposed at a point at which the dispensing button and the transmission link 332 contact each other.

The transmission link 332 may have a length that is enough to rotate the push link 725 forward at a predetermined angle.

When the transmission link 332 is connected to the dispensing button 33 through a separate part, the main gear may be mounted on the hinge shaft of the dispensing button 33, and the sub gear may be mounted on a lower end of the transmission link 332. An intermediate gear is disposed between the main gear and the sub gear so that the rotation direction of the main gear is equal to that of the sub gear. Thus, the transmission link 332 rotates in the same direction as the rotation direction of the dispensing button 33 to press the push link 725.

The main gear has a diameter greater than the sub gear. Although a rotation amount of dispensing button 33 is less, the push link 725 may sufficiently rotate. That is, the duct cap 38 may sufficiently rotate through only the rotation amount of dispensing button 33 to completely open the ice discharge passage.

As illustrated in FIG. 51, in a state in which the dispensing button 33 is not pushed to dispense ice, the dispensing button 33 is maintained in a state of being spaced a predetermined angle φ1 from a horizontal line passing through the hinge shaft 331.

Referring to FIG. 52, when the use press the front surface of the dispensing button 33 to dispense ice, the dispensing button rotates at a predetermined angle to form a predetermined angle (φ2, φ2>φ1) with respect to the horizontal line.

Referring to FIG. 53, in a state in which the dispensing button 33 rotates at an angle φ2 described in FIG. 52, when the dispensing button 33 is further pressed, the transmission link 332 allows the push link 725 to further rotate at a predetermined angle forward. When the dispensing button 33 is fully pushed, i.e., when an angle (φ3, φ3>φ2) between the dispensing button 33 and the horizontal line is maximized, the duct cap may maximally rotate forward, and the funnel S may be tilted forward.

According to the above-described structure, it is unnecessary to provide a separate power source so as to open the ice discharge passage by rotating the duct cap 38. Thus, the user may sufficiently push the dispensing button 33 by only using physical force thereof.

Figure 54:
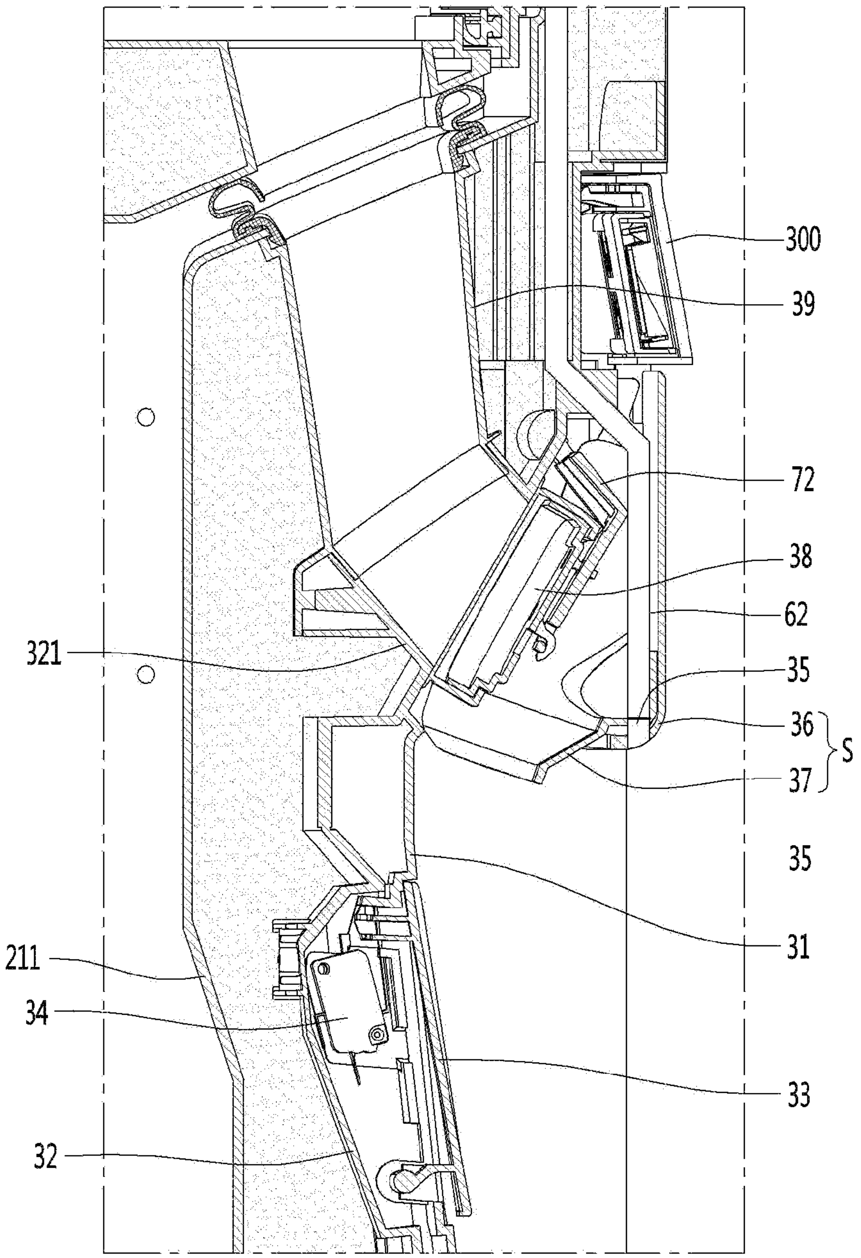
FIG. 54 is a side cross-sectional view illustrating a structure of a dispenser according to further another embodiment of the present invention.

FIG. 54 is a side cross-sectional view illustrating a structure of a dispenser according to further another embodiment of the present invention.

Referring to FIG. 54, a dispenser 30 according to further another embodiment of the present invention is the same as that according to the foregoing embodiment except for a position of the water faucet 35. Thus, their duplicated descriptions with respect to the same parts will be omitted.

Specifically, although the water faucet 35 is fixed to the upper portion of the rear surface of the container accommodation part 301 in the foregoing embodiment, the water faucet 35 may also be tilted together with the funnel S in the current embodiment.

That is, the dispenser water supply tube 62 may extend along the space between the front surface of the sub door 21 and the front surface of the discharge duct 39, and the water faucet 35 may be disposed on a lower end of the funnel S.

More specifically, the water faucet 35 may be disposed on the lower end of the funnel S, which corresponds between the inner funnel 37 and the outer funnel 36, and the dispenser water supply tube 62 may extend to the water faucet 35 along the inside of the sub door 21.

Although the ice making room 201 supplying ice to the dispenser is installed in the main door 22 in an embodiment, the ice making room may be installed in one of the main door 22, the cabinet 11, and the refrigerating compartment 114. That is, the dispenser according to an embodiment of the present invention may be applied to the refrigerator in which the ice making room is installed in the cabinet. In addition, the dispenser according to an embodiment of the present invention may be provided in a door different from the door in which the ice making room is installed or provided in the door in which the ice making room is installed.

Figure 55:
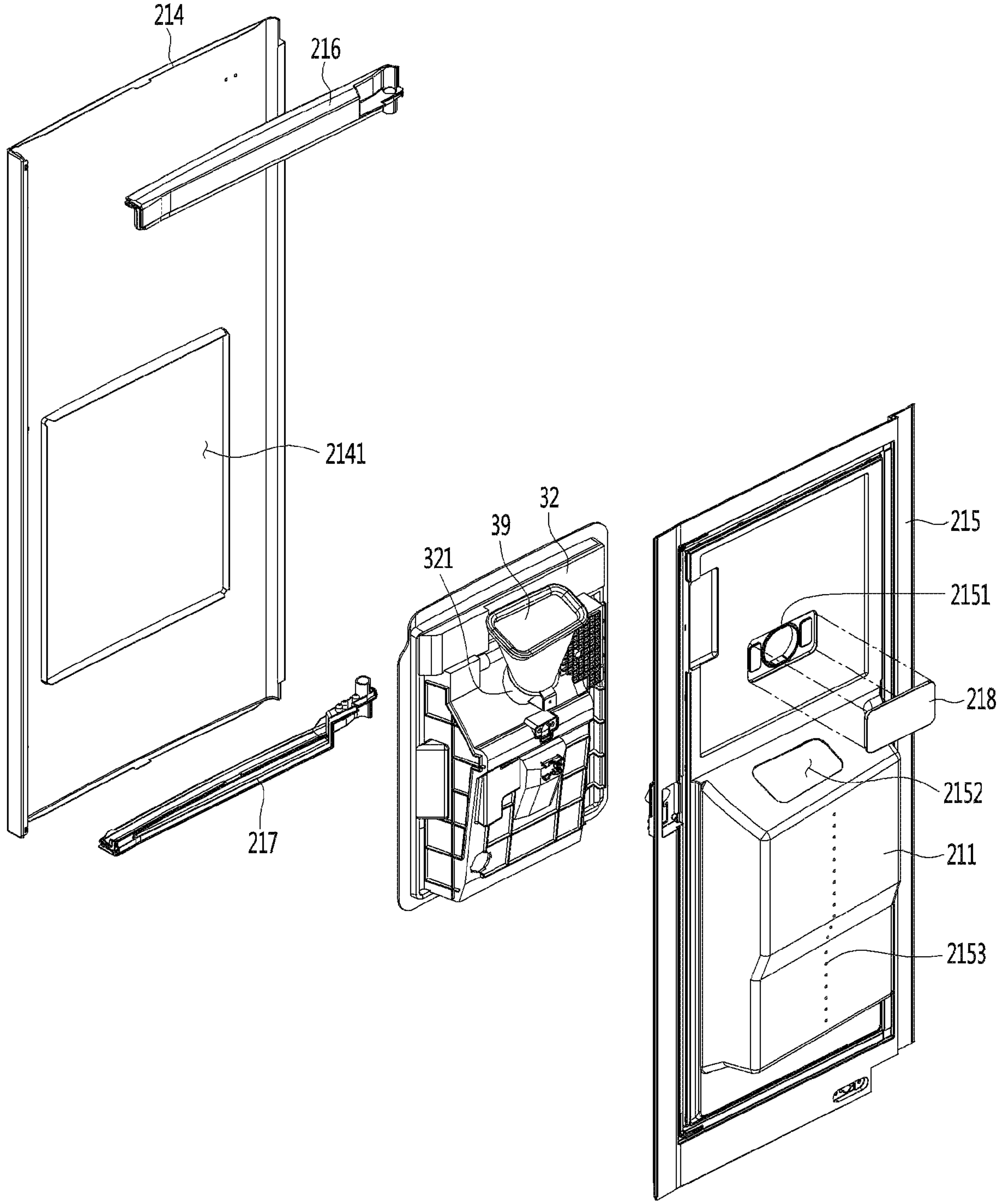
FIG. 55 is an exploded perspective view of a sub door constituting the door-in-door assembly according to an embodiment of the present invention.
Figure 56:
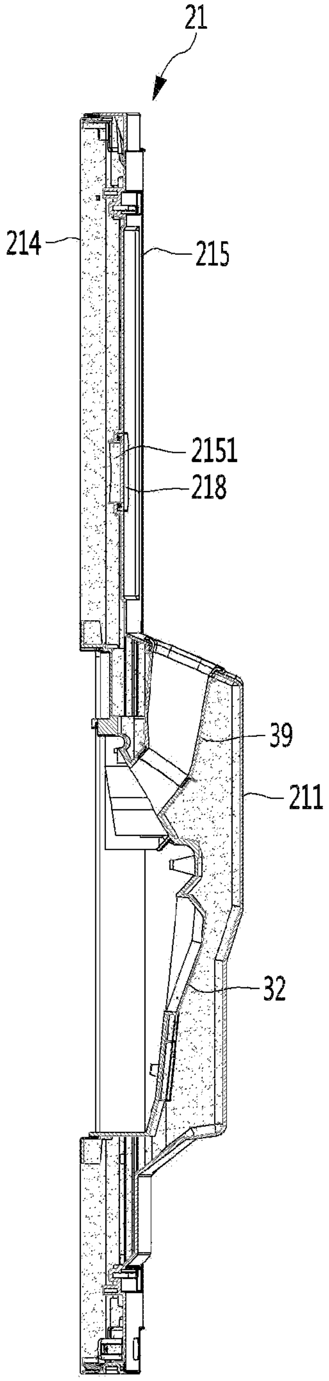
FIG. 56 is a side cross-sectional view of the sub door.

FIG. 55 is an exploded perspective view of the sub door constituting the door-in-door assembly according to an embodiment of the present invention, and FIG. 56 is a side cross-sectional view of the sub door.

Referring to FIGS. 55 and 56, the sub door 21 may include a front plate 214 defining an outer appearance of a front surface thereof, a rear plate 215 coupled to a back surface of the front plate 214, and an upper decor 216 and lower decor 217, which are respectively coupled to top and bottom surfaces of the front plate 214 and the rear plate 215.

Specifically, a dispenser hole 2141 may be defined in the front plate 214, and the dispenser 30 may be mounted in the dispenser hole 2141. A process of foam-filling an insulation material into the sub door 21 so as to manufacture the sub door 21 is needed. The foam-filling process is performed in a state in which the rear casing 32 of the components constituting the dispenser 30 is mounted in the dispenser hole 2141.

The dispenser liner 211 protrudes from the back surface of the rear plate 215, and the rear casing 32 is disposed at a front side of the dispenser liner 211. A duct hole 2152 is defined in a top surface of the dispenser liner, and an inlet of the discharge duct 39 is connected to the duct hole 2152. An outlet of the discharge duct 39 is connected to a guide sleeve 321 disposed on the top surface of the rear casing 32.

A foamed solution injection hole 2151 (or a foamed solution injection port) is defined in any point of the rear plate 215 corresponding to an upper side of the dispenser liner 211. The foamed solution injection hole 2151 may be covered by an injection hole cover 218.

The foamed solution injection hole 2151 may be defined in a point that is spaced apart upward from a front end of the top surface of the dispenser liner 211. The foamed solution injection hole 2151 may be defined in a point that is closer to the front end of the top surface of the dispenser liner 211 than an upper end of the sub door 21, i.e., an upper end of the rear plate 215.

As described above, in a state in which all the components that have to be mounted between the front plate 214 and the rear plate 215 are mounted to block a hole or gap through which the insulation material leaks, the foamed insulation material is injected into the sub door 21.

When the foamed insulation material (or the foamed solution) is injected through the foamed solution injection hole 2151, the liquefied foamed thermal insulation material may be filled into a sub door front part defined by the front plate 214 and the rear casing 32, a sub door rear part defined by the rear plate 215, and a space defined by the upper decor 216 and the lower decor 217. The liquefied foamed thermal insulation material is hardened as time goes on.

While the foamed insulation material is injected through the foamed solution injection hole 2151 to fill the inner space of the sub door 21 with the foamed solution, air corresponding to a volume of the filled foamed solution has to be discharged to the outside of the sub door 21. If the air within the sub door 21 is not quickly discharged to the outside of the sub door 21 during the foaming process, a foamed solution non-filled space may occur in the sub door 21.

To quickly discharge the air during the foamed solution filling process, a plurality of vent holes 2153 may be provided in a portion of the dispenser liner 211. Particularly, the plurality of vent holes 2153 may be vertically arranged at a central portion of the dispenser liner 211. The vent hole 2153 has a diameter of about 0.5 mm to about 1.5 mm, preferably, 1 mm. A distance between the vent holes adjacent to each other may range of about 7 mm to about 15 mm, preferably, about 10 mm. 25 to 35 vent holes, preferably, 30 vent holes 2153 may be provided in the dispenser liner 211. A reason in which the vent hole 2153 is defined in the dispenser liner 211 is because of being determined according to the filled appearance of the foamed solution. That is, the vent hole 2153 may be defined in a portion at which the foamed solution is filled late. This will be described in detail with reference to the accompanying drawings.

Figure 57:
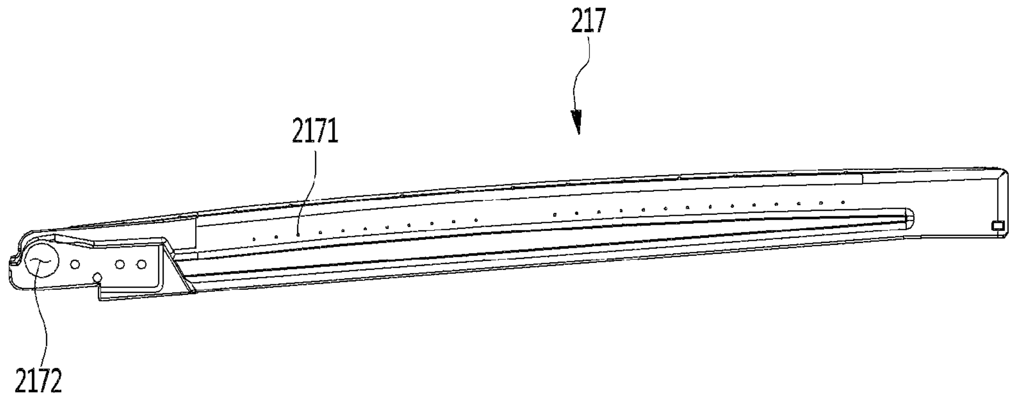
FIG. 57 is a bottom view of a lower decor defining a bottom surface of the sub door.

FIG. 57 is a bottom view of the lower decor defining a bottom surface of the sub door.

Referring to FIG. 57, a hinge hole 2172 through which the hinge shaft passes is defined in an edge of one side of the lower decor 217, and a plurality of vent holes 2171 are defined in a point that is spaced a predetermined distance from the hinge hole 2172 to an edge of the other side of the lower decor 217.

Specifically, the plurality of vent holes 2171 may be arranged from the edge of one surface to the edge of the other surface of the lower decor 217 at a central portion of the lower decor 217. Thus, the foamed solution may flow to the lower decor 217 in the foamed solution filling process of the sub door.

Since the foamed solution is filled the latest at the lower decor 217, the vent holes 2171 may be defined in the lower decor 217.

FIGS. 58 to 61 are simulations illustrating a state in which the foamed solution is filled in the process of filling the foamed solution into the sub door.

Figure 58:
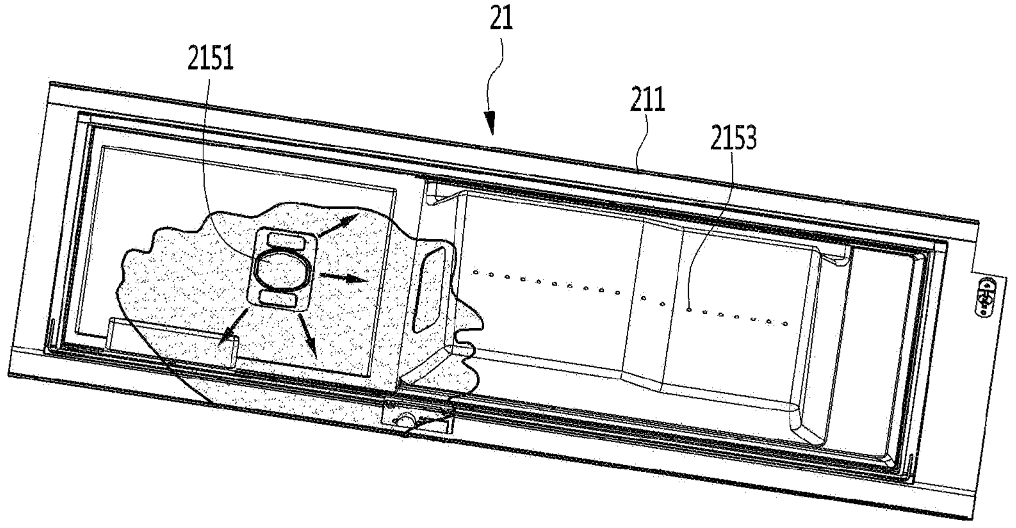
FIGS. 58 to 61 are simulations illustrating a state in which a foamed solution is filled in a process of filling the foamed solution into the sub door.

Referring to FIG. 58, in order to fill the foamed solution into the sub door 21, the sub door 21 is seated on a jig (not shown) in a state in which the front surface of the sub door 21 is overturned to face a lower side. The sub door 21 may be inclined at a predetermined angle from the horizontal surface so that the foamed solution is spread far through the foamed solution injection hole 2151. Here, the sub door 21 may be inclined at an angle of about 4 degrees to about 6 degrees. Particularly, the sub door 21 may be inclined so that the foamed solution injection hole 1251 is disposed at a position that is higher than the lower end of the sub door 21. When the foamed solution is injected in a state in which the sub door 21 is horizontally disposed, the foamed solution is not uniformly spread far, but is hardened.

FIG. 58 illustrates a state in which a diffused state of the foamed solution when 5 seconds are elapsed after the foamed solution is injected. Here, a filling rate is about 5%.

It can be seen that the foamed solution injected through the foamed solution injection hole 2151 is spread in all directions from a center of the sub door 21 to flow to the door handle. This is done due to a transverse cross-section shape of the sub door 21. That is, a side surface opposite to the sub door, i.e., a side surface to which the handle is attached may have a thickness greater than that of the side surface of the sub door to which the hinge shaft is connected.

Thus, when the foamed solution is injected through the foamed solution injection hole 2151 defined in the back surface of the sub door 21 in the state in which the front surface of the sub door 21 is overturned to face the lower side, the foamed solution may be concentrated into the side surface to which the handle is attached.

Figure 59:
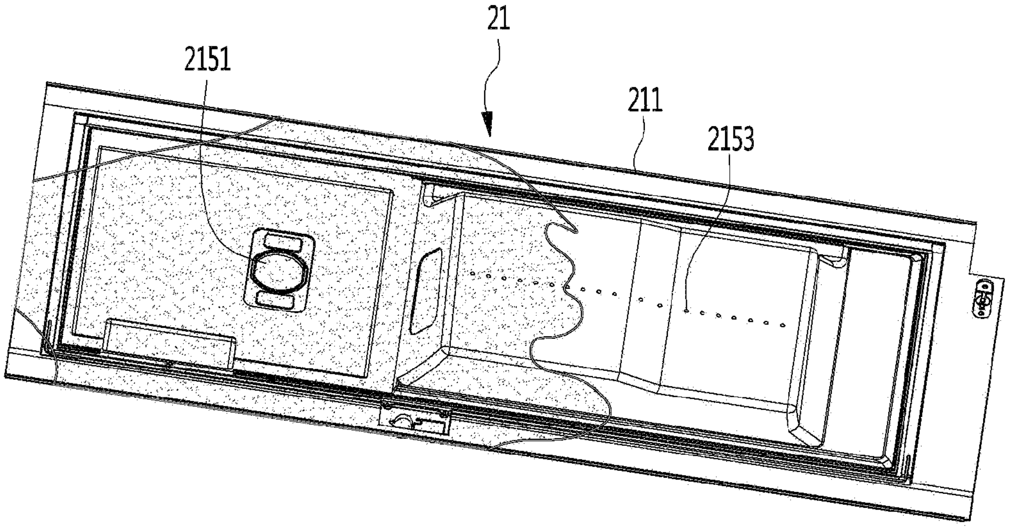

FIG. 59 illustrates a state in which a diffused state of the foamed solution when 16 seconds are elapsed after the foamed solution is injected. Here, a filling rate is about 30%.

Referring to FIG. 59, it can be seen that the foamed solution is filled first up to the upper end of the sub door 21 and then gradually filled into a portion of the dispenser liner 211.

Figure 60:
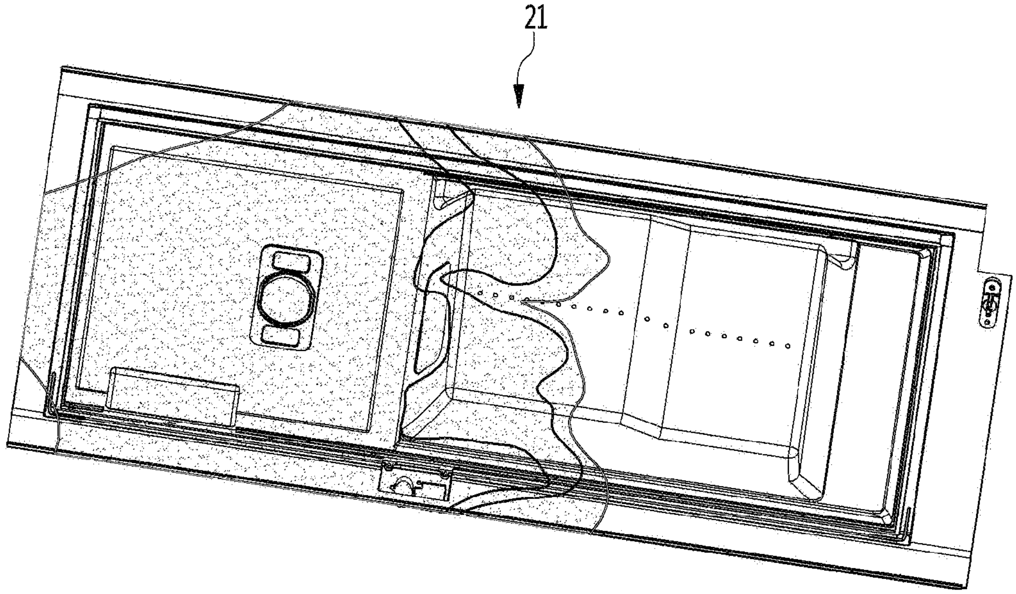

FIG. 60 illustrates a state in which a diffused state of the foamed solution when 19 seconds are elapsed after the foamed solution is injected. Here, a filling rate is about 55%.

Referring to FIG. 60, it can be seen that the foamed solution is filled to the bottoms of the left and right surfaces of the dispenser liner 211 at almost the same rate and then is concentrated into the central portion of the dispenser liner 211. Thus, the air existing in the sub door 21 may be concentrated in a central direction of the dispenser liner 211.

Due to the above-described filled appearance, the plurality of vent holes 2153 may be defined in the central portion of the dispenser liner 211 and be arranged at a predetermined distance from the upper end to the lower end of the dispenser liner 211.

Figure 61:
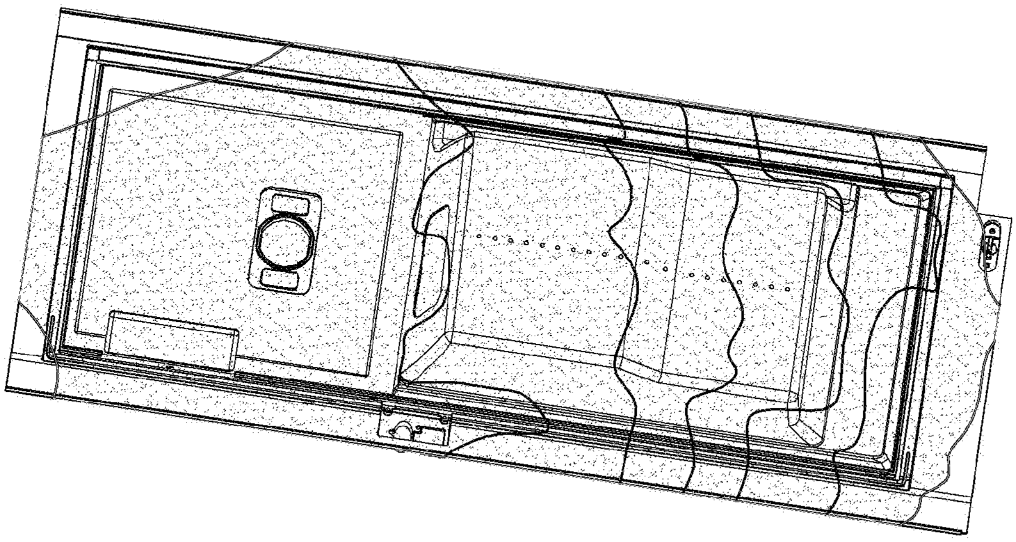

FIG. 61 illustrates a state in which a diffused state of the foamed solution when 32 seconds are elapsed after the foamed solution is injected. Here, a filling rate is about 97%.

Referring to FIG. 61, the foamed solution is filled into the dispenser liner 211 at the same time while flowing to the lower end of the sub door 21. Thus, it can be seen that the lower end of the sub door 21 is filled later. Due to this filled appearance, the plurality of vent holes 2171 may be defined in the lower decor 217.

Figure 62:
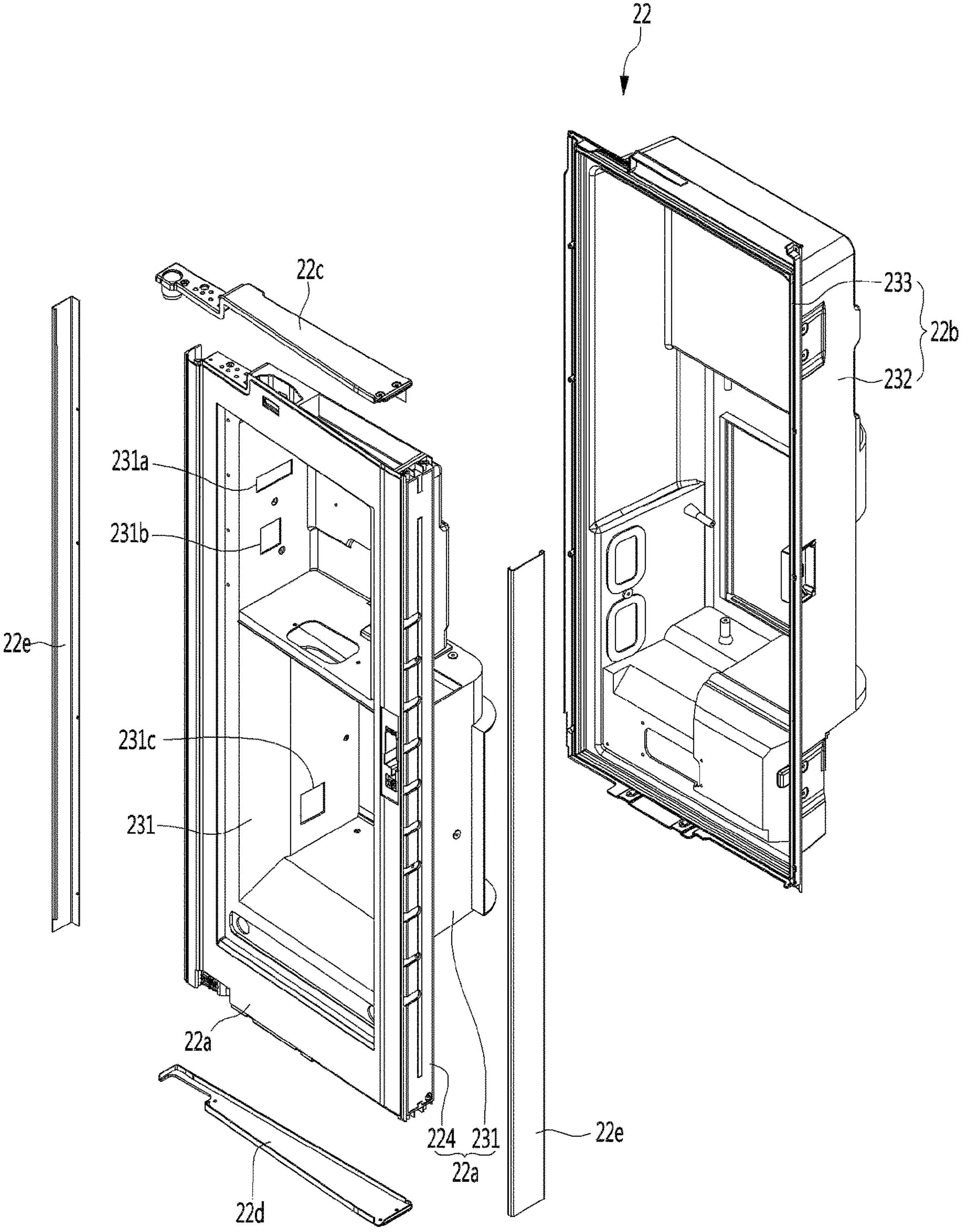
FIG. 62 is an exploded perspective view of the main door according to an embodiment of the present invention.
Figure 63:
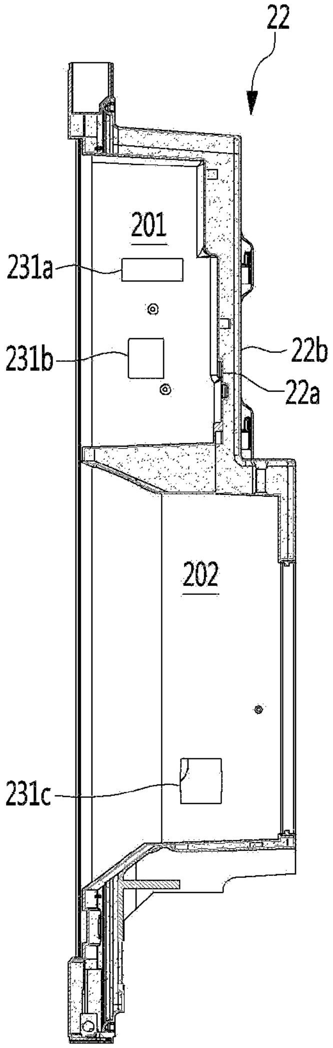
FIG. 63 is a side cross-sectional view of the main door.

FIG. 62 is an exploded perspective view of the main door according to an embodiment of the present invention, and FIG. 63 is a side cross-sectional view of the main door.

Referring to FIGS. 62 and 63, the main door 22 according to an embodiment of the present invention may include a front part **22*a*, a rear part 22*b* coupled to a rear surface of the front part 22*a*, an upper decor 22*c* and lower decor 22*d*, which are respectively coupled to top and bottom surfaces of the front part 22*a*, and a pair of side decors 22*e* respectively coupled to left and right surfaces of the front part 22*a***.

The front part **22*a* may include a door frame 224 and an inner housing 231 protruding from a back surface of the door frame 224. The door frame 224 and the inner housing 231** may be provided in one body through injection molding.

The rear part **22*b* may include a flange part 233 coupled to the back surface of the door frame 224 to define the rear surface of the door frame 224 and an outer housing 232 protruding backward from the flange part 233 to surround the inner housing 231**.

An opening 225 is defined in the front surface part of the inner housing 231, and the inside of the inner housing 231 is partitioned into the ice making room 201 that is an upper storage space and the chiller room 202 that is a lower storage space by the partition wall 207.

To inject the foamed insulation material into the main door 22, the door duct assembly 50 is coupled to an outer surface of the inner housing 231 to prevent the foamed solution from leaking through the cool air inflow hole **231*a*, the ice making room-side cool air discharge hole 231*b*, and the chiller room-side cool air discharge hole 231*c*. The guide duct 207*d* is mounted on the partition wall 207, and the damper assembly 200 is mounted on the communication hole 207*b* to prevent the foamed solution from leaking through a hole or gap defined in the inner housing 231**.

Then, the outer housing 232 is coupled to the back surface of the inner housing 231, and the side decor **22*e* is coupled. Then, the foamed solution is injected into the space defined between the inner housing 231 and the outer housing 232**.

In the state in which the rear part **22*b* is coupled to a rear side of the front part 22*a*, the main door 22** may be largely defined to be constituted by a door frame and a housing protruding backward from the door frame. An opening is defined inside the door frame so as to be accessible to the inside of the housing.

Figure 64:
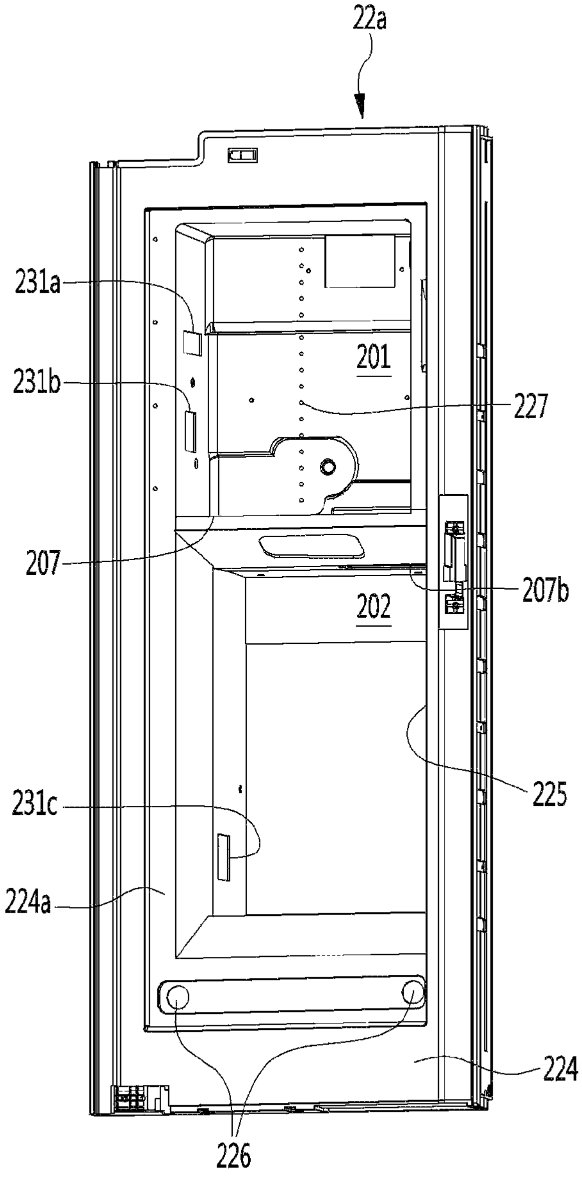
FIG. 64 is a front perspective view of a front part constituting the main door.

FIG. 64 is a front perspective view of the front part constituting the main door.

Referring to FIG. 64, the front part 22*a* may be defined to be constituted by a door frame 224 and an inner housing 231 protruding backward from the door frame 224.

Specifically, the door frame 224 has a rectangular frame shape to define a door part of the main door 22. An opening 225 is defined inside the door frame 224. The opening 225 is defined as an opened front surface part of the inner housing 231. A stepped part 224*a* is recessed by a predetermined depth from the front surface of the door frame 224. The stepped part 224*a* may have a predetermined width along an edge of the opening 225. A gasket 210 around the back surface of the sub door 21 is closely attached to an outer edge of the stepped part 224*a*.

A foamed solution injection hole 226 may be defined in a portion of the stepped part 224*a* corresponding to a lower edge of the opening 225. The foamed solution injection hole 226 may be defined in each of left and right edge points of the stepped part 224*a*.

A plurality of vent holes 227 may be defined in a rear surface of the inner housing defining the rear surface of the ice making room 201. The plurality of vent holes 227 may be disposed at a predetermined distance from an upper end to a lower end of the ice making room. Each of the plurality of vent holes 227 may have the same diameter as each of the vent holes defined in the sub door 21, and a distance between the vent holes adjacent to each other may be the same as that between the vent hole defined in the sub door 21. The number of vent holes 227 may be about 30. However, the number of vent holes 227 may be changed according to the vertical width of the rear surface of the ice making room 201.

The main door 22 may have a structural characteristic in that portions at which a flow direction of the foamed solution is switched when the foamed solution is injected is large in number when compared to the sub door 21. That is, the structure of the main door 22 may be relatively complicated when compared to the structure of the sub door 21. Thus, in the process of injecting the foamed solution into the main door 22, the foamed solution may be injected through at least two or more points so that a region that is not filled with the foamed solution does not exist.

Figure 65:
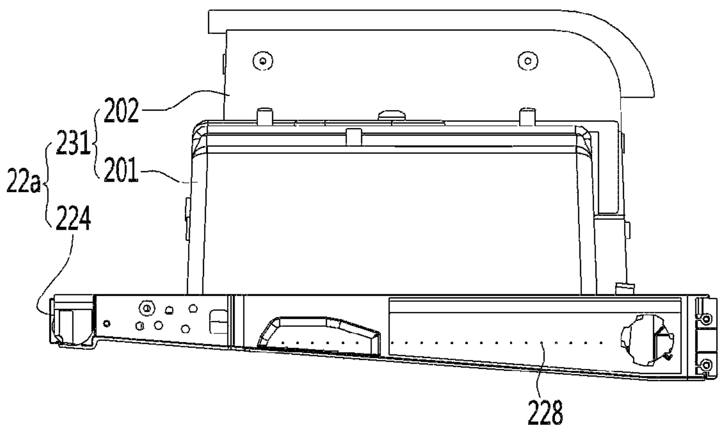
FIG. 65 is a plan view of the front part constituting the main door.
Figure 66:
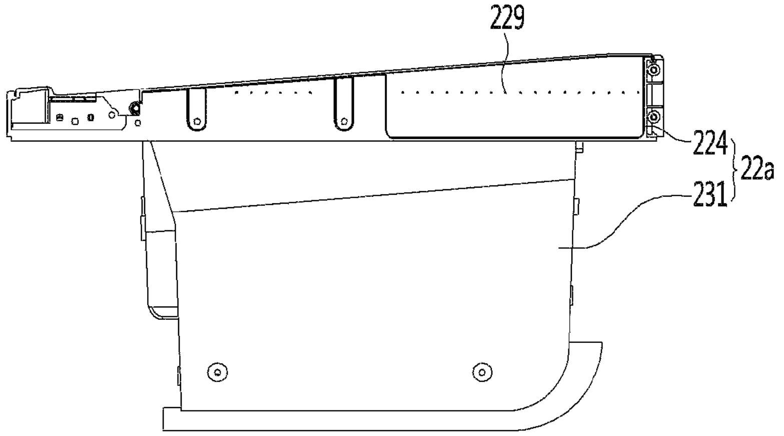
FIG. 66 is a bottom view of the front part.

FIG. 65 is a plan view of the front part constituting the main door, and FIG. 66 is a bottom view of the front part.

Referring to FIGS. 65 and 66, a plurality of vent holes 228 and 229 may be defined in a top surface of the main door 22, particularly, top and bottom surfaces of the door frame 224 constituting the main door 22.

Specifically, the diameter of each of the above-described different vent holes and the distance between the vent holes adjacent to each other may be equally applied to the vent holes 228 and 229 defined in the door frame 224. The number of vent holes 228 defined in the top surface of the door frame 224 may be about 20 to about 25. The number of vent holes defined in the bottom surface of the door frame 224 may be about 25 to about 30. However, the number of vent holes 228 and 229 may be changed according to the dimensions in design of the door frame 224.

FIGS. 67 to 70 are simulations illustrating a state in which the foamed solution is filled in the process of filling the foamed solution into the main door.

Figure 67:
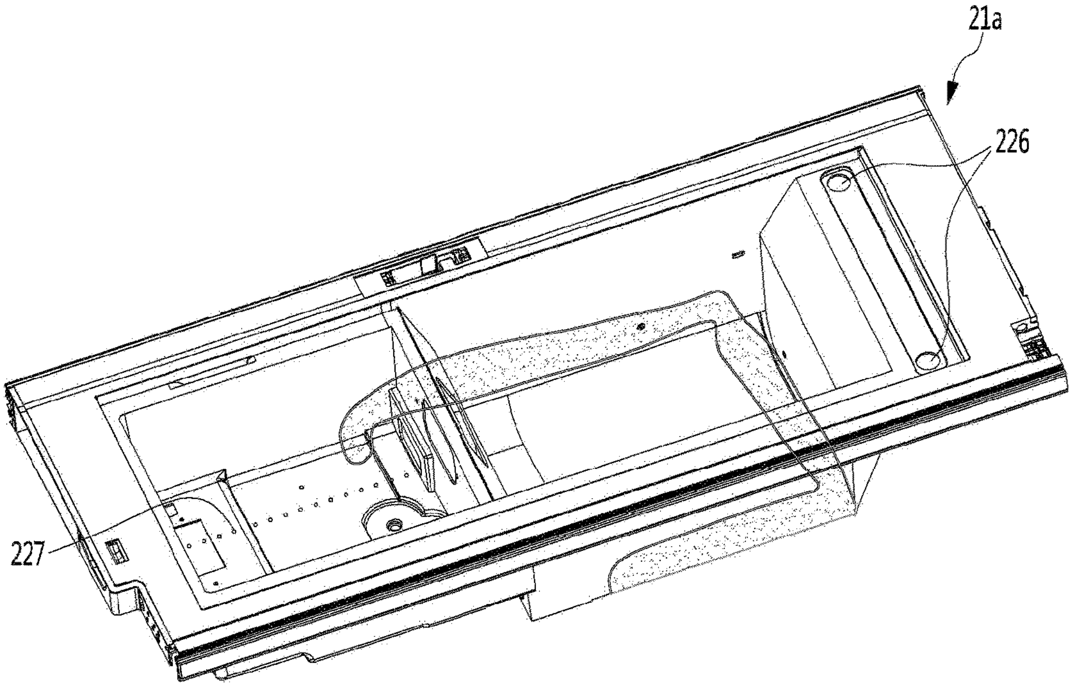
FIGS. 67 to 70 are simulations illustrating a state in which the foamed solution is filled in a process of filling the foamed solution into the main door.
Figure 68:
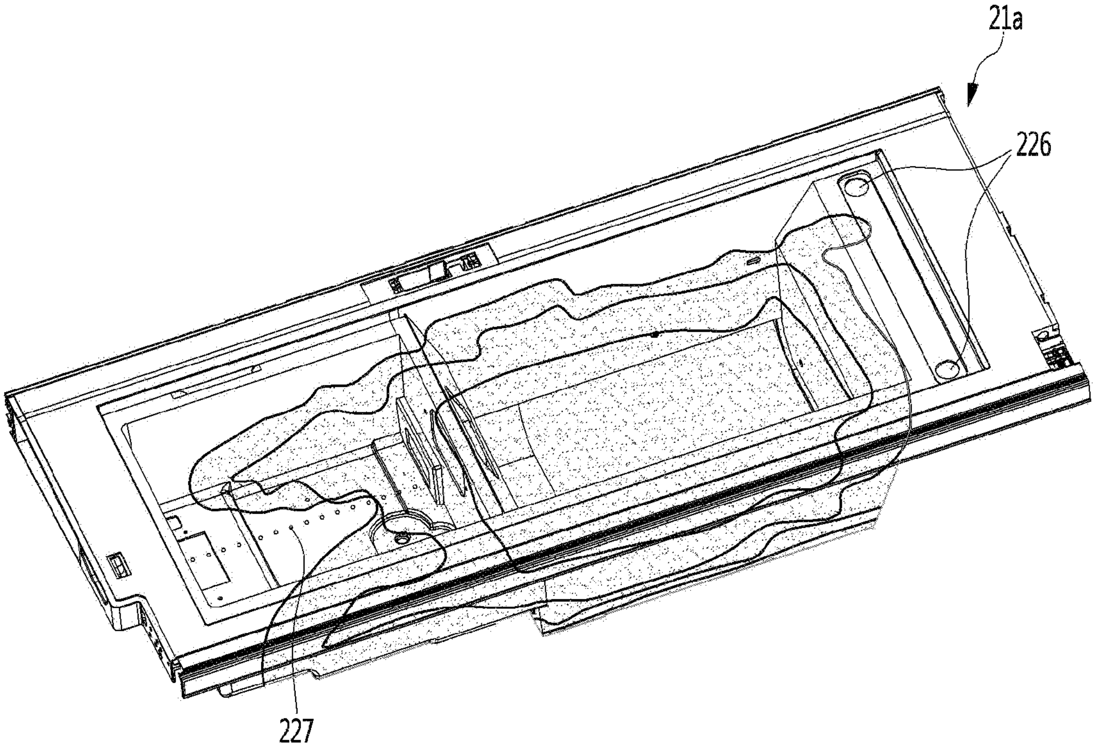
Figure 69:
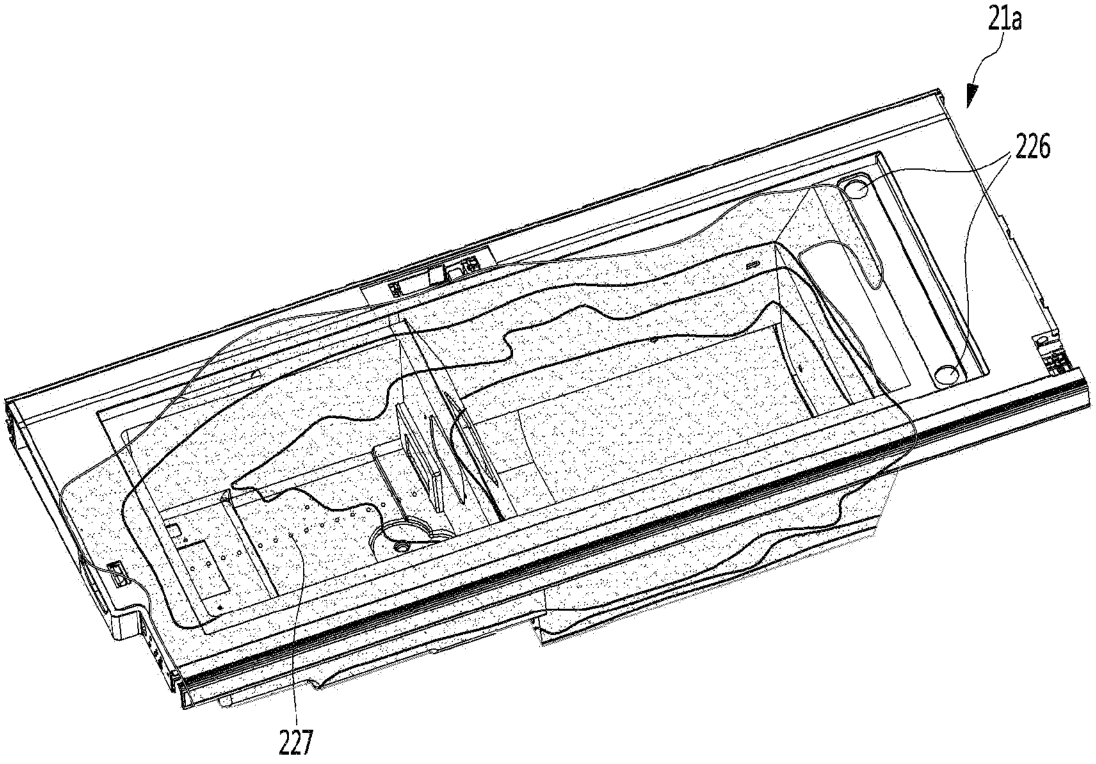
Figure 70:
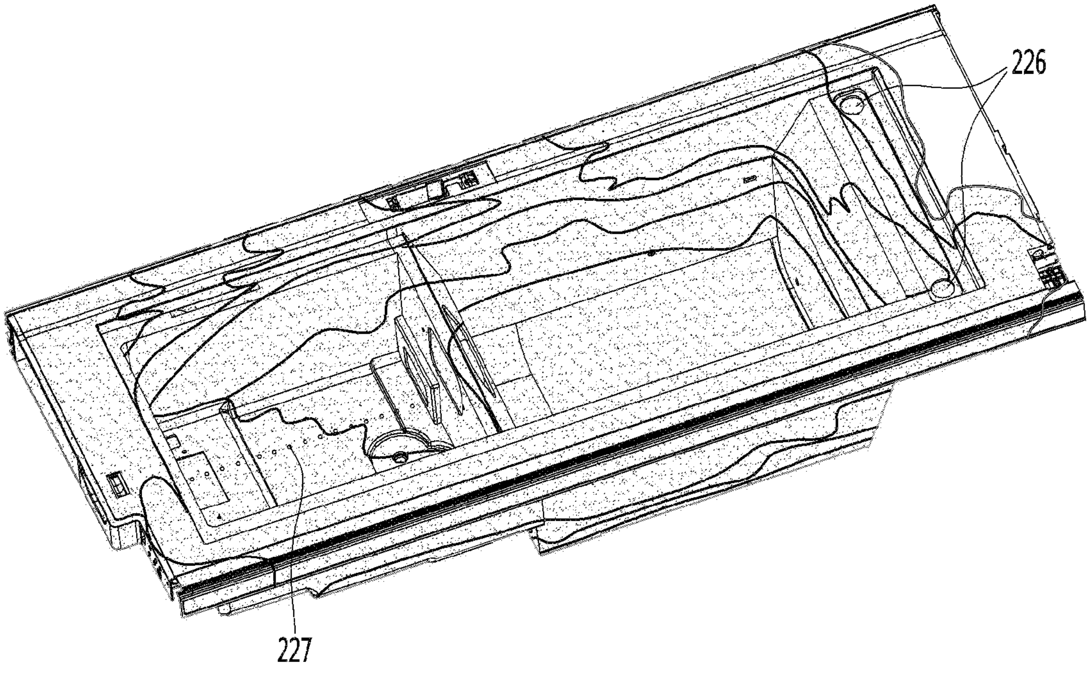

FIG. 67 illustrates a state in which a diffused state of the foamed solution when 5 seconds are elapsed after the foamed solution is injected. Here, a filling rate is about 5%. FIG. 68 illustrates a state in which a diffused state of the foamed solution when 17 seconds are elapsed after the foamed solution is injected. Here, a filling rate is about 30%. FIG. 69 illustrates a state in which a diffused state of the foamed solution when 20 seconds are elapsed after the foamed solution is injected. Here, a filling rate is about 55%. FIG. 70 illustrates a state in which a diffused state of the foamed solution when 32 seconds are elapsed after the foamed solution is injected. Here, a filling rate is about 97%.

Like the sub door 21, the foamed solution may be injected into the main door in a state in which the main door is inclined also at an angle of about 4 degrees to about 6 degrees with respect to the horizontal plane so that the foamed solution smoothly flows and is smoothly diffused in the foamed solution filling process.

Unlike the sub door 21, the main door 22 may become a state in which the lower end in which the foamed solution injection hole 226 is defined is lifted upward in a state in which the front surface part faces an upper side. This is done because the foamed solution injection hole 226 is defined in the lower side of the front surface of the main door 22.

Referring to FIG. 67, it can be seen that the foamed solution injected through two foamed solution injection holes 226 is diffused along the bottom part and the side surface of the housing 23. Referring to FIG. 68, it can be seen that the foamed solution flows to the upper end of the main door 22 while being filled into the left and right surfaces of the housing 23. Referring to FIGS. 68 and 69, it can be seen that the foamed solutions meet each other while being gradually filled from the left and right edges of the housing 23 toward the center of the housing 23. Particularly, it can be seen that the foamed solution flows from the left and right edges of the ice making room 201 toward the center of the rear surface of the ice making room 201. Thus, the plurality of vent holes 227 may be defined in any point of the inner housing 231 defining the rear surface of the ice making room 201. The plurality of vent holes 227 may be disposed to be spaced a predetermined distance from the bottom to the top surface of the ice making room 201.

Also, referring to FIG. 70, it can be seen that the foamed solution is filled the latest at the upper and lower ends of the main door 22. Thus, the plurality of vent holes 228 and 229 may be defined in the top and bottom surface of the main door 22, i.e., the top and bottom surfaces of the door frame 224, respectively.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:

a cabinet that defines a storage compartment;

a first door configured to open and close at least a portion of the storage compartment;

a second door disposed forward relative to the first door and coupled to the first door, the second door having a rear surface that is configured to be in contact with a front surface of the first door based on the second door being closed;

a control panel disposed at the second door;

a first door hinge that connects the first door to the cabinet;

a second door hinge that is laterally spaced apart from the first door hinge and connects the second door to the first door; and a first cable and a second cable that extend from the cabinet and that are inserted into the first door hinge, wherein the second cable passes through the first door and is inserted into the second door hinge, wherein the first door hinge includes a first door upper hinge that connects an upper end of the first door to an upper surface of the cabinet, wherein the first door upper hinge includes:

a first door upper hinge bracket having a first end fixed to the upper surface of the cabinet and a second end fixed to an upper surface of the first door, and a first door upper hinge shaft that extends from the second end of the first door upper hinge bracket and that is inserted into the first door, wherein the first cable and the second cable are inserted into the first door upper hinge shaft, wherein the second door hinge includes a second door upper hinge that connects an upper end of the second door to the upper end of the first door, wherein the second door upper hinge includes:

a second door upper hinge bracket having a first end fixed to the upper surface of the first door and a second end fixed to an upper surface of the second door, and a second door upper hinge shaft that extends from the second end of the second door upper hinge bracket and that is inserted into the second door, wherein the second cable is inserted into the second door upper hinge shaft, and wherein the second cable extends to the control panel after passing through the second door upper hinge shaft.

2. The refrigerator of claim 1, wherein the first door hinge further includes a first door lower hinge that connects a lower end of the first door to the cabinet.

3. The refrigerator of claim 2, wherein the second door hinge further includes a second door lower hinge that connects a lower end of the second door to the first door.

4. The refrigerator of claim 3, wherein a diameter of the first door upper hinge shaft is greater than a dimeter of the second door upper hinge shaft.

5. The refrigerator of claim 4, wherein the first door defines:

a first recess that is recessed downward from the upper surface of the first door and that receives a portion of the first door upper hinge bracket and a portion of the second door upper hinge bracket; and a cable through hole that is defined in a point of the first recess to receive the second cable.

6. The refrigerator of claim 5, wherein the cable through hole is defined adjacent to the second door upper hinge bracket.

7. The refrigerator of claim 5, wherein a second recess that is recessed downward from the upper surface of the second door and that receives another portion of the second door upper hinge bracket.

8. The refrigerator of claim 5, further comprising:

a main water supply tube that extends from the cabinet to an inside of the first door by passing through the first door upper hinge shaft;

a dispenser configured to discharge water or ice, or both; and a dispenser water supply tube that is branched from the main water supply tube and extends to a water faucet disposed on a top surface of the dispenser.

9. The refrigerator of claim 8, further comprising:

an ice maker accommodated in the first door; and an ice maker water supply tube that is branched from the main water supply tube and extends along a side edge of the first door towards the ice maker.

10. The refrigerator of claim 9, further comprising:

a water tank connected to an end of the main water supply tube; and a switching valve mounted to an outlet of the water tank, wherein the dispenser water supply tube and the ice maker water supply tube extend from the switching valve.

11. The refrigerator of claim 10, wherein the first door includes:

an ice making room that receives the ice maker;

an additional room to accommodate at least a portion of the dispenser; and a partition wall partitioning the ice making room and the additional room.

12. The refrigerator of claim 11, wherein the additional room is disposed below the ice making room and configured to maintain a temperature to be different from a temperature of the ice making room or the storage compartment.

13. The refrigerator of claim 11, wherein the dispenser water supply tube passes through a lower end of the front surface of the first door and extends along a side edge of the second door by passing through the second door lower hinge.

14. The refrigerator of claim 13, wherein the second door lower hinge includes:

a second door lower hinge bracket having a first end fixed to the first door; and a second door lower hinge shaft that extends from a second end of the second door lower hinge bracket and that is inserted in the second door by passing through a lower surface of the second door, and wherein the dispenser water supply tube is configured to be inserted into the second door lower hinge shaft to extend along the side edge of the second door.

15. A refrigerator, comprising:

a cabinet that defines a storage compartment;

a first door configured to open and close at least a portion of the storage compartment, the first door being configured to rotate about a first rotational axis;

a second door configured to rotate about a second rotational axis that is parallel to the first rotational axis and laterally spaced apart from the first rotational axis;

a first door upper hinge that connects an upper end of the first door to the cabinet, the first door upper hinge comprising (i) a first door upper hinge shaft through which the first rotational axis passes and (ii) a first door upper hinge bracket fixed to an upper end of the cabinet;

a second door upper hinge that connects an upper end of the second door to the upper end of the first door, the second door upper hinge comprising (i) a second door upper hinge shaft through which the second rotational axis passes and (ii) a second door upper hinge bracket fixed to the upper end of the first door;

a first cable and a second cable that extend from the cabinet;

a main water supply tube that extends from the cabinet to an inside of the first door through the first door upper hinge shaft;

a dispenser configured to discharge water or ice, or both; and a dispenser water supply tube that is branched from the main water supply tube and extends to a water faucet disposed at a top surface of the dispenser, wherein the first cable and the second cable are inserted into the first door upper hinge shaft and received inside the first door, and wherein the second cable extends out of the first door through the upper end of the first door, is inserted into the second door upper hinge shaft, and is received inside the second door.

* * * * *